United States Patent
Ji et al.

(10) Patent No.: US 9,906,293 B2
(45) Date of Patent: Feb. 27, 2018

(54) FLEXIBLE TIME DIVISION DUPLEX METHOD AND APPARATUS FOR COMMUNICATION SYSTEM

(75) Inventors: Hyoungju Ji, Seoul (KR); Joonyoung Cho, Gyeonggi-do (KR); Youngbum Kim, Seoul (KR); Jinkyu Han, Seoul (KR); Juho Lee, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 574 days.

(21) Appl. No.: 13/417,880

(22) Filed: Mar. 12, 2012

(65) Prior Publication Data
US 2012/0230232 A1 Sep. 13, 2012

(30) Foreign Application Priority Data
Mar. 10, 2011 (KR) .................... 10-2011-0021329

(51) Int. Cl.
| | |
|---|---|
| H04B 7/26 | (2006.01) |
| H04W 72/04 | (2009.01) |
| H04W 72/12 | (2009.01) |
| H04W 88/02 | (2009.01) |
| H04W 88/08 | (2009.01) |

(52) U.S. Cl.
CPC ........ *H04B 7/2656* (2013.01); *H04W 72/042* (2013.01); *H04W 72/1289* (2013.01); *H04W 88/02* (2013.01); *H04W 88/08* (2013.01)

(58) Field of Classification Search
CPC ............... H04B 7/2643; H04B 7/2656; H04W 72/00–72/14
See application file for complete search history.

(56) References Cited

U.S. PATENT DOCUMENTS

| | | | |
|---|---|---|---|
| 7,746,765 B2 * | 6/2010 | Lim et al. | ..................... 370/208 |
| 8,204,025 B2 | 6/2012 | Cai et al. | |

(Continued)

FOREIGN PATENT DOCUMENTS

| | | |
|---|---|---|
| CN | 101841867 | 9/2010 |
| KR | 1020100075642 | 7/2010 |

(Continued)

OTHER PUBLICATIONS

Motorola, "Remaining Details on ACK/NACK Bundling for TDD", R1-082473, 3GPP TSG RAN1#53-Bis, Jun. 24, 2008.

(Continued)

*Primary Examiner* — Timothy J Weidner
(74) *Attorney, Agent, or Firm* — The Farrell Law Firm, P.C.

(57) ABSTRACT

A flexible Time Division Duplex (TDD) method and apparatus is provided for improving efficiency of communication system. A communication method of a base station supporting TDD includes transmitting, to a terminal, first information including at least one of a flag indicating whether flexible subframes are used and an indicator indicating a candidate flexible subframe set to an uplink subframe; transmitting, to the terminal, second information including a switch flag indicating whether to use the candidate flexible subframe as a downlink subframe; and transmitting, to the terminal, when the candidate flexible subframe is indicated to be used as the downlink subframe, the candidate flexible subframe as the downlink subframe.

18 Claims, 33 Drawing Sheets

(56) References Cited

U.S. PATENT DOCUMENTS

| | | | |
|---|---|---|---|
| 8,209,576 B2 | 6/2012 | Zhang | |
| 8,233,413 B2 * | 7/2012 | Zhang et al. | 370/280 |
| 8,605,569 B2 * | 12/2013 | Olszewski et al. | 370/203 |
| 2009/0201838 A1 | 8/2009 | Zhang et al. | |
| 2009/0249153 A1 | 10/2009 | Zhang | |
| 2010/0027446 A1 | 2/2010 | Choi et al. | |
| 2010/0246456 A1 | 9/2010 | Suo et al. | |
| 2010/0303013 A1 | 12/2010 | Khandekar et al. | |
| 2011/0105050 A1 * | 5/2011 | Khandekar | H04L 5/001 455/68 |
| 2011/0149813 A1 | 6/2011 | Parkvall et al. | |
| 2011/0176461 A1 * | 7/2011 | Astely | H04B 7/2656 370/280 |
| 2011/0211503 A1 | 9/2011 | Che et al. | |
| 2012/0113941 A1 * | 5/2012 | Chung | H04W 72/1289 370/329 |
| 2012/0120854 A1 | 5/2012 | Zhang et al. | |
| 2013/0188516 A1 * | 7/2013 | He | H04W 28/16 370/254 |

FOREIGN PATENT DOCUMENTS

| | | | |
|---|---|---|---|
| KR | 1020100106364 | 10/2010 | |
| KR | 1020100139062 | 12/2010 | |
| WO | WO 2009/100371 | 8/2009 | |
| WO | WO 2009/120701 | 10/2009 | |
| WO | WO 2010/049587 | 5/2010 | |
| WO | WO 2010/129295 | 11/2010 | |
| WO | WO 2010/148917 | 12/2010 | |
| WO | WO 2011005032 A2 * | 1/2011 | H04W 72/1289 |
| WO | WO 2011/077288 | 6/2011 | |

OTHER PUBLICATIONS

Texas Instruments, "Time-Domain Backhaul Coordination and Legacy Support for Radio Link Monitoring", R1-105292, 3GPP TSG RAN WG1 #62bis, Oct. 11-15, 2010, 5 pages.
Chinese Office Action dated Dec. 10, 2015 issued in counterpart application No. 201280012657.9, 30 pages.
Japanese Office Action dated Jan. 18, 2016 issued in counterpart application No. 2013-557654, 8 pages.
European Search Report dated Jul. 1, 2016 issued in counterpart application No. 16160662.9-1855, 7 pages.
Korean Office Action dated Nov. 29, 2017 issued in counterpart application No. 10-2011-0021329, 7 pages.

* cited by examiner

FIG. 6

| | 0 | 1 | 2 | 3 | 4 | 5 | 6 | 7 | 8 | 9 | |
|---|---|---|---|---|---|---|---|---|---|---|---|
| Configuration 3 | D | S | U | U | U | D | D | D | D | D | 601 |
| | D | S | U | U | F | D | D | D | D | D | 602 |
| | D | S | U | F | F | D | D | D | D | D | 603 |
| | D | S | F | F | F | D | D | D | D | D | 604 |
| Configuration 1 | D | S | U | U | D | D | S | U | U | D | 605 |
| | D | S | U | F | D | D | S | U | U | D | 606 |
| | D | S | U | F | D | D | S | U | F | D | 607 |
| | D | S | F | F | D | D | S | F | F | D | 608 |

FIG. 17
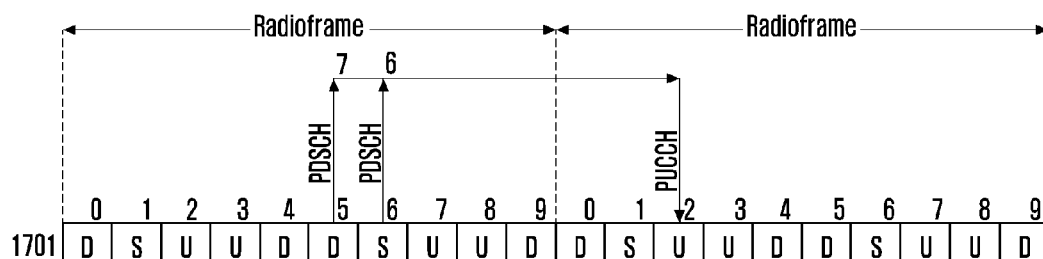
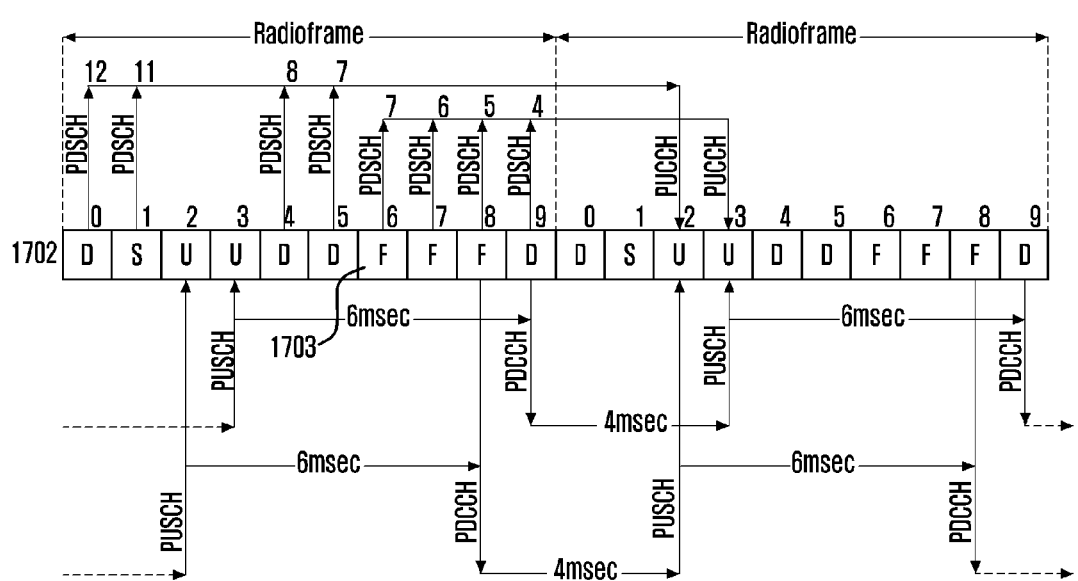

FLEXIBLE TIME DIVISION DUPLEX METHOD AND APPARATUS FOR COMMUNICATION SYSTEM

PRIORITY

This application claims priority under 35 U.S.C. 119(a) to an application filed in the Korean Intellectual Property Office on Mar. 10, 2011 and assigned Serial No. 10-2011-0021329, the content of which is incorporated herein by reference.

BACKGROUND OF THE INVENTION

1. Field of the Invention

The present invention generally relates to Time Division Duplex (TDD) technology, and more particularly, the present invention relates to a flexible TDD method for improving the efficiency of a communication system.

2. Description of the Related Art

Mobile communication systems have evolved into high-speed, high-quality wireless packet data communication systems (such as 3GPP High Speed Packet Access (HSPA) and Long Term Evolution (LTE), 3GPP2 High Rate Packet Data (HRPD), Ultra Mobile Broadband (UMB), and IEEE 802.16e standard systems) to provide data and multimedia services that extend beyond the early voice-oriented services.

As a representative broadband radio communication standard, LTE adopts Orthogonal Frequency Division Multiplexing (OFDM) in the downlink and Single Carrier Frequency Division Multiple Access (SC-FDMA) in the uplink.

In order to be prepared against decoding failure occurring at initial transmission, LTE adopts Hybrid Automatic Repeat reQuest (HARQ) for retransmission of the decoding-failed data on the physical layer. HARQ is a technique in which, when decoding has failed, the receiver sends to the transmitter a Negative Acknowledgement (NACK) so that the transmitter can retransmit the decoding-failed data. If the data is decoded successfully, the receiver sends to the transmitter an Acknowledgement (ACK) so that the transmitter can send new data.

In the OFDM system, the modulation signal is mapped to a 2-dimensional resource, i.e. a time-frequency resource. The time resource is divided into OFDM symbols. The frequency resource is divided into tones orthogonal among each other. In the OFDM system, a minimum resource unit is a Resource Element (RE), which is defined by an OFDM symbol on the time axis and a tone on the frequency axis.

The physical channel is a physical layer channel for transmitting modulation symbols output by modulating one or more coded bit streams. In an Orthogonal Frequency Division Multiple Access (OFDMA) system, multiple physical channels can be configured according to the purpose of the information bit stream or the receiver. The rule of pairing the physical channel with the RE is referred to as mapping.

SUMMARY OF THE INVENTION

In accordance with aspects of the present invention, a flexible TDD method and apparatus are provided that are capable improving resource utilization efficiency by determining a specific subframe for use in one of the uplink and the downlink, selectively.

Also, aspects of the present invention provide a flexible TDD method and apparatus that is capable of adjusting the ratio between the numbers of uplink and downlink subframes dynamically according to the system condition, e.g. uplink and downlink traffic amounts in a TDD mode.

Also, aspects of the present invention provide a flexible TDD method and apparatus that are capable of guaranteeing backward compatibility in the system environment where the enhanced terminals supporting flexible subframe configuration and legacy terminals coexist by defining detailed conditions and/or operations rules of the flexible subframe configuration.

Also, aspects of the present invention provide a flexible TDD method and apparatus that are capable of supporting HARQ in the TDD system operating in flexible subframe configuration mode by providing the transmission timings of the HARQ acknowledgement in reply to uplink or downlink data and/or data according to the ratio between the numbers of uplink and downlink subframes.

Also, aspects of the present invention provide a flexible TDD method and apparatus that are capable of mitigating inter-cell interference by exchanging scheduling and interference-related information with neighbor cells especially when operating in a flexible subframe configuration mode.

Furthermore, aspects of the present invention provide a flexible TDD method and apparatus that are capable of supporting cross-carrier scheduling on multiple carriers by configuring the subframes having the same index on multiple carriers as flexible subframes independently in the multicarrier system operating in a flexible subframe configuration mode.

In accordance with an aspect of the present invention, a communication method of a base station supporting Time Division Duplex (TDD) includes transmitting to a terminal a first information including at least one of a flag indicating whether flexible subframes are used and an indicator indicating a candidate flexible subframe set to an uplink subframe; transmitting to the terminal a second information including a switch flag indicating whether to use the candidate flexible subframe as a downlink subframe; and transmitting, when the candidate flexible subframe is indicated to be used as a downlink subframe, to the terminal the candidate flexible subframe as the downlink subframe.

In accordance with another aspect of the present invention, a communication method of a terminal supporting Time Division Duplex (TDD) includes receiving from a base station a first information including at least one of a flag indicating whether flexible subframes are used and an indicator indicating a candidate flexible subframe set to an uplink subframe; receiving from the base station a second information including a switch flag indicating whether to use the candidate flexible subframe as a downlink subframe; and receiving, when the candidate flexible subframe is indicated to be used as a downlink subframe, the candidate flexible subframe as the downlink subframe from the base station.

In accordance with another aspect of the present invention, a communication apparatus of a base station supporting Time Division Duplex (TDD) includes a transceiver which transmits and receives data to and from a terminal; and a controller which controls the transceiver to transmit to a terminal a first information including at least one of a flag indicating whether flexible subframes are used and an indicator indicating a candidate flexible subframe set to an uplink subframe, to transmit to the terminal a second information including a switch flag indicating whether to use the candidate flexible subframe as a downlink subframe, and to transmit, when the candidate flexible subframe is indicated to be used as a downlink subframe, to the terminal the candidate flexible subframe as the downlink subframe.

In accordance with still another aspect of the present invention, a communication apparatus of a terminal supporting Time Division Duplex (TDD) includes a transceiver which transmits and receives data to and from a base station; and a controller which controls the transceiver to receive from a base station a first information including at least one of a flag indicating whether flexible subframes are used and an indicator indicating a candidate flexible subframe set to an uplink subframe, to receive from the base station a second information including a switch flag indicating whether to use the candidate flexible subframe as a downlink subframe, and to receive, when the candidate flexible subframe is indicated to be used as a downlink subframe, the candidate flexible subframe as the downlink subframe from the base station.

BRIEF DESCRIPTION OF THE DRAWINGS

The above and other aspects, features and advantages of the present invention will be more apparent form the following detailed description when taken in conjunction with the accompanying drawings, in which:

FIG. 6 is a diagram illustrating a principle of resource management in the time domain of the TDD system according to an embodiment of the present invention;

FIG. 17 is a diagram illustrating the HARQ timing relationship of the system operating in TDD configuration 1 supporting FlexSF in units of half radio frames according to an embodiment of the present invention;

DETAILED DESCRIPTION OF EMBODIMENTS OF THE PRESENT INVENTION

Figure 1:
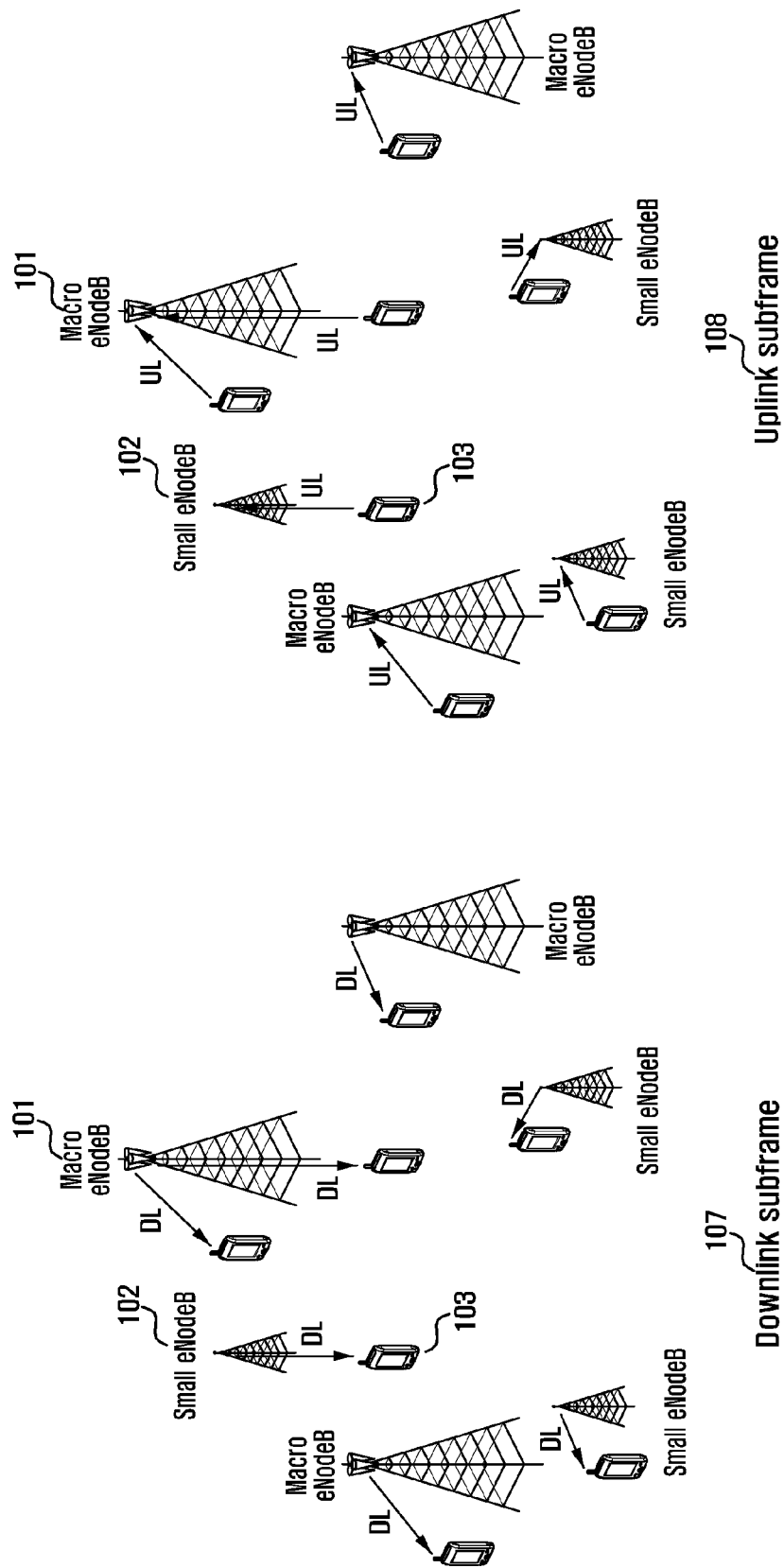
FIG. 1 is a conceptual diagram illustrating a system operating in a TDD mode according to an embodiment of the present invention.

Embodiments of the present invention are described in detail with reference to the accompanying drawings. However, the present invention is not limited to the embodiments described herein. Throughout the description, the same reference numbers designate the same parts of the present invention. The terms used herein are only used to distinguish one element from another but not limiting in any way.

According to an embodiment of the present invention, a transceiver is included in a communication system and capable of transmitting and/or receiving a signal and/or data. For example, the transceiver can be a terminal, a base station, or a network entity. The signal and/or data can include a training symbol, a control signal, control information, traffic, padding, or the like. The communication system including the transceiver is not limited to a specific signal format and/or a specific protocol according to data modulation/demodulation but can use various signal formats and/or various protocols. For example, the communication system can include systems based on IEEE 802.16, WiMAX, and Long Term Evolution (LTE) standards. The base station is responsible for resource allocation to terminals and can be one of a radio access unit, a base station controller, and a node of the network. The base station also can include a repeater. The terminal can include, but is not limited to, a cellular phone, a smartphone, a computer, and a multimedia system having communication function.

For example, the transceiver of the communication system can include a first transceiver and/or a second transceiver. The first transceiver can be a base station while the second transceiver can be a terminal. Hybrid Automatic Repeat reQuest (HARQ) can be used to downlink data and/or uplink data.

A description is made of the method and apparatus for supporting TDD with the example of an LTE system and/or an LTE-Advanced (LTE-A) system. In accordance with an aspect, the embodiments of the present invention can be applied to other radio communication systems in TDD mode.

The LTE system is a representative system adopting OFDM in the downlink and Single Carrier-Frequency Division Multiple Access (SC-FDMA) in the uplink. The LTE-A system is an expanded system with multiple LTE bands.

A subframe of the LTE system has a length of 1 ms in the time domain and whole LTE transmission bandwidth in the frequency domain and can be divided into two time slots. The LTE transmission bandwidth consists of a plurality of Resource Blocks (RBs), and an RB is a basic unit of resource allocation. Each RB consists of 12 consecutive tones in the frequency domain and 14 consecutive OFDM symbols in the time domain. The subframe can include a control channel region for transmitting control channels and/or a data channel region for transmitting data channels. The control and/or data channel regions can carry Reference Signals (RSs) for use in channel estimation The base station (hereinafter, interchangeably referred to as enhanced Node B or eNB) can configure and transmit a Physical Downlink Shared CHannel (PDSCH) with transmission properties. The eNB also can transmit the transmission properties of PDSCH to the terminal (hereinafter, interchangeably referred to as User Equipment or UE) through the Physical Downlink Control CHannel (PDCCH). The eNB also can transmit uplink transmission properties to the UE through the PDCCH. If the PDCCH is received, the UE can configure and transmit to the eNB a Physical Uplink Shared Channel (PUSCH) with the transmission properties recommended by the eNB.

In the radio communication system adopting HARQ, the receiver can improve the reception performance by combining the retransmitted signal with previously received ones. Here, the receiver is at least a part of the transceiver for performing the reception function and can be a UE or an eNB. The transmitter is at least a part of the transceiver for performing the transmission function and can be a UE or an eNB. The receiver can store previously received but decoding-failed data by taking notice of retransmission.

The HARQ process can be defined so as to allow the transmitter to transmit new data for the duration before receiving a response signal such as an ACK or NACK. The receiver can determine which previously received signal is to be combined with the retransmitted signal based on the HARQ Process IDentifier (HARQ PID). The HARQ process can be categorized into one of synchronous HARQ and asynchronous HARQ depending on whether the transmitter notifies the receiver of the HARQ PID through control signaling.

In the synchronous HARQ mode, the sequence number or index of the subframe carrying the PDCCH can be used to identify the HARQ process instead of the HARQ PID. Here, the subframe is a resource allocation unit in the time domain.

In the synchronous HARQ mode, the transmitter cannot notify the receiver of the HARQ PID through control signaling. In the case in which the eNB grants resources through scheduling information for uplink transmission through the PDCCH in an $n^{th}$ DL subframe, the HARQ PID can be determined based on the subframe sequence n. For example, assuming that the HARQ PID corresponding to the subframe sequence n is 0, the HARQ PID corresponding to the subframe sequence n+1 is 1. The PDCCH carrying the UL grant transmitted in the $n^{th}$ subframe can include a New Data Indicator (NDI). If the NDI is toggled as compared to the previous NDI value, the UL grant allocates the PUSCH for new data transmission and, otherwise, allocates the PUSCH for retransmission of the previously transmitted data.

For example, the timings of initial transmission and retransmission of a transport block (TB) can be determined according to the subframe sequence in the synchronous HARQ. Assuming that NDI is toggled, the UE performs initial transmission of the PUSCH for new data in an $(n+4)^{th}$ subframe. Whether the PUSCH data transmitted at the $(n+4)^{th}$ subframe is successfully decoded at the eNB can be checked with the Physical HARQ Indicator CHannel (PHICH) transmitted by the eNB at the $(n+8)^{th}$ subframe. If it is determined that the PHICH carriers the NACK, the UE performs retransmission of the PUSCH at the $(n+12)^{th}$ subframe. At this time, since the eNB and the UE know that the TB transmitted initially at the $(n+4)^{th}$ subframe is retransmitted at the $(n+12)^{th}$ subframe, the HARQ process can operate normally without the need of an extra HARQ PID.

If it is necessary to change the transmission properties of the PUSCH such as a PUSCH transmission resource and a Modulation and Coding Scheme (MCS) for retransmission, the eNB can transmit the PDCCH to indicate this. The HARQ of which transmission properties can be changed is referred to as an adaptive synchronous HARQ. In case of the adaptive synchronous HARQ, the PDCCH can be transmitted along with PHICH for informing of the transmission properties such as a precoding scheme of the UE.

FIG. 1 is a conceptual diagram illustrating the system operating in TDD mode according to an embodiment of the present invention.

Referring to FIG. 1, the system operating in TDD mode (hereinafter interchangeably referred to as TDD system) is a system having at least one cell using the same frequency band for uplink and downlink data transmission. The TDD system multiplexes transmissions in the time domain on the same frequency band such that downlink transmission is performed at one timing while the uplink transmission is performed at another timing. According to an aspect of the present invention, the eNB 102 operating in TDD mode monitors the amount of uplink and/or downlink traffic. The eNB 102 determines the use of the flexible subframe configuration in consideration of the traffic amount. The eNB 102 also identifies the candidate subframes that are configured as flexible subframes. That is, the eNB 102 retains and accesses the configuration information including candidate flexible subframe information which is stored in the storage. The eNB 102 also identifies the candidate flexible subframe according to a predetermined rule. According to an aspect of the present invention, when the flexible subframe mode is not activated, the adjacent cells perform the uplink and downlink transmissions at the same timings. The eNB 101 can be an eNB using relatively high transmit power (e.g. macro eNB), while the eNB 102 can be an eNB using relatively low transmit power (e.g. small eNB or femto eNB). The UE 103 is a terminal served by the eNB 102. At the uplink transmission timing (i.e. uplink subframe) 108, the UE 103 performs uplink transmission to the eNB 102 as its serving eNB while another UE performs uplink transmission in the neighbor eNB 101.

For example, when the LTE system is operating in non-flexible subframe mode, the transmission/reception timing is determined according to one of 7 TDD configurations as shown in Table 1.

TABLE 1

| TDD Config. | Subframe | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Referring to Table 1, the system is configured with one of 7 TDD configurations 0 to 6. The subframe numbers 0 to 9 denote indices of the subframes constituting a radio frame. In LTE, the 10 msec radio frame (hereinafter, referred to as frame) is divided into 10 equally sized subframes of 1 msec. Here, 'D' denotes downlink subframe, 'U' denotes uplink subframe, and 'S' denotes special subframe. The special subframe consists of a Downlink Pilot Time Slot (DwPTS), a Guard Period (GP), and an Uplink Pilot Time Slot (UpPTS). The DwPTS has a short time duration as compared to a normal subframe, and is responsible for the function of the normal downlink subframe. The system controls a cell to operate in a specific TDD configuration and transmits and/or exchanges the TDD configuration information to and/or with the UE. The system secures the timing of switching from the downlink operation to uplink operation between the eNB and the UE. The special subframe is positioned after the downlink subframe and before the uplink subframe. The uplink subframes appear consecutively in part, and the downlink subframes appear consecutively in part, too. The special subframe is used for downlink-to-uplink switching.

According to the TDD configuration, the HARQ timing relationship is determined or configured between the eNB and the UE. The HARQ timing relationship is the relationship among retransmission timings determined according to whether data are received successfully. The HARQ timing relationship includes the information on the transmission and/or reception of three signals. That is, the HARQ timing relationship includes the information indicating the timing for UE's uplink data transmission corresponding to one of HARQ acknowledgement and transmission/retransmission scheduling information, the information indicating the timing for the eNB's HARQ acknowledgement transmission corresponding to the UE's uplink data transmission/retransmission, and/or the information indicating the timing for the UE's downlink data transmission corresponding to the UE's HARQ acknowledgement.

Table 2 shows TDD UL/DL configurations indicating the UE's uplink data transmission timing corresponding to one of the UE's HARQ acknowledgement and transmission/retransmission scheduling information.

TABLE 2

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Table 2 shows the UE's PUSCH transmission timing, i.e. $(i+k)^{th}$ subframe, corresponding to the eNB's HARQ acknowledgement or retransmission scheduling information transmission timing. That is, if the transmission timing of the eNB's HARQ acknowledgement (e.g. PHICH) or retransmission scheduling information (e.g. PDCCH) corresponds to the $i^{th}$ subframe, the transmission timing of UE's uplink data (e.g. PUSCH) corresponds to the $(i+k)^{th}$ subframe. Here, k denotes one of the values in table 1.

Table 3 shows TDD UL/DL configurations indicating the eNB's HARQ acknowledgement transmission timing corresponding to the UE's uplink data transmission/retransmission according to the TDD configuration of Table 1.

TABLE 3

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Table 3 shows the eNB's HARQ acknowledgement transmission timing, i.e. $(n+j)^{th}$ subframe, corresponding to the PUSCH transmission timing. If the UE's uplink data (e.g. PUSCH) transmission/retransmission timing is the $n^{th}$ subframe, the eNB's HARQ acknowledgement transmission timing is the $(n+j)^{th}$ subframe. Here, j denotes one of the values in Table 2.

Table 4 shows exemplary TDD UL/DL configurations indicating the eNB's downlink data transmission timing corresponding to the UE's HARQ acknowledgement according to the TDD configuration of Table 1.

TABLE 4

| UL-DL Config-uration | Subframe m | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7 6 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 4 shows the eNB's data transmission timing, i.e. $(m-\{k\})^{th}$ subframe corresponding to the UE's HARQ acknowledgment transmission timing. In Table 4, if the UE's HARQ acknowledgement transmission timing is the $m^{th}$ subframe, the eNB's downlink data transmission and/or downlink scheduling information transmission timing is the $(m-\{k\})^{th}$ subframe. Here, the set $\{k\}$ can be one of the values in Table 3.

Figure 2:
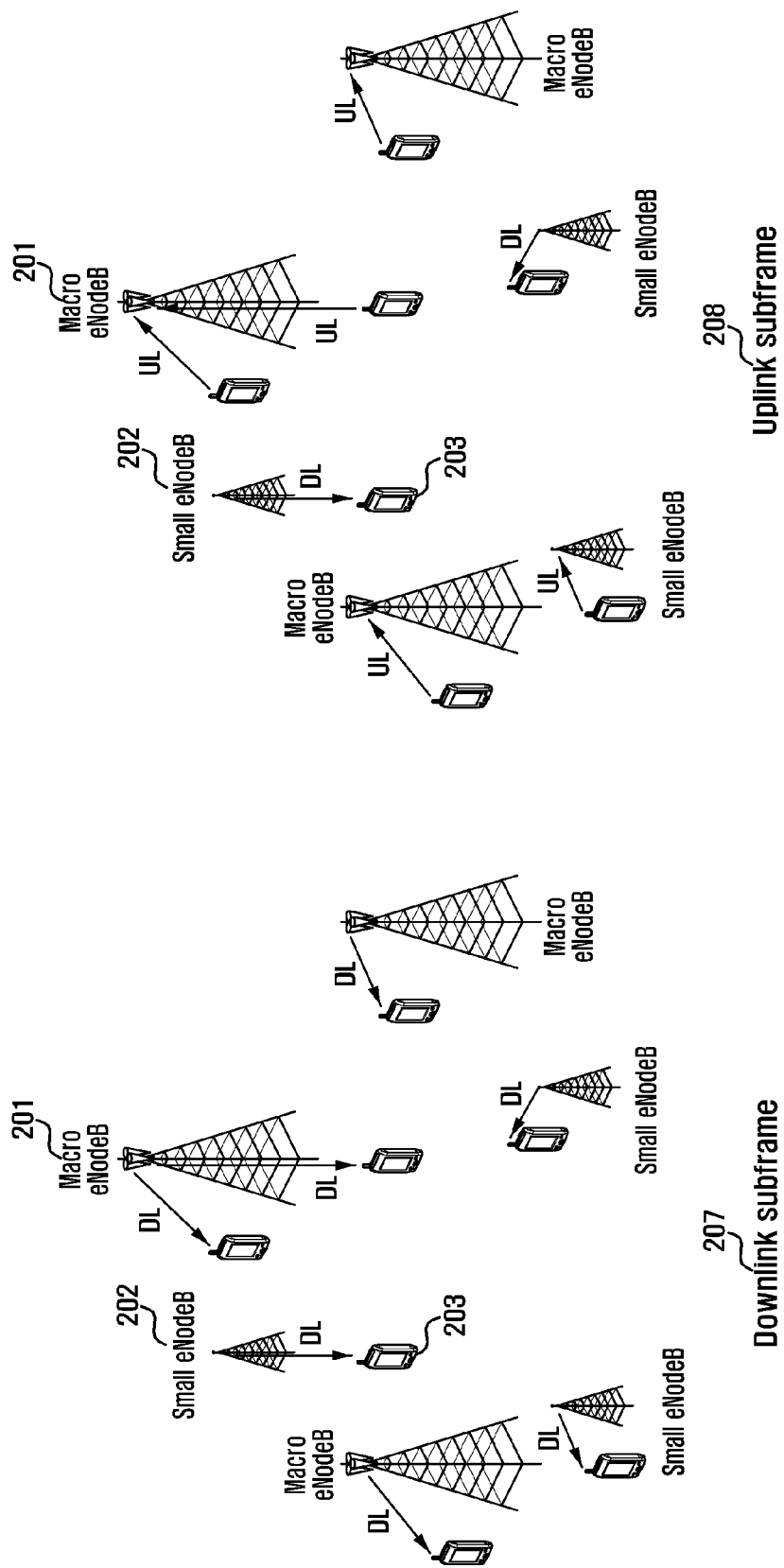
FIG. 2 is a conceptual diagram illustrating the system operating in the TDD mode according to another embodiment of the present invention.

FIG. 2 is a conceptual diagram illustrating the system operating in the TDD mode according to another embodiment of the present invention.

Referring to FIG. 2, the eNB 201 and its neighbor eNB 202 transmit downlink data at the time duration corresponding to the downlink subframe 207 of the eNB 201. As the downlink traffic amount increases, the eNB 202 determines whether to activate the flexible subframe mode to increase downlink resources. For the time duration corresponding to the downlink subframe 208 of the eNB 201, the eNB 202 operates in the flexible subframe mode. That is, the eNB 202 transmits downlink data for the time duration corresponding to the uplink subframe 208 of the eNB 201.

For the time duration corresponding to the uplink subframe 208 of the macro eNB 201, there exists at least a part of the time section in which uplink and downlink transmission takes place simultaneously in the system. The TDD system according to an aspect of the present invention configures the flexible subframe mode in consideration of the uplink and/or downlink data amount or traffic in order to improve resource utilization efficiency.

A description will now be made of the flexible subframe mode in detail with reference to FIGS. 5 and 6.

When a specific eNB and its neighbor eNBs are changed in TDD configuration in order to change the specific eNB's uplink and/or downlink resource amount, it may be difficult to consider the entire transmission efficiency of the system. According to an aspect of the present invention, the TDD system, eNB, and/or UE can support the method for changing TDD configuration dynamically according to the uplink data amount required in a specific cell while minimizing influence to the TDD configurations of other cells in the system. The candidate subframe is the subframe that is configured as a flexible subframe and corresponds to a time duration that can be used as one of the uplink and downlink time durations selectively. The flexible subframe (FlexSF) is the time duration configured for downlink transmission among the candidate subframes.

Figure 5:
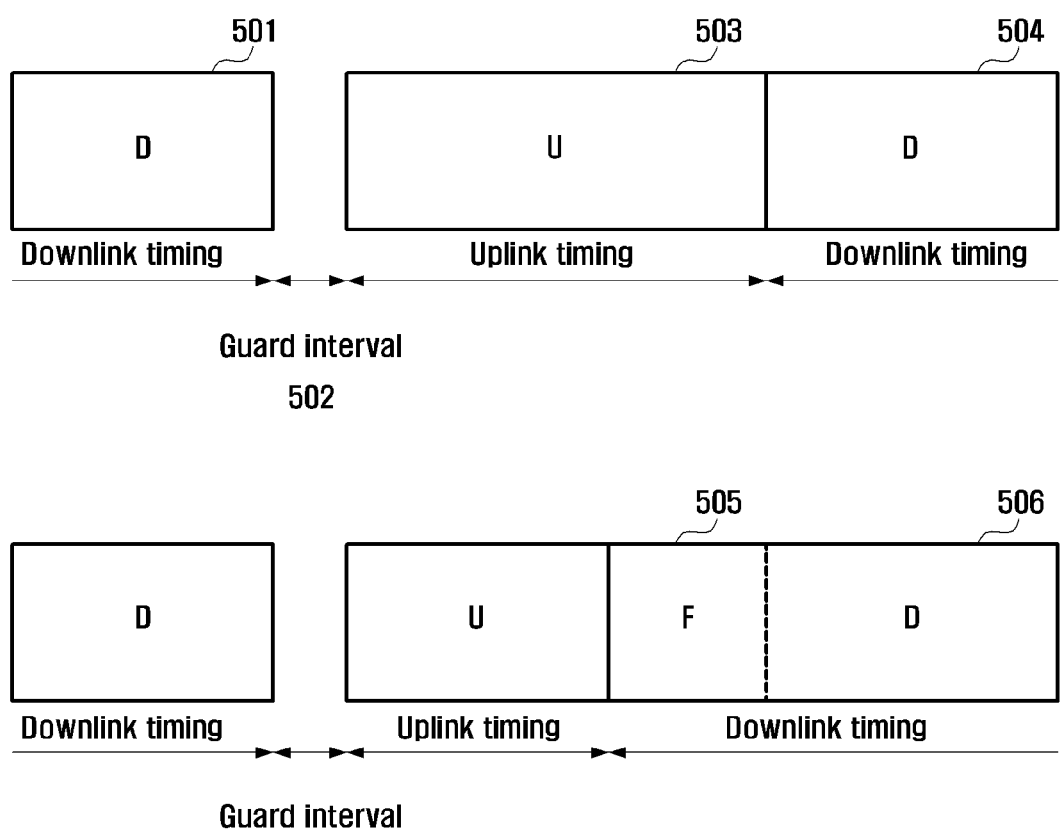
FIG. 5 is a diagram illustrating a principle of resource management of the TDD system in a time domain according to an embodiment of the present invention.

FIG. 5 is a diagram illustrating a principle of resource management of the TDD system in the time domain according to an embodiment of the present invention.

In FIG. 5, 'D' denotes downlink time durations 501, 504, and 506; 'U' denotes uplink time durations 503, and 'F' denotes a time duration 505 including at least one FlexSF. The downlink-to-uplink switch point can be positioned in the guard interval 502. The candidate subframe that may be configured as a flexible subframe can be configured as an uplink subframe in the TDD configuration selected in Table 1. That is, the candidate subframe is used as an uplink time duration when it is not designated as the flexible subframe. The UE acquires the channel information using the reference signal transmitted in downlink. The reference signal is the signal transmitted by the eNB at a predetermined time interval or periodically. Particularly, when the downlink subframe is changed for an uplink subframe or used for other purposes, it may make it difficult for the UE to estimate the downlink channel or decrease channel estimation accuracy. In the case in which the system transmits uplink and/or downlink scheduling information or control information in the downlink subframe, the legacy UE, which does not support the flexible subframe, may malfunction or undergo processing delay when the downlink subframe is used as the uplink subframe. Accordingly, the FlexSF can occupy at least a part of the time section in the uplink subframe or uplink time duration. For example, at least a part of the uplink time duration belonging to the first frame can be used as flexible subframe 505 belonging to the second frame. At this time, the eNB retains the information on the subframe that can be used as FlexSF in the uplink time duration 503 and uses the subframe as the FlexSF according to the uplink and/or downlink traffic state.

According to an aspect of the present invention, the TDD system, eNB, and/or UE supports the FlexSF and provides a mechanism for avoiding performance degradation or malfunctioning of the legacy UE which does not perceive the FlexSF.

The FlexSF 505 is the time duration used as the downlink time duration in the second frame which has been used as the uplink time duration in the first frame. If the FlexSF is positioned between the start and middle points of the uplink time duration 503, an extra guard interval 502 may be necessary between the uplink and downlink durations. Accordingly, in order to avoid the need for the extra guard interval, the FlexSF 505 can be arranged at the position where the end point of the FlexSF 505 and the end time point of the uplink time duration 503 match with each other, i.e. in the uplink time duration right before the downlink time duration 506. For example, if the FlexSF 505 is the $n^{th}$ subframe, the $(n+1)^{th}$ subframe is a downlink subframe.

FIG. 6 is a diagram illustrating a principle of resource management in time domain of the TDD system according to an embodiment of the present invention.

Reference number 601 denotes a frame structured according to the TDD configuration 3 in table 1 when FlexSF is not enabled. Among the uplink subframes constituting the frame 601, the $4^{th}$ subframe followed by the downlink time duration can be a candidate subframe, and the FlexSF 609 of the frame 602 is the $4^{th}$ subframe. Also, in frames 603 and 604 having multiple FlexSFs, the multiple FlexSFs can be consecutive subframes between a special subframe (S) and a downlink subframe (D) in the time domain. For example, if the subframe 610 is a FlexSF, the uplink subframe 611 following the subframe 610 can also be a FlexSF. According to this implementation, if the eNB notifies the UE that the subframe 610 is a FlexSF or if the UE identifies the subframe 610 as the FlexSF, the subframe 611 can be used as a FlexSF without extra information and/or signaling. That is, if p FlexSFs including the $n^{th}$ subframe (p is an integer) exist between a special subframe and the $(n+1)^{th}$ subframe— here, the $(n+1)^{th}$ subframe is the earliest downlink time duration after the special subframe—in a frame, the p FlexSFs are the subframes from $(n-p+1)^{th}$ to $n^{th}$ consecutive subframes in the time domain. Also, if the frame includes at least two uplink subframes spaced in time as the frame 605, the uplink time durations in the frames 606, 607, and 608 may include at least one FlexSF or may not. For example, there can be the two consecutive FlexSFs twice in the frame 608. That is, if the frame includes two special subframes, there can be two consecutive FlexSF pairs in the frame.

Figure 3:
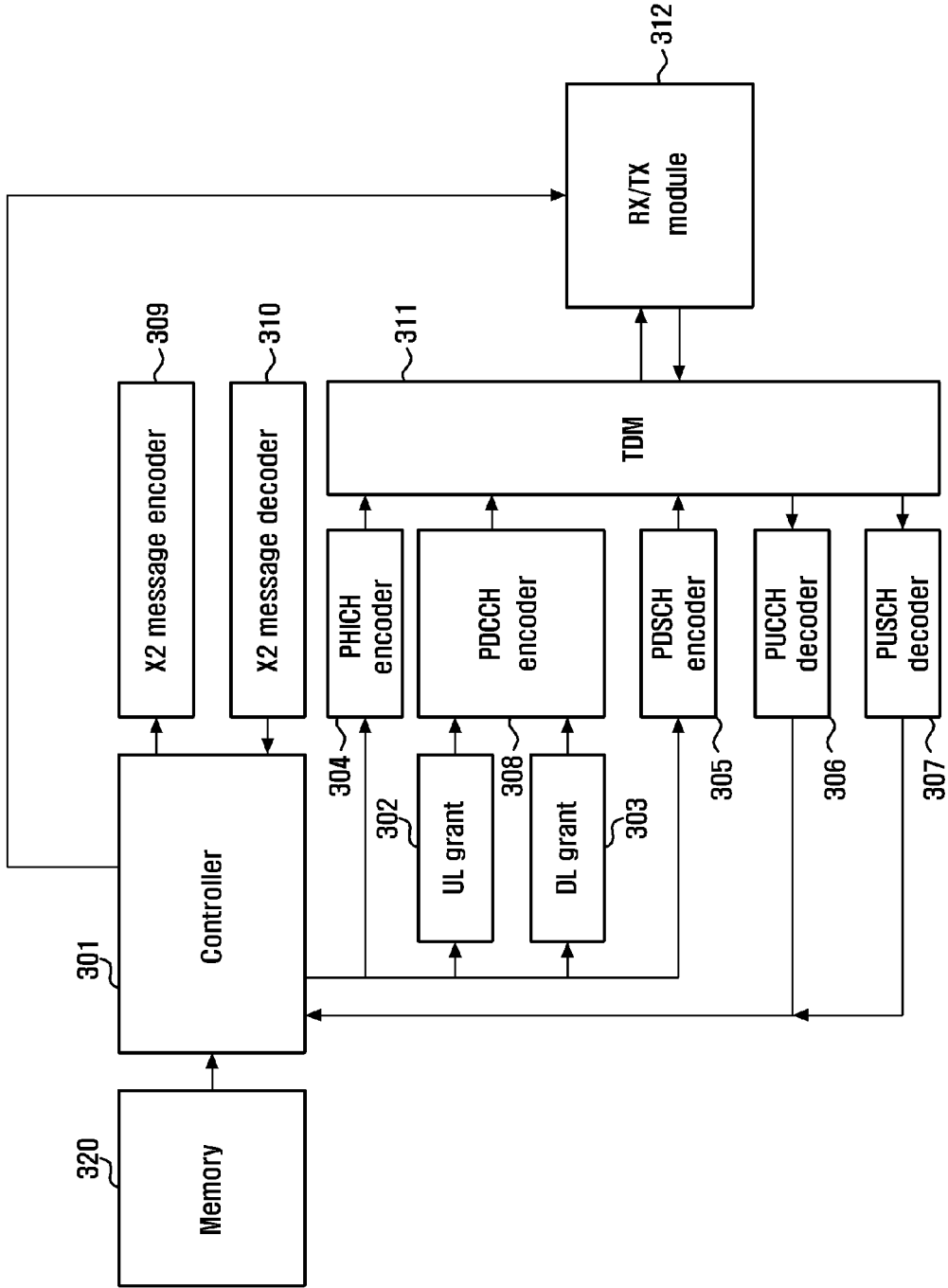
FIG. 3 is a block diagram illustrating a configuration of an eNB operating in the TDD mode according to an embodiment of the present invention.

Referring to FIG. 3, FIG. 3 is a block diagram illustrating a configuration of the eNB operating in TDD mode according to an embodiment of the present invention.

As shown in FIG. 3, the eNB includes a controller 301 and/or a transceiver module 312. The transceiver 312 includes a transmitter (not shown) and/or a receiver (not shown).

The transmitter and/or receiver can be integrated into a single hardware module as the transceiver. The transmitter and/or the receiver also can be implemented in the form of hardware modules, software modules, or combination of hardware and software separated in functionality. The transceiver 312 can include a Radio Frequency (RF) circuit and/or an antenna.

The eNB further includes a downlink scheduling information generator 303, a PUCCH decoder 306, a PUSCH decoder 307, a Time Division Multiplexer/Demultiplexer (hereinafter, referred to as TDM) 311, an X2 message encoder 309, and/or an X2 message decoder 310.

The receiver of the transceiver 312 receives the uplink data transmitted by a UE in the $n^{th}$ subframe of the first frame. Here, n is an integer. The transmitter of the transceiver 312 transmits downlink data to the UE in the $n^{th}$ subframe of the second frame following the first frame. The controller 301 identifies the $n^{th}$ subframe and/or flexible subframe. Here, the $n^{th}$ subframe is a time duration that can be used as one of the uplink or downlink time durations, selectively. That is, the $n^{th}$ subframe can be a candidate subframe that can be used as FlexSF. The $n^{th}$ subframe of the first frame is uplink time duration while the $n^{th}$ subframe of the second frame is the flexible subframe as the time duration activated as the downlink time duration among the time durations that are selectively used (i.e. candidate subframes).

The consecutive $n^{th}$ and $(n+1)^{th}$ subframes can be downlink time durations. If p flexible subframes including the $n^{th}$ subframe between a special subframe and the $(n+1)^{th}$ subframe exist in the second frame (n is an integer), the p flexible subframes can be the $(n-p+1)^{th}$ to $n^{th}$ subframes consecutive in time domain. For example, if at least one flexible subframe 610 and 611 is included in the frame 603 of FIG. 6, n is used as the index of the last subframe 611 among the consecutive flexible subframes.

The eNB further includes a memory 320. In the case in which a HARQ process operates in association with the uplink data transmitted by the UE in the uplink time duration, the memory 320 retains the information indicating the timing for transmitting HARQ acknowledgement corresponding to the UE's uplink data transmission based on the configuration information about the flexible subframe arrangement. In the case in which a HARQ process operates in association with the downlink data transmitted to the UE in the downlink time duration, the memory 320 retains the information indicating the transmission timing of the downlink data corresponding to the UE's HARQ acknowledgement based on the configuration information about the flexible subframe arrangement. The controller 301 accesses the information on the transmission timing of HARQ acknowledgement corresponding to the UE's uplink data transmission and/or the transmission timing of downlink data corresponding to the UE's HARQ acknowledgement. The controller 301 controls the transmission timing of HARQ acknowledgement corresponding to the uplink data received from the PUSCH decoder 307 and/or the transmission timing of the downlink data based on the information read from the memory 320. That is, the controller 301 controls the PHICH encoder 304, the TDM 311, and/or the transmitter of the transceiver 312 to transmit the HARQ acknowledgement (e.g. PHICH) according to the information read from the memory 320. The controller 301 also controls the PDSCH encoder 305, the TDM 311, and/or the transmitter of the transceiver 312 to transmit downlink data (e.g. PDSCH) according to the information read from the memory 302.

The TDM 311 performs time-division multiplexing on the data or signal generated by the PHICH encoder 304, the PDCCH encoder 308, and/or the PDSCH encoder 305. The TDM 311 also performs time-division demultiplexing on the PUSCH and/or PUSCH received from the transceiver 312. Here, the PUCCH includes the HARQ acknowledgement transmitted by the UE.

The transmitter of the transceiver 312 transmits to the UE the system information including the information indicating that the flexible subframe can be used. The $n^{th}$ subframe of the second frame is configured as a flexible subframe with the exclusion of the transmission of the uplink scheduling information at the $n^{th}$ subframe of the second frame. At this time, the controller 301 controls the uplink scheduling information generator 302, the TDM 311, and/or the PDCCH encoder 308. The configuration information on the subframe arrangement for use of flexible subframes including $n^{th}$ subframe is agreed upon between the eNB and the UE.

The $n^{th}$ subframe of the third frame following the second frame is released from the flexible subframe to return to the uplink time duration and the uplink scheduling information corresponding to the $n^{th}$ subframe of the third frame is transmitted. That is, if the uplink scheduling information corresponding to the subframe used as the flexible subframe is transmitted, the flexible subframe can be released to be the uplink time duration.

The p subframes consecutive in the time domain from the $(n-p+1)^{th}$ subframe to the $n^{th}$ subframe are configured as flexible subframes while the transmission of the uplink scheduling information corresponding to the $(n-p+1)^{th}$ subframe of the second frame is skipped.

The transmitter transmits the configuration information on the arrangement of subframes capable of being configured as flexible subframes through Radio Resource Control (RRC) signaling. The $n^{th}$ subframe of the second frame is configured as a flexible subframe while the transmission of the uplink scheduling information corresponding to the $n^{th}$ subframe of the second frame is skipped. The $n^{th}$ subframe of the third frame following the second frame is released from the flexible subframe to be the uplink time duration while the uplink scheduling information corresponding to the $n^{th}$ subframe of the third frame is transmitted. The $n^{th}$ subframe of the third frame following the second frame is released from the flexible subframe to be used as the uplink time duration through RRC signaling.

According to another aspect of the present invention, the $(n-1)^{th}$ subframe of the first frame can be a special subframe adjacent to the $n^{th}$ subframe (the special subframe includes a part of the downlink time duration, guard interval, and a part of uplink time duration). In the case in which there are q uplink subframes (q is an integer) between the $(n-1)^{th}$ subframe and the earliest downlink subframe appearing since the $(n-1)^{th}$ subframe, the q+1 consecutive subframes from the $(n-1)^{th}$ subframe to the $(n+q-1)^{th}$ subframe of the second frame are configured as flexible subframes. Here, the $(n-1)^{th}$ subframe of the second frame occupies at least a part of the downlink frequency region and the whole time duration of the $(n-1)^{th}$ subframe for transmitting downlink data to the UE. For example, if at least one flexible subframe (subframes 6, 7 and 8) is activated in FIG. 17, n of the frame 1701 is the index of the earliest uplink subframe (subframe 7) among the consecutive flexible subframes in the time domain.

The controller 301 can further include a scheduler (not shown). The scheduler of the controller 301 transfers the uplink and/or downlink scheduling information to the uplink scheduling information generator 302 and/or the downlink scheduling information generator 303. The controller 301 controls the X2 message encoder 309 to transmit a blanking mask signal carrying the information on the uplink and/or downlink subframes blocked against transmission to a neighbor eNB of the eNB of FIG. 3. The controller 301 also controls the X2 message decoder 310 to receive the blanking mask signal from the neighbor eNB. The X2 message is the message including the blanking mask signal which is exchanged between eNBs. The controller 301 configures the uplink (or downlink) subframe blocked against transmission among the candidate flexible subframes as a flexible subframe.

An overload indicator carrying the information on the frequency band interfered with by the neighbor eNB of the eNB of FIG. 3 and an interference indicator carrying the information on the frequency band interfering the neighbor eNB is received from the neighbor eNB. The controller 301 schedules downlink data on the frequency band having low interference first as compared to other frequency bands having relatively high interference in the time duration configured with flexible subframe based on at least one of the overload indicator and interference indicator. The overload indicator and/or the interference indicator can be transmitted/received through the X2 message encoder 309 and/or the X2 message decoder 310.

Figure 4:
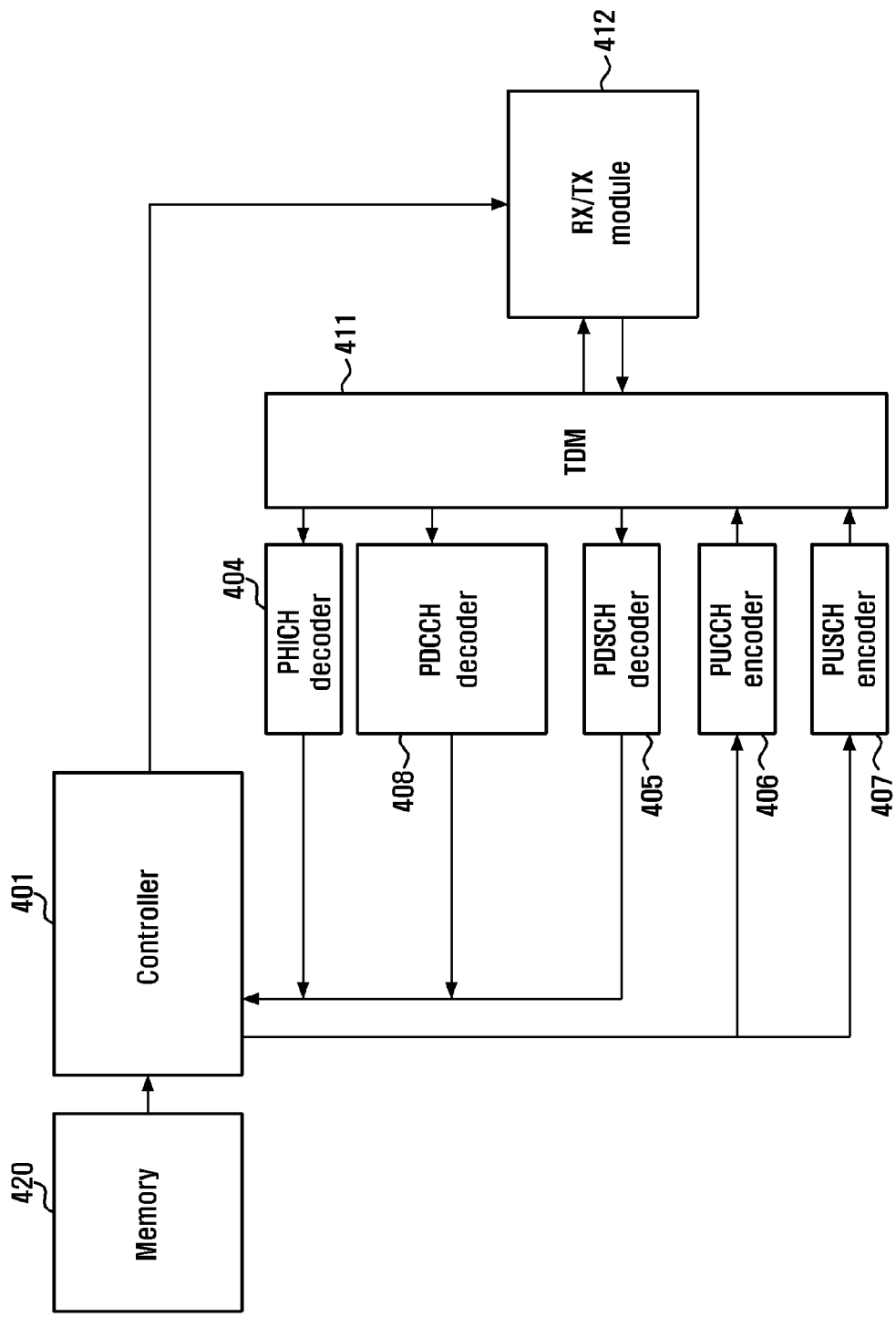
FIG. 4 is a block diagram illustrating a configuration of an UE operating in the TDD mode according to an embodiment of the present invention.

FIG. 4 is a block diagram illustrating a configuration of the UE operating in TDD mode according to an embodiment of the present invention.

As shown in FIG. 4, the UE includes a controller 401 and a transceiver module 412. The transceiver 412 includes a transmitter (not shown) and a receiver (not shown). The transmitter and/or receiver can be integrated into a single hardware module as the transceiver. The transmitter and/or the receiver also can be implemented in the form of hardware modules, software modules, or combination of hardware and software separated in functionality. The transceiver 412 can include a Radio Frequency (RF) circuit and/or an antenna.

The UE further includes a PHICH decoder 404, a PDCCH decoder 408, a PDSCH decoder 405, a PUCCH encoder 406, a PUSCH encoder 407, and/or a TDM 411.

The transmitter of the transceiver 412 transmits uplink data to the eNB at the $n^{th}$ subframe of the first frame. Here, n is an integer. The receiver of the transceiver 412 receives downlink data transmitted by the eNB at the $n^{th}$ subframe of the second frame following the first subframe.

The controller 401 identifies the $n^{th}$ subframe and/or flexible subframe. Here, the $n^{th}$ subframe is used as one of the uplink and downlink time durations, selectively. That is, the $n^{th}$ subframe can be a candidate subframe that can be used as the FlexSF. The $n^{th}$ subframe of the first frame is an uplink time duration while the $n^{th}$ subframe of the second frame is a flexible subframe representing the downlink-activated time duration among the selectively configurable time durations (i.e. candidate subframes). That is, if the $n^{th}$ subframe is not configured as a flexible subframe, it is used as an uplink time duration.

The $(n+1)^{th}$ subframe following the $n^{th}$ subframe is a downlink time duration. The first frame includes a special subframe. The $(n+1)^{th}$ subframe is the earliest downlink time duration appearing since the special subframe. If p flexible subframes (p is an integer) including the $n^{th}$ subframe exist between the special subframe and the $(n+1)^{th}$ subframe in the second frame, the p flexible subframes are the (n-p+1)th to $n^{th}$ subframe consecutive in the time domain.

The UE further includes a memory 420. In the case in which a HARQ process is activated for the downlink data transmitted to the eNB in the uplink time duration, the memory 420 retains the information on the uplink data transmission timing corresponding to at least one of the eNB's HARQ acknowledgement and retransmission scheduling information based on the configuration information related to the arrangement of the flexible subframes. The controller 401 accesses the information on the transmission timing of the uplink data corresponding to at least one of the eNB's HARQ acknowledgement and retransmission scheduling information in the memory 420. The controller 401 controls the transmission timing of the uplink data (e.g. PUSCH) corresponding to the eNB's HARQ acknowledgement provided by the PHICH decoder 404 and/or retransmission (or transmission) scheduling information provided by the PDCCH decoder 408, based on the information read from the memory 420. That is, the controller 401 controls the PUSCH encoder 407, the TDM 411, and/or the transmitter of the transceiver 412 to transmit the PUSCH according to the information read from the memory 420. The PUCCH encoder 406 encodes the PUCCH including the HARQ acknowledgement corresponding to the downlink data transmitted by the eNB.

The receiver of the transceiver 412 receives the system information including the information related to the use of the flexible subframe from the eNB. If no uplink scheduling information for the $n^{th}$ subframe of the second frame is received from the eNB, the controller 401 controls to receive the downlink data transmitted by the eNB in the $n^{th}$ subframe of the second frame. The configuration information on the arrangement of candidate subframes including the $n^{th}$ subframe is agreed upon between the eNB and the UE.

The receiver of the transceiver 412 receives the uplink scheduling information for the $n^{th}$ subframe of the third frame following the second subframe (here, the $n^{th}$ subframe of the second frame is used as the flexible subframe). At this time, the controller 401 perceives the uplink subframe released from the usage of the flexible subframe based on the uplink scheduling information received from the eNB. The controller 401 controls transmitting uplink data corresponding to the uplink scheduling information to the eNB at the $n^{th}$ subframe of the third frame which is released from the usage of the flexible subframe.

If the uplink scheduling information for the $(n-p+1)^{th}$ subframe of the second frame is not received from the eNB, p consecutive subframes from $(n-p+1)^{th}$ to $n^{th}$ subframes are activated as flexible subframes.

The receiver receives the configuration information including the arrangement of the candidate subframes from the eNB through RRC signaling. If no uplink scheduling information for the $n^{th}$ subframe of the second frame is received, the controller 401 controls receiving downlink data from the eNB at the $n^{th}$ subframe of the second frame. The $n^{th}$ subframe of the third frame following the second frame is released from the usage of the flexible subframe to be configured as the uplink time duration, and the uplink scheduling information for the $n^{th}$ subframe of the third frame is transmitted. Also, if the information on the release from the usage of the flexible subframe is received through RRC signaling, the $n^{th}$ subframe of the third frame following the second frame is released from the usage of the flexible subframe.

According to another aspect of the present invention, the $(n-1)^{th}$ subframe of the first frame can be a special subframe—including a part of the downlink time duration, guard interval, and a part of the uplink time duration—followed by the $n^{th}$ subframe. If q uplink subframes (q is an integer) exist between the $(n-1)^{th}$ subframe and the earliest downlink subframe appearing since $(n-1)^{th}$ subframe, the q+1 consecutive subframes, i.e. the $(n-1)^{th}$ to $(n+q-1)^{th}$ subframes, are configured as flexible subframes. Here, the $(n-1)^{th}$ subframe of the second frame occupies at least a part of the downlink frequency region and whole time duration of the $(n-1)^{th}$ subframe to be the time duration available for downlink data transmission to the UE.

A description will now be made of the flexible subframe use according to an aspect of an embodiment of the present invention with reference to FIGS. 7 to 9. The FlexSF utilization method can be divided into a method for configuring the FlexSF based on the uplink resource allocation information (or uplink transmission/retransmission scheduling information (hereinafter, referred to as UL grant) and a method for configuring the FlexSF through RRC signaling and UL grant or RRC signaling.

Figure 7:
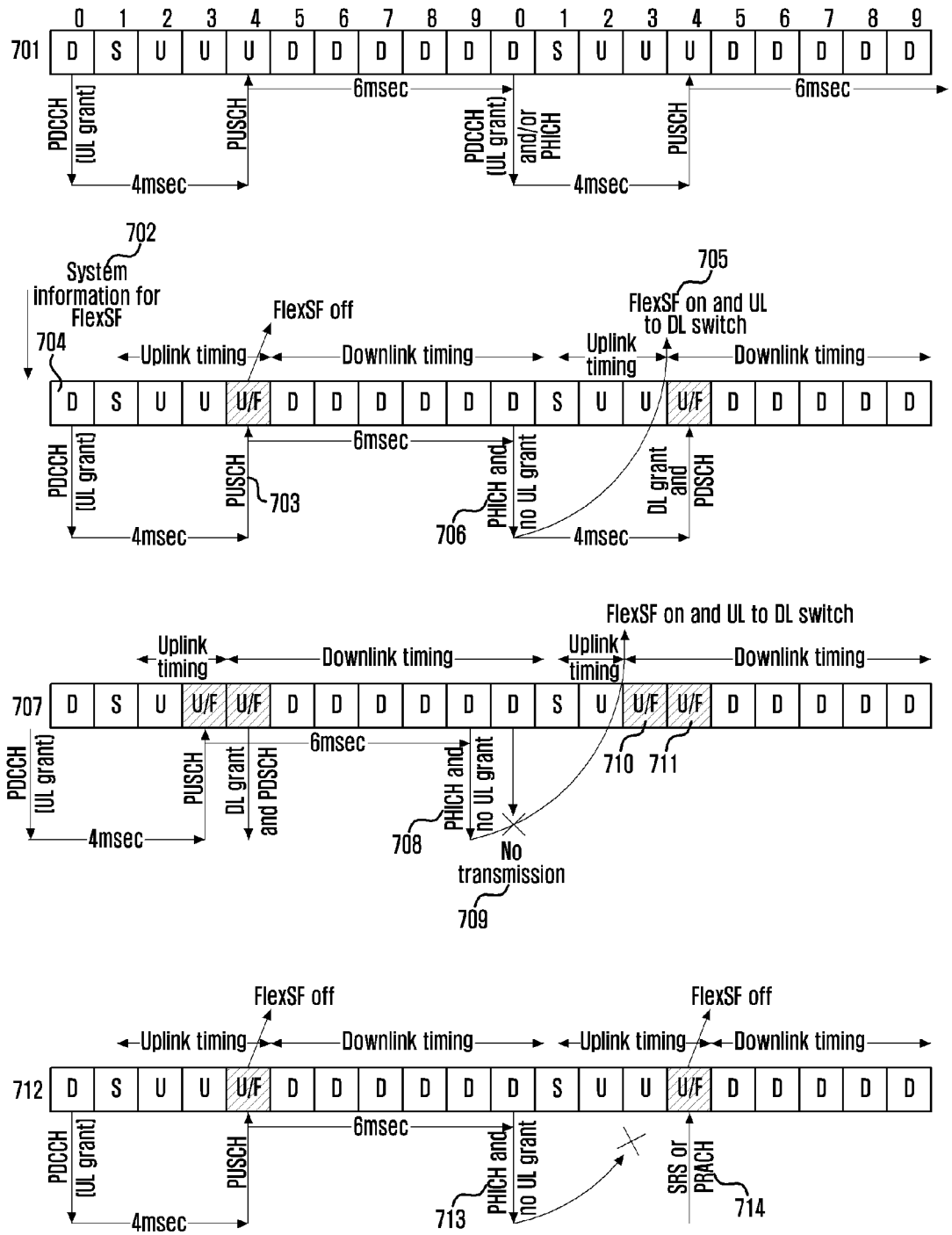
FIG. 7 is a diagram illustrating a principle of utilizing a flexible subframe with a UL grant according to an embodiment of the present invention.

FIG. 7 is a diagram illustrating a principle of utilizing the flexible subframe with the UL grant according to an embodiment of the present invention. Reference number 701 denotes two consecutive radio frames configured with the transmission/reception relationship of uplink scheduling information and data transmission in TDD configuration 3 when FlexSF is disabled. In the case in which the FlexSF is disabled, the PDCCH and PUSCH are transmitted/received as shown in the transmission/reception relationship in frame 701. According to the present invention, the legacy UE which does not support the FlexSF interprets the FlexSF as a normal subframe or is not aware of the use of the FlexSF. According to the present invention, the UE supporting FlexSF (e.g. 3GPP Release (Rel.) 11 UE) checks the uplink subframes that can be used as FlexSFs in advance. That is, the UE and the eNB share the information on the arrangement of the candidate flexible subframes in their memories according to the system standard.

The eNB transmits the information on the use of the FlexSF in the corresponding cell to the UE using the system information 702. The legacy UE (e.g. 3GPP Release (Rel.) 10 or earlier UE) cannot decode or check the FlexSF utilization information carried in the system information 702. The enhanced UE monitors reception of the uplink scheduling information for candidate flexible subframes in order to check the FlexSF utilization information and determine whether the FlexSF is enabled. That is, the eNB determines whether the UL grant for a specific subframe is transmitted to transmit the information on the FlexSF utilization for a specific subframe among the at least one candidate subframe. Since the uplink transmission (e.g. PUSCH) 703 is determined depending on whether the UL grant (e.g. PDCCH) 704 is transmitted in the downlink, the eNB can skip the transmission of UL grant in the downlink subframe 706 which can be activated for uplink transmission corresponding to the subframe 705. In the case in which the UL grant for the candidate flexible subframe (the UL grant assumed to be transmitted in the subframe 706) is not received, the enhanced UE can recognize the activation of the subframe 705 as a FlexSF and receive the data transmitted by the eNB in the subframe 705. The legacy UE cannot recognize the UL grant in the subframe 706 so as to not transmit uplink data in the subframe 705, whereby the eNB transmits downlink data in the subframe 705. In the case in which the frames 707 having consecutive candidate flexible subframes and no UL grant in the subframe 708, the subframe 710 is used as the FlexSF and the subframe 711 can be activated as the FlexSF along with the subframe 710 regardless of whether the UL grant is received in the subframe 709.

In order to deactivate the flexible subframe, the eNB transmits the UL grant for the corresponding subframe. For example, by transmitting the UL grant in the subframe #0 of the frame followed by the frame 712, the subframe #4 is released from the use of the FlexSF such that the UE can transmit PUSCH.

In the case in which there is a signal to be transmitted periodically such as a Physical Random Access CHannel (PRACH) and Sounding Reference Signal (SRS) in the uplink, the enhanced UE does not configure the subframe 714 as a FlexSF so as to be used for transmission of an uplink channel such as the PRACH or SRS even when no UL grant exists in the downlink subframe 713. In this manner, the UE can check the activation/deactivation of the FlexSF based on whether the UL grant exists, without extra information, so as to quickly prepare against the data traffic variations.

Figure 8:
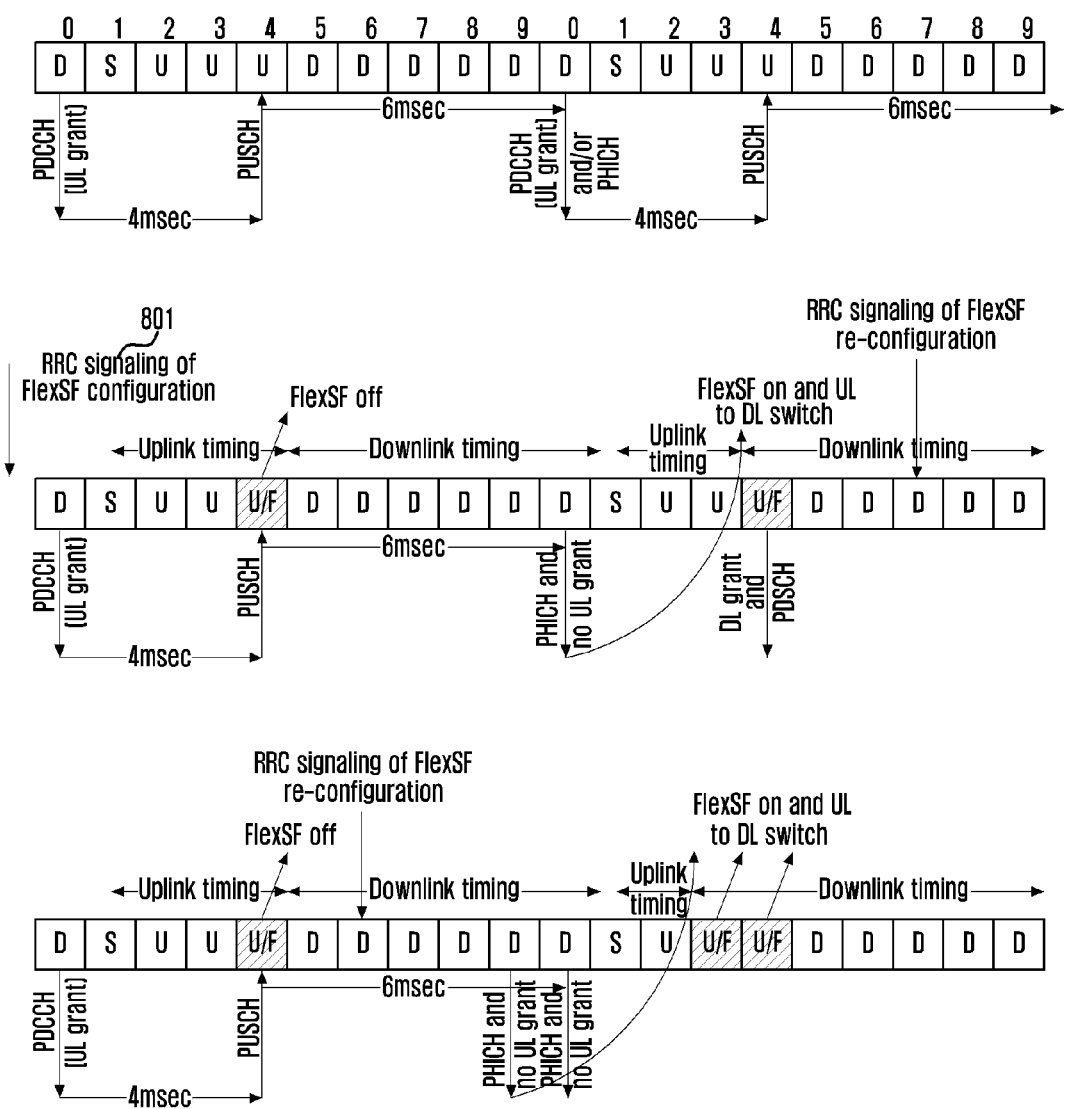
FIG. 8 is a diagram illustrating a principle of utilizing the flexible subframe with RRC signaling and UL grant according to an embodiment of the present invention.

FIG. 8 is a diagram illustrating a principle of utilizing the flexible subframe with the RRC signaling and UL grant according to an embodiment of the present invention. The eNB transmits the candidate flexible subframe configuration information and/or FlexSF utilization availability information to the UE through RRC signaling 801. The eNB also configures the candidate subframe as the FlexSF using the UL grant. Unlike the method using the system information including the FlexSF utilization availability information in which the configuration information on the candidate flexible subframe is shared between the eNB and UE as described with reference to FIG. 7, the method of FIG. 8 which uses the RRC signaling and UL grant is capable of changing the configuration information of the candidate subframe in such a way that the eNB transmits the candidate subframe-related information to the UE through RRC signaling 801.

In the case in which the PRACH or SRS is scheduled at a specific time point in the method of FIG. 7, the subframe in which the PRACH or SRS is scheduled cannot be used as the FlexSF, while in the method of FIG. 8, the cell or eNB can adjust the information on the subframe through RRC signaling 801 so as to avoid collision between uplink transmission of the PRACH or SRS and FlexSF utilization. Whether to use the candidate subframe as the FlexSF after RRC signaling 801 can be indicated by the UL grant. Since the operation based on the UL grant has been described above, a detailed description thereon is omitted herein.

Figure 9:
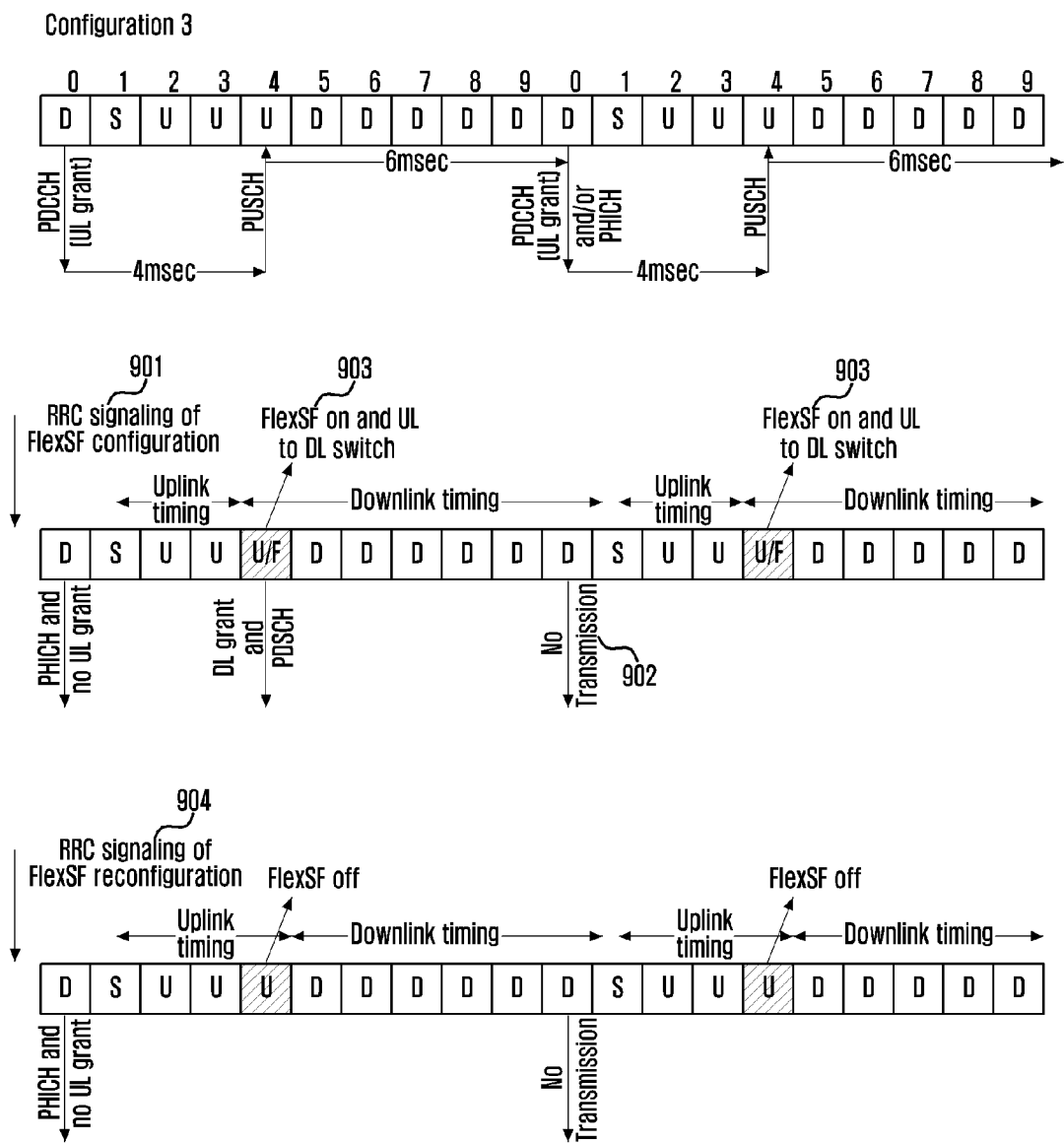
FIG. 9 is a diagram illustrating a principle of utilizing the flexible subframe with RRC signaling according to an embodiment of the present invention.

FIG. 9 is a diagram illustrating a principle of utilizing the flexible subframe with RRC signaling according to an embodiment of the present invention. In FIG. 9, the method based on the RRC signaling 901 transmits the FlexSF configuration information from the eNB to the enhanced UE through RRC signaling 901. If the FlexSF configuration information is received, the UE uses the subframe indicated by the FlexSF configuration information as downlink time duration 903 regardless of the existence of the UL grant for the corresponding subframe. If the FlexSF utilization is terminated, the eNB controls the UE to release the corresponding subframe from the use of the FlexSF through RRC signaling 904. When RRC signaling is used regardless of the receipt of the UL grant, it is possible to avoid the problem caused by a UL grant reception error.

A description will now be made of the HARQ timing relationship according to an embodiment of the present invention with reference to FIGS. 10 to 17. With the introduction of FlexSF, it becomes necessary to provide the eNB and/or UE with information on the HARQ-related data and/or signal transmission/reception relationship information. The HARQ timing relationship can include the transmission timing of the eNB's HARQ acknowledgement or PUSCH corresponding to the retransmission scheduling information in association with the utilization of FlexSF, the eNB's HARQ acknowledgement timing corresponding to the PUSCH transmission, and/or the eNB's data transmission timing corresponding to the UE's HARQ acknowledgement. The eNB and/or UE supporting FlexSF retains the information on the HARQ timing relationship in the memory, accesses the information in the memory according to the TDD configuration and/or whether to use FlexSF to control or identify the transmission/reception timing of the HARQ-related data and/or signal transmission/reception timing. The eNB and/or UE supporting FlexSF can acquire the information on the HARQ timing relationship using a function or equation.

FIGS. 10 to 14 are diagrams illustrating HARQ timing relationships in the TDD system supporting flexible subframe configuration according to an embodiment of the present invention.

Figure 10:
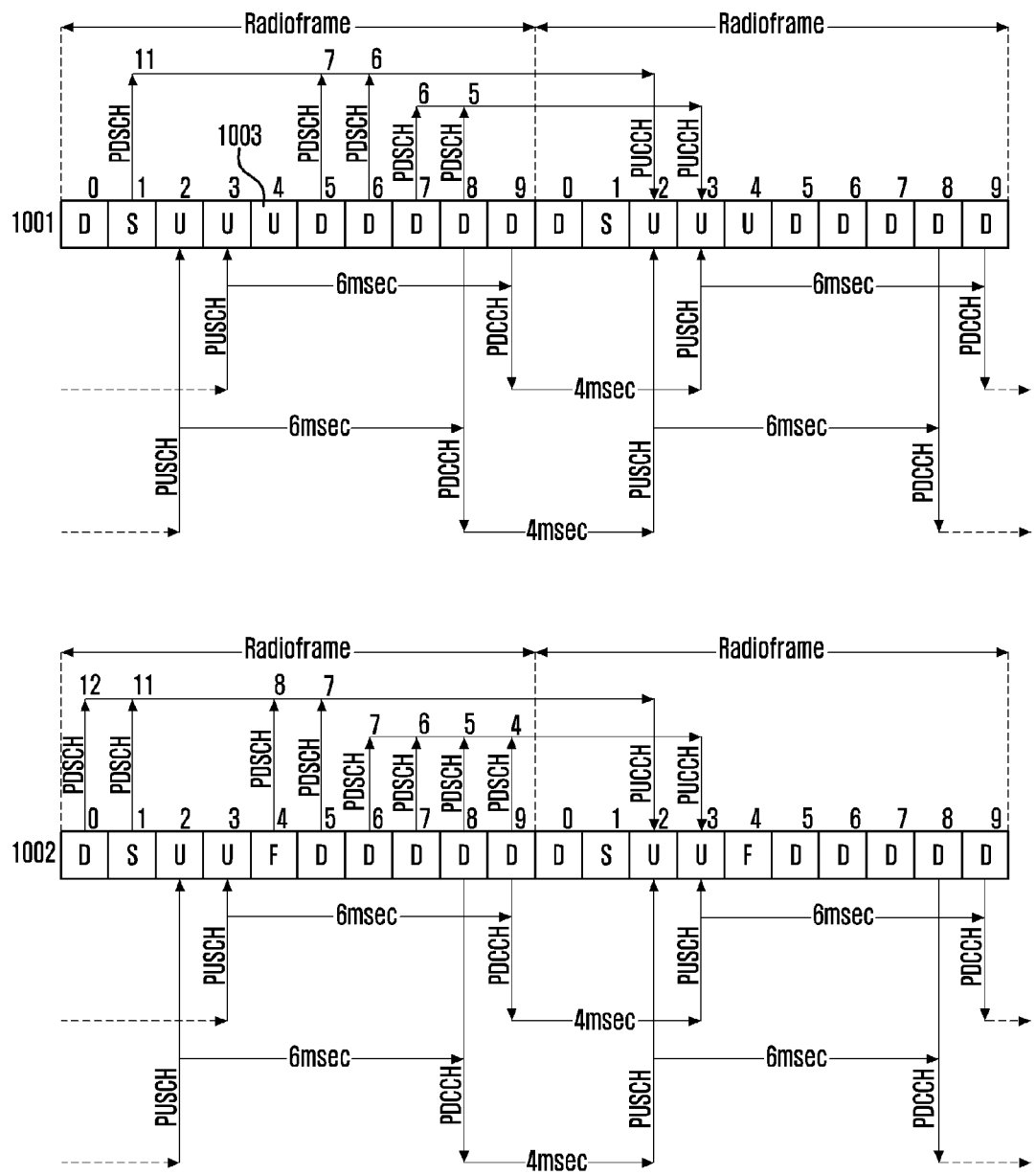
FIG. 10 is a diagram illustrating a HARQ timing relationship of the system operating in TDD configuration 3 supporting FlexSF in units of subframes according to an embodiment of the present invention.

FIG. 10 is a diagram illustrating the HARQ timing relationship of the system operating in TDD configuration 3 supporting FlexSF in units of subframes according to an embodiment of the present invention. Reference number 1001 denotes two consecutive radio frames configured with the HARQ timing relationship as the information identified by the eNB and/or UE (enhanced UE or legacy UE) when FlexSF is not configured or the information identified by the UE not supporting FlexSF when FlexSF is configured. Reference number 1002 denotes two consecutive radio frames configured with a HARQ timing relationship identified by the eNB supporting FlexSF and/or enhanced UE. If one uplink subframe is configured as the FlexSF, no UL grant for the legacy UE is transmitted at the corresponding uplink subframe such that the uplink HARQ process is not used. Accordingly, although the fourth subframe configured as the FlexSF is shown in the frames 1001, the legacy UE does not perform uplink transmission such that the system operates without error regardless of the use of the FlexSF. In the frames 1002, the enhanced UE operates in the same manner with the legacy UE at the uplink subframe. However, if the number of subframes for downlink transmission increases due to the configuration of the FlexSF, the downlink transmission and/or HARQ timing relationship can be changed as shown in the frames 1002. The HARQ timing relationship can be defined as shown in Tables 4, 5, and/or 6.

TABLE 5

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 3 | | | | | | | 6 | | 6 | 6 |
| 3-1flexSF | NA | | | | | | | | 6 | 6 |
| 3-2flexSF | NA | | | | | | | | 6 | NA |
| 3-3flexSF | NA | | | | | | | | NA | NA |

Table 5 shows the PUSCH transmission timing i–k for the eNB's HARQ acknowledgement or retransmission scheduling information. In Table 5, assuming that the eNB's HARQ acknowledgement (e.g. PHICH) or retransmission scheduling information (e.g. PDCCH) transmission timing is the $i^{th}$ subframe, the UE's data (e.g. PUSCH) transmission timing corresponding to the $i^{th}$ subframe is the $(i-k)^{th}$ subframe. Here, k can be one of the values in Table 5. In Table 5, 3-1flexSF denotes use of 1 FlexSF in the TDD configuration 3 frame, 3-2flexSF denotes use of 2 FlexSFs in the TDD configuration 3 frame, and 3-3flexSF denotes use of 3 FlexSFs in the TDD configuration 3 frame. NA denotes that the corresponding value is not available due to the FlexSF configuration.

TABLE 6

| TDD UL/DL Config- | UL subframe index n | | | | | | | | | |
|---|---|---|---|---|---|---|---|---|---|---|
| uration | 0 | 1 | 2 | 3 | 4 | 5 | 6 | 7 | 8 | 9 |
| 3 | | | 6 | 6 | 6 | | | | | |
| 3-1flexSF | | | 6 | 6 | F | | | | | |
| 3-2flexSF | | | 6 | F | F | | | | | |
| 3-3flexSF | | | F | F | F | | | | | |

Table 6 shows the timing n+j for eNB's HARQ acknowledgement transmission corresponding to the PUSCH transmission. In Table 6, assuming that the UE's data (e.g. PUSCH) transmission/retransmission timing is the $n^{th}$ subframe, the eNB's HARQ acknowledgement transmission timing is the $(n+j)^{th}$ subframe. Here, j can be one of the values in Table 6. In Table 6, 'F' denotes the subframe index for uplink subframe in TDD configuration 3 and is used to indicate the skip of the PUSCH transmission because the corresponding subframe is configured as FlexSF.

TABLE 7

| UL-DL Config- | Subframe m | | | | | | | | | |
|---|---|---|---|---|---|---|---|---|---|---|
| uration | 0 | 1 | 2 | 3 | 4 | 5 | 6 | 7 | 8 | 9 |
| 3 | — | — | 7, 6, 11 | 6, 5 | 5, 4 | — | — | — | — | — |
| 3-1flexSF | — | — | 12 8, 7 11 | 6, 5, 4 7 | — | — | — | — | — | — |
| 3-2flexSF | — | — | 13 12 9, 8 7, 5, 4, 11, 6 | — | — | — | — | — | — | — |
| 3-3flexSF | — | — | 7 | 7 | 5 | — | — | 7 | 7 | — |

Table 7 shows the eNB's data transmission timing m–{k} corresponding to the UE's HARQ acknowledgement. In Table 7, assuming that the UE's HARQ acknowledgement transmission timing is m, the eNB's downlink data and/or downlink scheduling information transmission timing is m−{k}. Here, the set {k} can be one of the sets of values in Table 7.

Figure 11:
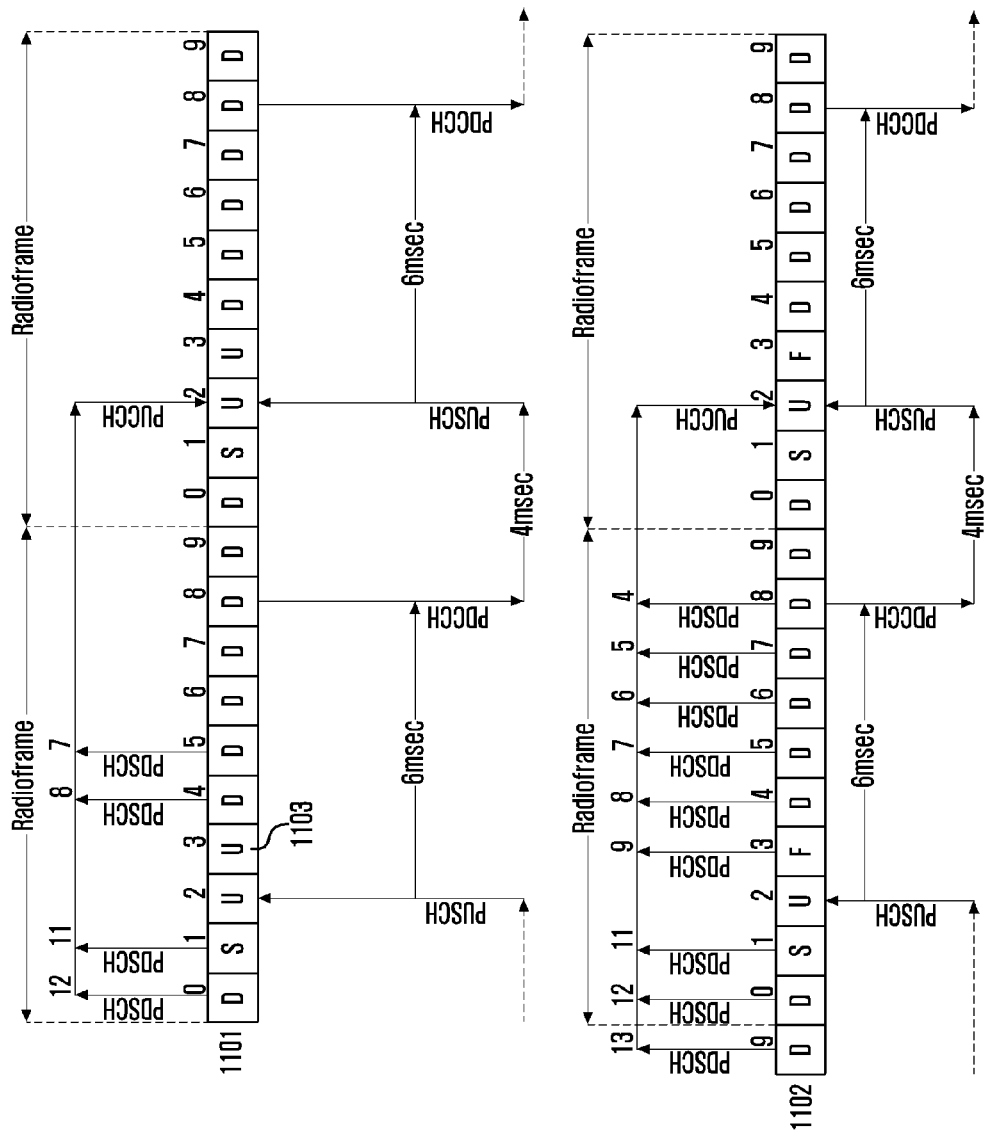
FIG. 11 is a diagram illustrating the HARQ timing relationship of the system operating in TDD configuration 4 supporting FlexSF in units of subframes according to an embodiment of the present invention.

FIG. 11 is a diagram illustrating the HARQ timing relationship of the system operating in TDD configuration 4 supporting FlexSF in units of subframes according to an embodiment of the present invention. Reference number 1101 denotes two consecutive radio frames configured with the HARQ timing relationship identified by the eNB and/or the UE (enhanced UE or legacy UE) when FlexSF is disabled or identified by a UE not supporting FlexSF when the FlexSF is enabled. Reference number 1102 denotes two consecutive radio frames configured with the HARQ timing relationship identified by the eNB and/or enhanced UE supporting FlexSF. In TDD configuration 4, the number of candidate flexible subframes can be 2. If the subframe of index 3 is configured as the FlexSF in the subframes 1102, the downlink transmission and/or HARQ timing relationship can be determined as shown in the frames 1102, unlike the TDD configuration 4 of the frames 1101. The HARQ timing relationship is defined as shown in Tables 8, 9, and/or 10.

TABLE 8

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 4 | | | | | | | | | 6 | 6 |
| 4-1flexSF | NA | | | | | | | | 6 | NA |
| 4-2flexSF | NA | | | | | | | | NA | NA |

Table 8 shows the PUSCH transmission timing i−k corresponding to the eNB's HARQ acknowledgement or retransmission scheduling information. In Table 8, assuming that the eNB's HARQ acknowledgement (e.g. PHICH) or retransmission scheduling information (e.g. PDCCH) transmission timing is the $i^{th}$ subframe, the UE's data (e.g. PUSCH) transmission timing corresponding to the $i^{th}$ subframe is the $(i-k)^{th}$ subframe. Here, k can be one of the values in Table 8. In Table 8, 4-1flexSF denotes use of 1 FlexSF in the TDD configuration 4 frame, and 4-2 FlexSF denotes use of 2 FlexSFs in the TDD configuration 4 frame. NA denotes that the corresponding value is not available due to the FlexSF configuration.

TABLE 9

| TDD UL/DL Config- | UL subframe index n | | | | | | | | | |
|---|---|---|---|---|---|---|---|---|---|---|
| uration | 0 | 1 | 2 | 3 | 4 | 5 | 6 | 7 | 8 | 9 |
| 4 | | | 6 | 6 | F | | | | | |
| 4-1flexSF | | | 6 | F | F | | | | | |
| 4-2flexSF | | | F | F | F | | | | | |

Table 9 shows the eNB's HARQ acknowledgement timing n+j corresponding to a PUSCH transmission. In Table 9, assuming that the UE's data (e.g. PUSCH) transmission/retransmission timing is the $n^{th}$ subframe, the eNB's HARQ acknowledgement transmission timing is $(n+j)^{th}$ subframe. Here, j can be one of the values in Table 9. In Table 9, 'F' denotes the subframe carrying no PUSCH.

TABLE 10

| UL-DL Config- | Subframe m | | | | | | | | | |
|---|---|---|---|---|---|---|---|---|---|---|
| uration | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 4-1flexSF | — | — | 13, 12, 9 8, 7 5, 4 11 6 | — | — | — | — | — | — | — |
| 4-2flexSF | — | — | 7 | 7 | 5 | — | — | 7 | 7 | — |

Table 10 shows the eNB's data transmission timing m−{k} corresponding to the UE's HARQ acknowledgement. In Table 10, assuming that the UE's HARQ acknowledgement timing is m, the eNB's downlink data and/or downlink scheduling information transmission is m−{k}. Here, the set {k} can be one of the sets of values in Table 10.

Figure 12:
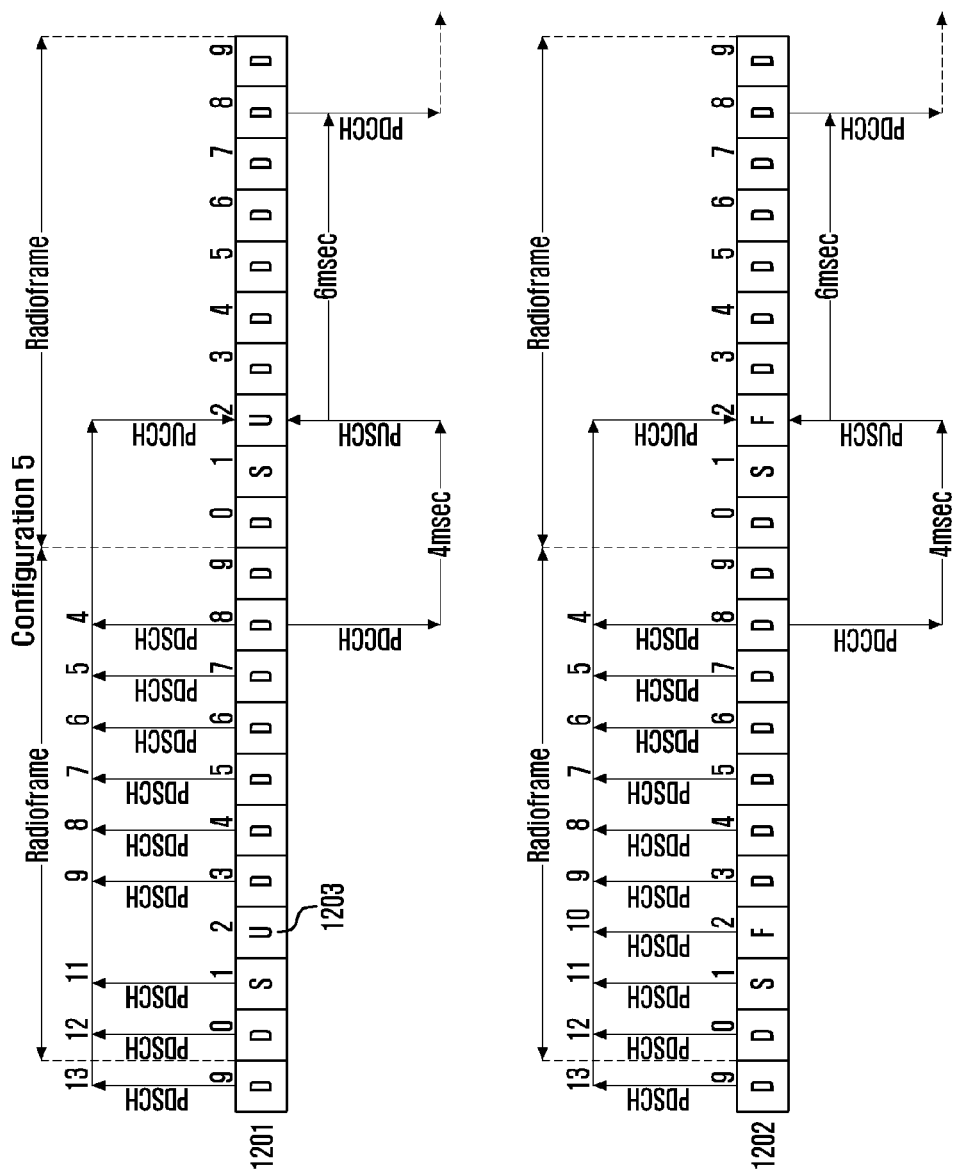
FIG. 12 is a diagram illustrating the HARQ timing relationship of the system operating in TDD configuration 5 supporting FlexSF in units of subframes according to an embodiment of the present invention.

FIG. 12 is a diagram illustrating the HARQ timing relationship of the system operating in TDD configuration 5 supporting FlexSF in units of subframes according to an embodiment of the present invention. Reference number 1201 denotes two consecutive radio frames configured with the HARQ timing relationship identified by the eNB and/or the UE when the FlexSF is disabled or identified by the UE not supporting FlexSF when the FlexSF is enabled. Reference number 1202 denotes two consecutive radio frames configured with the HARQ timing relationship identified by the eNB and/or the enhanced UE supporting the FlexSF. In TDD configuration 5, the number of subframes that can be configured as FlexSF is 1. If the subframe of index 3 in the frames 1202 is configured as the FlexSF, the HARQ transmission timing for the downlink transmission time duration added due to the use of the FlexSF can be determined, and the new HARQ timing relationship is of the frames 1102. In the case in which one uplink time duration is configured as the FlexSF in TDD configuration 5, the subframe configured as the FlexSF is dynamically changed to the uplink subframe but not maintained as the FlexSF. The HARQ timing relationship is defined as shown in Tables 11, 12, and/or 13.

TABLE 11

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 5 | | | | | | | | | 6 | NA |
| 5-1flexSF | NA | | | | | | | | NA | NA |

Table 11 shows the PUSCH transmission timing i+k corresponding to the eNB's HARQ acknowledgement or retransmission scheduling information. In Table 11, assuming the eNB's HARQ acknowledgement (e.g. PHICH) or retransmission scheduling information (e.g. PDCCH) transmission timing is dynamically $i^{th}$ subframe, the UE's data (e.g. PUSCH) transmission timing corresponding to the $i^{th}$ subframe is the $(i−k)^{th}$ subframe. Here, k can be one of the values in Table 11. In Table 11, 5-1flexSF denotes use of 1 FlexSF in the TDD configuration 5 frame. NA denotes that the corresponding value is not available due to the FlexSF configuration.

TABLE 12

| TDD UL/DL Config-uration | UL subframe index n | | | | | | | | | |
|---|---|---|---|---|---|---|---|---|---|---|
| | 0 | 1 | 2 | 3 | 4 | 5 | 6 | 7 | 8 | 9 |
| 5 | | | 6 | F | F | | | | | |
| 5-1flexSF | | | F | F | F | | | | | |

Table 12 shows the eNB's HARQ acknowledgement transmission timing n+j corresponding to a PUSCH transmission. In Table 12, assuming the UE's data (e.g. PUSCH) transmission/retransmission timing is the $n^{th}$ subframe, the eNB's HARQ acknowledgement timing is the $(n+j)^{th}$ subframe. Here, j can be one of the values in Table 12. In Table 12, 'F' denotes the subframe carrying no PUSCH.

TABLE 13

| UL-DL Config-uration | Subframe m | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 5-1flexSF | — | — | 7 | 7 | 5 | — | — | 7 | 7 | — |

Table 13 shows the eNB's data transmission timing m−{k} corresponding to the UE's HARQ acknowledgement. In Table 13, assuming that the UE's HARQ acknowledgement timing is m, the eNB's downlink data and/or downlink scheduling information transmission is m−{k}. Here, the set {k} can be one of the sets of values in Table 13.

Figure 13:
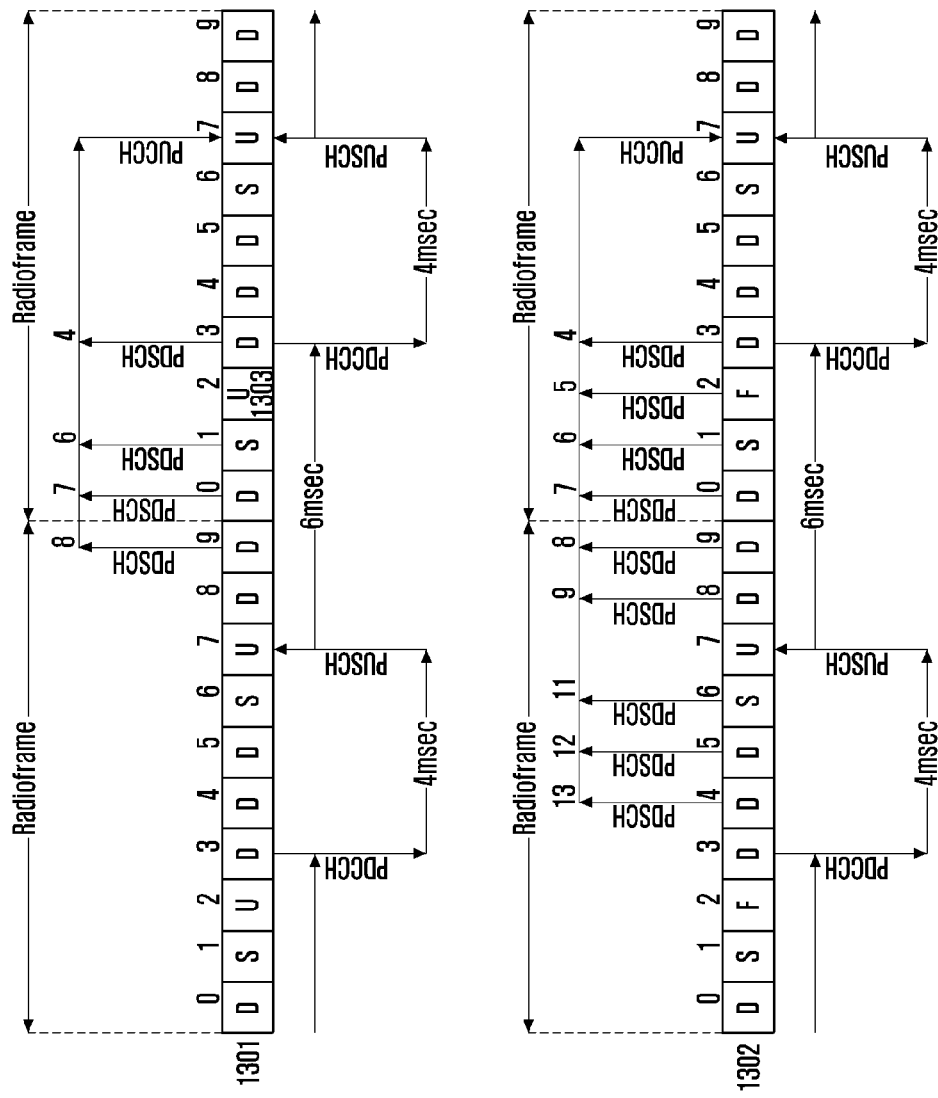
FIG. 13 is a diagram illustrating the HARQ timing relationship of the system operating in TDD configuration 2 supporting FlexSF in units of subframes according to an embodiment of the present invention.

FIG. 13 is a diagram illustrating the HARQ timing relationship of the system operating in TDD configuration 2 supporting FlexSF in units of subframes according to an embodiment of the present invention. Reference number 1301 denotes two consecutive radio frames configured with the HARQ timing relationship identified by the eNB and/or the UE when the FlexSF is disabled or identified by the UE not supporting the FlexSF when the FlexSF is enabled. Reference number 1302 denotes two consecutive radio frames configured with the HARQ timing relationship identified by the eNB and/or the enhanced UE supporting the FlexSF. In TDD configuration 2, the number of subframes that can be configured as the FlexSF in one radio frame (or frame) is 2. In the case in which the FlexSF is enabled, up to two FlexSFs can be configured but not in a consecutive manner in the time domain. The frames 1302 are configured with the HARQ timing relationship when one FlexSF is enabled. The HARQ timing relationship is defined as shown in Tables 14, 15, and/or 16.

TABLE 14

| TDD UL/DL Config-uration | DL subframe number i | | | | | | | | | |
|---|---|---|---|---|---|---|---|---|---|---|
| | 0 | 1 | 2 | 3 | 4 | 5 | 6 | 7 | 8 | 9 |
| 2 | | | | 6 | | | | | 6 | |
| 2-1lefthalf | | | | NA | | | | | 6 | |
| 2-1righthalf | | | | 6 | | | | | NA | |
| 2-2flexSF | | | | NA | | | | | NA | |

Table 14 shows the PUSCH transmission timing i−k corresponding to the eNB's HARQ acknowledgement or retransmission scheduling information. In Table 14, assuming the eNB's HARQ acknowledgement (e.g. PHICH) or retransmission scheduling information (e.g. PDCCH) transmission timing is the $i^{th}$ subframe, the UE's data (e.g. PUSCH) transmission timing corresponding to the $i^{th}$ subframe is the $(i-k)^{th}$ subframe. Here, k can be one of the values in Table 14. In Table 14, 2-1lefthalf denotes use of one FlexSF in the first half of the TDD configuration 2 frame (i.e. the subframe of index 2), and 2-2righthalf denotes use of one FlexSF in the last half of the TDD configuration 2 frame (i.e. the subframe of index 7). NA denotes that the corresponding value is not available due to the FlexSF configuration.

TABLE 15

| TDD UL/DL Config-uration | UL subframe index n | | | | | | | | | |
|---|---|---|---|---|---|---|---|---|---|---|
| | 0 | 1 | 2 | 3 | 4 | 5 | 5 | 7 | 8 | 9 |
| 2 | | | 6 | | | | | 6 | | |
| 2-1lefthalf | | | F | | | | | 6 | | |
| 2-1righthalf | | | 6 | | | | | F | | |
| 2-2flexSF | | | F | | | | | F | | |

Table 15 shows the eNB's HARQ acknowledgement transmission timing n+j corresponding to a PUSCH transmission. In Table 15, assuming the UE's data (e.g. PUSCH) transmission/retransmission timing is the $n^{th}$ subframe, the eNB's HARQ acknowledgement timing can be the $(n+j)^{th}$ subframe. Here, j can be one of the values in Table 15. In Table 15, 'F' denotes the subframe carrying no PUSCH.

TABLE 16

| UL-DL Config-uration | Subframe m | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 2-1lefthalf | — | — | | | | | | −13, 12, 9, 8, 7, 5, 4, 11, 6 | — | — |
| 2-1righthalf | — | — | 13, 12, 9 8, 7 5, 4 11, 6 | | | | | | | |

Table 16 shows the eNB's data transmission timing m−{k} corresponding to the UE's HARQ acknowledgement. In Table 16, assuming the UE's HARQ acknowledgement timing is m, the eNB's downlink data and/or downlink scheduling information transmission is m−{k}. Here, the set {k} can be one of the sets of values in Table 16.

Figure 14:
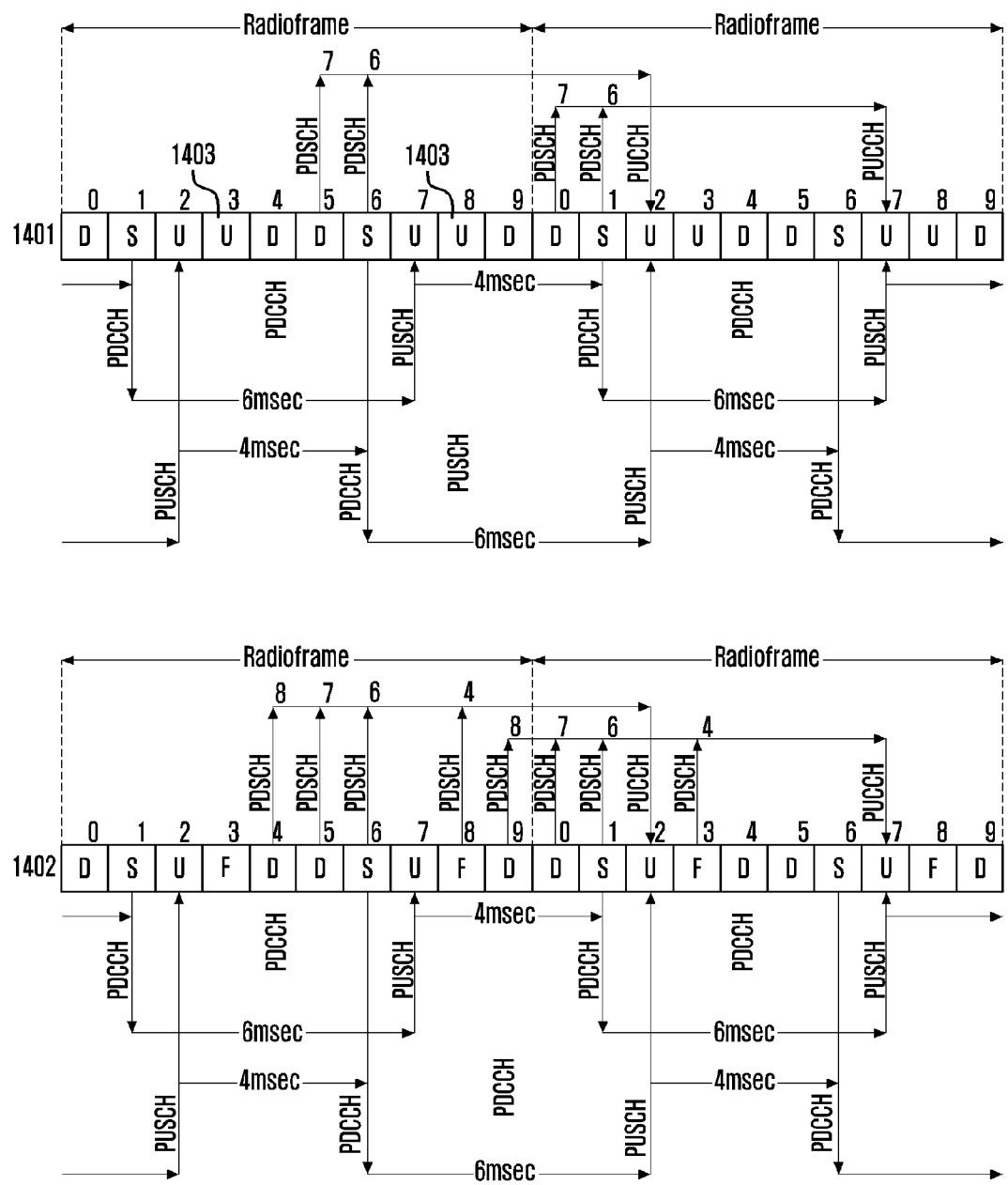
FIG. 14 is a diagram illustrating the HARQ timing relationship of the system operating in TDD configuration 1 supporting FlexSF in units of subframes according to an embodiment of the present invention.

FIG. 14 is a diagram illustrating the HARQ timing relationship of the system operating in TDD configuration 1 supporting FlexSF in units of subframes according to an embodiment of the present invention. Reference number 1401 denotes two consecutive radio frames configured with the HARQ timing relationship identified by the eNB and/or the UE when the FlexSF is disabled or identified by the UE not supporting the FlexSF when the FlexSF is enabled. Reference number 1402 denotes two consecutive radio frames configured with the HARQ timing relationship identified by the eNB and/or the enhanced UE supporting the FlexSF. In TDD configuration 1, two subframes can be configured as FlexSFs in one radio frame as shown in the frames 1402. The HARQ timing relationship is defined as shown in Tables 17, 18, and/or 19.

TABLE 17

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 1 |  |  |  |  | 4 |  | 6 |  | 4 |  |
| 1-2flexSF |  |  |  |  |  |  | NA |  |  | NA |

Table 17 shows the PUSCH transmission timing i−k corresponding to the eNB's HARQ acknowledgement or retransmission scheduling information. In Table 17, assuming the eNB's HARQ acknowledgement (e.g. PHICH) or retransmission scheduling information (e.g. PDCCH) transmission timing is the $i^{th}$ subframe, the UE's data (e.g. PUSCH) transmission timing corresponding to the $i^{th}$ subframe is the $(i-k)^{th}$ subframe. Here, k can be one of the values in Table 17. In Table 17, 1-2flexSF denotes the use of 2 FlexSFs in the TDD configuration 1 frame (i.e. the subframe of indices 3 and 8). NA denotes that the corresponding value is not available due to the FlexSF configuration.

TABLE 18

| TDD UL/DL Config- | UL subframe index n | | | | | | | | | |
|---|---|---|---|---|---|---|---|---|---|---|
| uration | 0 | 1 | 2 | 3 | 4 | 5 | 6 | 7 | 8 | 9 |
| 1 |  |  | 4 | 6 |  |  |  | 4 | 6 |  |
| 2 |  |  | 4 | F |  |  |  | 4 | F |  |

Table 18 shows the eNB's HARQ acknowledgement transmission timing n+j corresponding to a PUSCH transmission. In Table 18, assuming the UE's data (e.g. PUSCH) transmission/retransmission timing is the $n^{th}$ subframe, the eNB's HARQ acknowledgement timing is the $(n+j)^{th}$ subframe. Here, j can be one of the values in Table 18. In Table 18, 'F' denotes the subframe carrying no PUSCH.

TABLE 19

| UL-DL Config- | Subframe m | | | | | | | | | |
|---|---|---|---|---|---|---|---|---|---|---|
| uration | 0 | 1 | 2 | 3 | 4 | 5 | 6 | 7 | 8 | 9 |
| 1 | — | — | 7, 6 | 4 | — | — | — | 7, 6 | 4 | — |
| 1-2flexSF | — | — | 8, 7, 4, 6 | — | — | — | — | 8, 7, 4, 6 | — | — |

Table 19 shows the eNB's data transmission timing m−{k} corresponding to the UE's HARQ acknowledgement. In Table 19, assuming that the UE's HARQ acknowledgement timing is m, the eNB's downlink data and/or downlink scheduling information transmission is m−{k}. Here, the set {k} can be one of the sets of values in Table 19.

Figure 15:
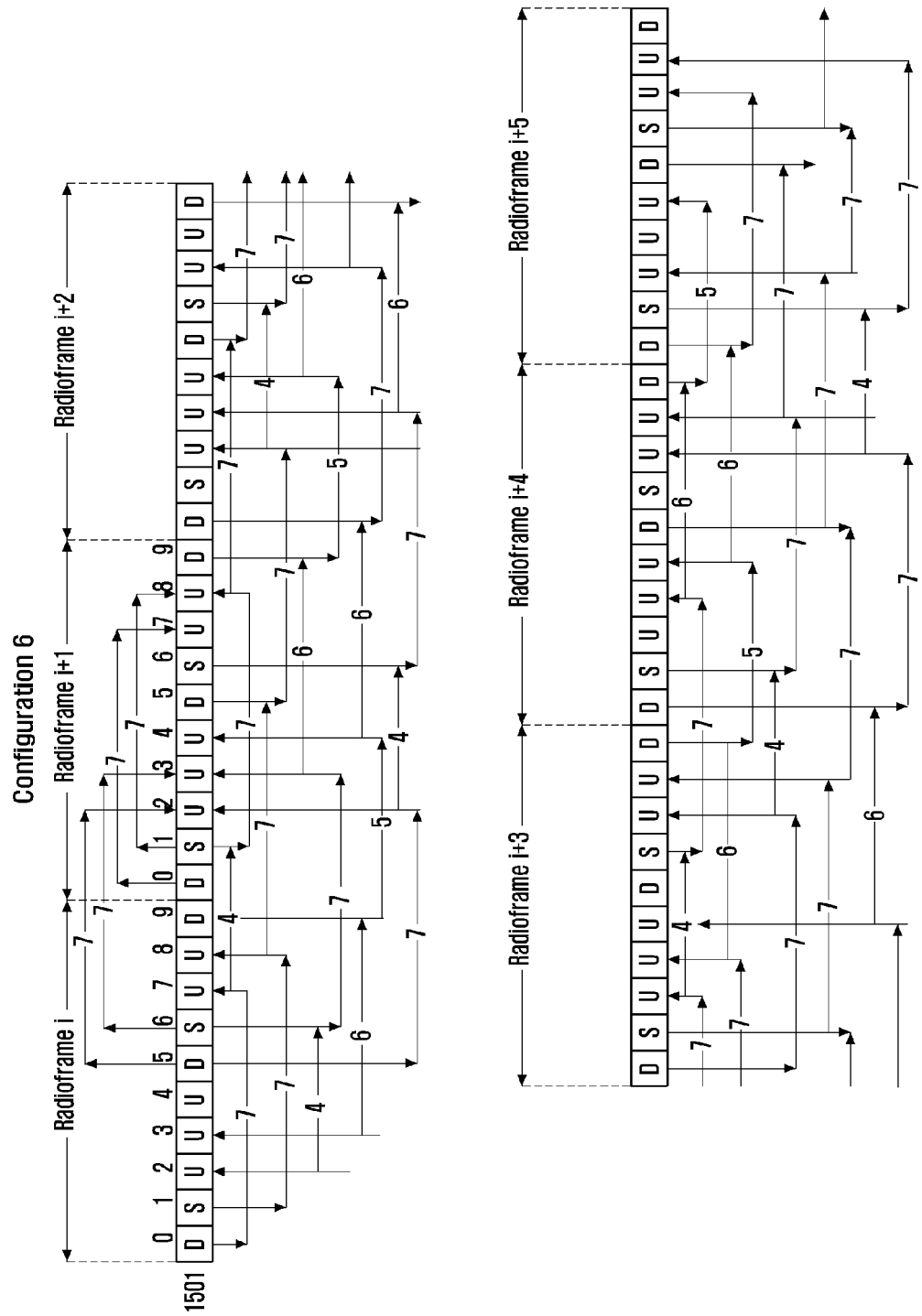
FIG. 15 is diagram illustrating the HARQ timing relationship in the system operating in TDD configuration 6 supporting FlexSF in units of HARQ Round Trip Time (RTT) according to an embodiment of the present invention.
Figure 16:
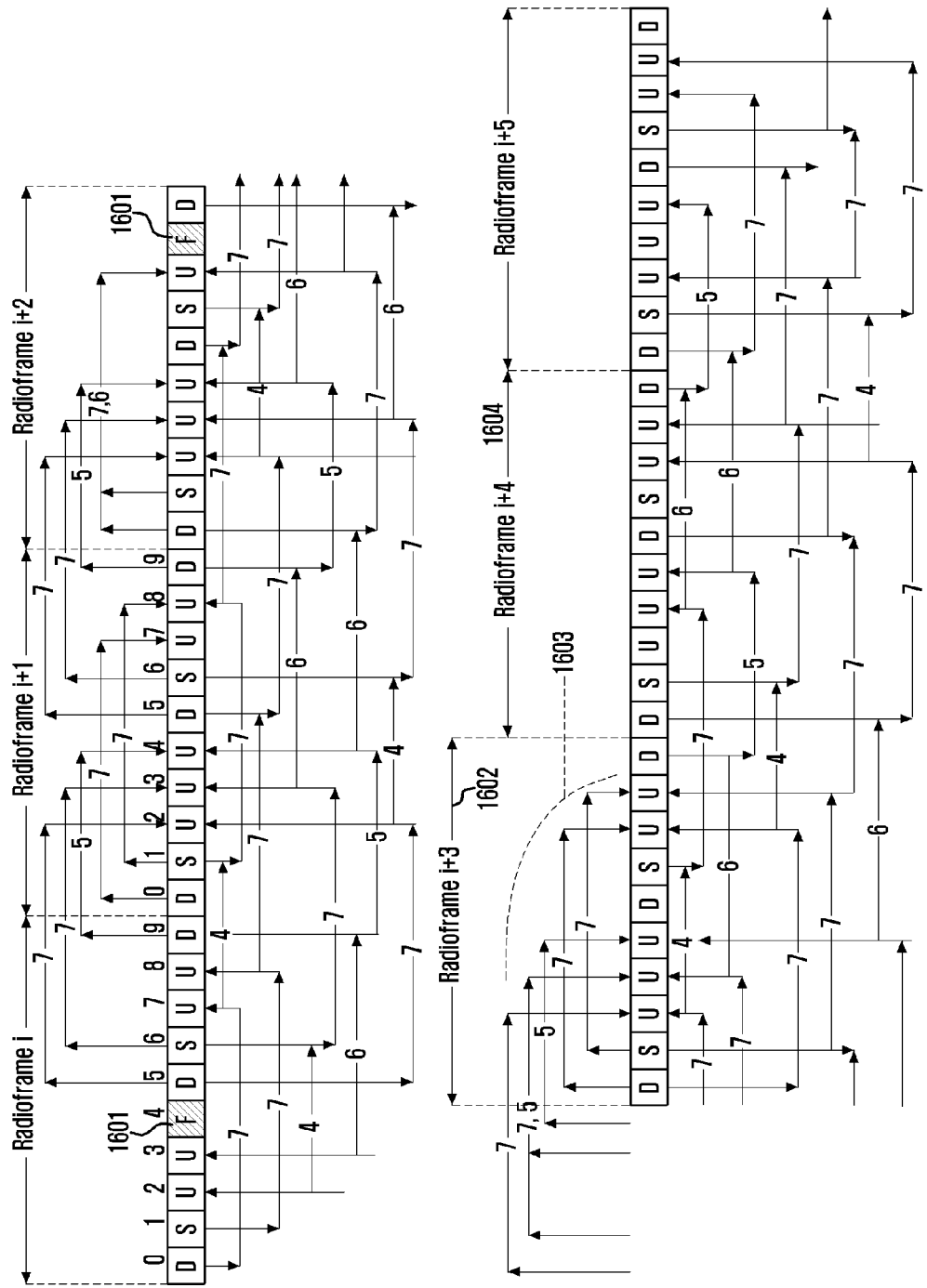
FIG. 16 is diagram illustrating the HARQ timing relationship in the system operating in TDD configuration 6 supporting FlexSF in units of HARQ Round Trip Time (RTT) according to another embodiment of the present invention.

FIGS. 15 and 16 are diagrams illustrating HARQ timing relationships in the system operating in TDD configuration 6 supporting FlexSF in units of HARQ Round Trip Time (RTT) according to an embodiment of the present invention.

In TDD configuration 6, an uplink index can be associated with an uplink HARQ as well as being used in one HARQ transmission/reception while progressing on the time axis of a radio frame. That is, as shown in FIG. 15, the HARQ timing relationship in TDD configuration 6 can have the structure in which 6 radio frames return to the start position in units of 6 radio frames as an HARQ RTT. Unlike the above-described embodiments in which the FlexSF is configured in units of subframes, some uplink subframes fulfilling the FlexSF configuration condition described with reference to FIG. 5 and/or FIG. 6 among the uplink subframes in one uplink HARQ process can be configured as FlexSFs. FIG. 16 shows the HARQ timing relationship identified by the eNB and/or enhanced UE supporting the FlexSF 1601. For example, the $(i+3)^{th}$ radio frame 1602 uses the transmission timing 1603 because one FlexSF is configured in the previous radio frame (i.e. the $(i+2)^{th}$ radio frame). In the $(i+4)^{th}$ radio frame 1604, new HARQ timing relationship is defined such that the HARQ timing relationship used in the $(i+3)^{th}$ radio frame 1602 may not be used in the $(i+4)^{th}$ radio frame 1604.

In the TDD configuration supporting the flexible subframes in units of HARQ RTT, if the HARQ acknowledgement corresponding to the downlink subframe before (n−4) subframes from the reference point of the $m^{th}$ uplink subframe is transmitted after the downlink subframe used for the previous HARQ acknowledgement, the HARQ timing relationship can be defined as shown in Tables 5 to 19.

FIG. 17 is a diagram illustrating the HARQ timing relationship of the system operating in TDD configuration 1 supporting FlexSF in units of half radio frames (or units composed of special subframes and uplink subframes included in one of first and last halves of a radio frame) according to an embodiment of the present invention.

Each of the radio frames 1701 can include up to two special subframes. In the case in which FlexSFs are configured, special subframes positioned at the last halves of the frames 1701 and the uplink subframes between the special subframe and the earliest downlink subframe appearing since the special subframe are configured as FlexSFs. That is, if the $n^{th}$ subframe of the first frame is the uplink subframe, if the $(n-1)^{th}$ subframe is the special subframe followed by the $n^{th}$ subframe, and if q uplink subframes (q is an integer) exist between the $(n-1)^{th}$ subframe of the first frame and the earliest downlink subframe appearing since the $(n-1)^{th}$ subframe, the (q+1) consecutive subframes from the $(n-1)^{th}$ subframe of the second frame following the first frame to the $(n+q-1)^{th}$ subframe are configured as FlexSFs. In the case in which the FlexSFs are configured as shown in the frames 1702 in the TDD configuration 1, the HARQ-related signal and data are transmitted/received as in other predetermined TDD configurations. At this time, the eNB changes the TDD configuration at intervals of 5 msec. In the case in which the FlexSF is enabled, unlike the embodiments of other TDD configurations in which the enhanced UE is restricted against some uplink transmissions as the legacy UE is, the enhanced UE performs the new uplink transmission process using the FlexSF in the TDD configuration in which the HARQ timing relationship is changed in units of half radio frames. Also, in the case in which the special subframe is configured as the FlexSF like the FlexSFs 1703, the eNB occupies the whole time duration of the corresponding subframe for use in downlink transmissions. That is, if the special subframe is configured as the FlexSF, the corresponding subframe that has been used as the special subframe is the time duration available for downlink data transmission to the UE that is acquired by occupying at least a part of the downlink band and whole time duration of the corresponding subframe. For example, in the case in which the FlexSFs are configured in units of half radio frames in the TDD configuration 1, the subframes configured as FlexSFs can be subframes of index 7 and index 8.

The FlexSF also can include the subframe of index 6 that has been used as special subframe. In the case in which the FlexSF is not enable in TDD configuration 1, the subframe of index 6 includes a guard interval necessary for switching from the TDD downlink to the uplink as a role of a special subframe. Meanwhile, in the case in which the FlexSF is configured in units of half radio frames in TDD configuration 1, since the subframes of index 7 and index 8 are used as FlexSFs, the subframe of index 6 may not include the guard interval. At this time, the subframe of index 6 is the time duration available for downlink data transmission to the UE in the whole time duration of the subframe. Accordingly, when the information on the subframes that can be configured as the FlexSF in TDD configuration 1 includes the information on the subframes of index 7 and index 8, the UE and/or the eNB perceives the subframe of index 6 as the FlexSF or downlink data transmission availability in the whole time duration of the subframe of index 6 even though there is no information on the subframe of index 6.

In the case of TDD configuration in which the HARQ timing relationship can be changed in units of half radio frames, the HARQ timing relationship is defined as shown in Tables 20, 21, and/or 22.

TABLE 20

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 1 | | 4 | | | 6 | | | 4 | | 6 |
| 1 with half FexSF | | NA | | | NA | | | 6 | | 6 |

Table 20 shows the PUSCH transmission timing i+k corresponding to the eNB's HARQ acknowledgement or retransmission scheduling information. In Table 20, assuming the eNB's HARQ acknowledgement (e.g. PHICH) or retransmission scheduling information (e.g. PDCCH) transmission timing is the $i^{th}$ subframe, the UE's data (e.g. PUSCH) transmission timing corresponding to the $i^{th}$ subframe is the $(i-k)^{th}$ subframe. Here, k can be one of the values in Table 20. In Table 20, '1 with half FlexSF' denotes the use of the FlexSF in units of half radio frames in TDD configuration 1. NA denotes that the corresponding value is not available due to the FlexSF configuration.

TABLE 21

| TDD UL/DL Config- | UL subframe index n | | | | | | | | | |
|---|---|---|---|---|---|---|---|---|---|---|
| uration | 0 | 1 | 2 | 3 | 4 | 5 | 6 | 7 | 8 | 9 |
| 1 | | | 4 | 6 | | | | 4 | 6 | |
| 1 with half FexSF | | | 6 | 6 | | | | F | F | |

Table 21 shows the eNB's HARQ acknowledgement transmission timing n+j corresponding to a PUSCH transmission. In Table 21, assuming the UE's data (e.g. PUSCH) transmission/retransmission timing is the $n^{th}$ subframe, the eNB's HARQ acknowledgement timing is the $(n+j)^{th}$ subframe. Here, j can be one of the values in Table 21. In Table 21, 'F' denotes the subframe carrying no PUSCH.

TABLE 22

| UL-DL Config- | Subframe m | | | | | | | | | |
|---|---|---|---|---|---|---|---|---|---|---|
| uration | 0 | 1 | 2 | 3 | 4 | 5 | 6 | 7 | 8 | 9 |
| 1 | — | — | 7, 6 | 4 | — | — | — | 7, 6 | 4 | — |
| 1 with half FexSF | — | — | 12, 8, 7, 11 | 6, 5, 4, 7 | — | — | — | — | — | — |

Table 22 shows the eNB's data transmission timing m−{k} corresponding to the UE's HARQ acknowledgement. In Table 22, assuming that the UE's HARQ acknowl- edgement timing is m, the eNB's downlink data and/or downlink scheduling information transmission is m−{k}. Here, the set {k} can be one of the sets of values in Table 22.

Figure 18:
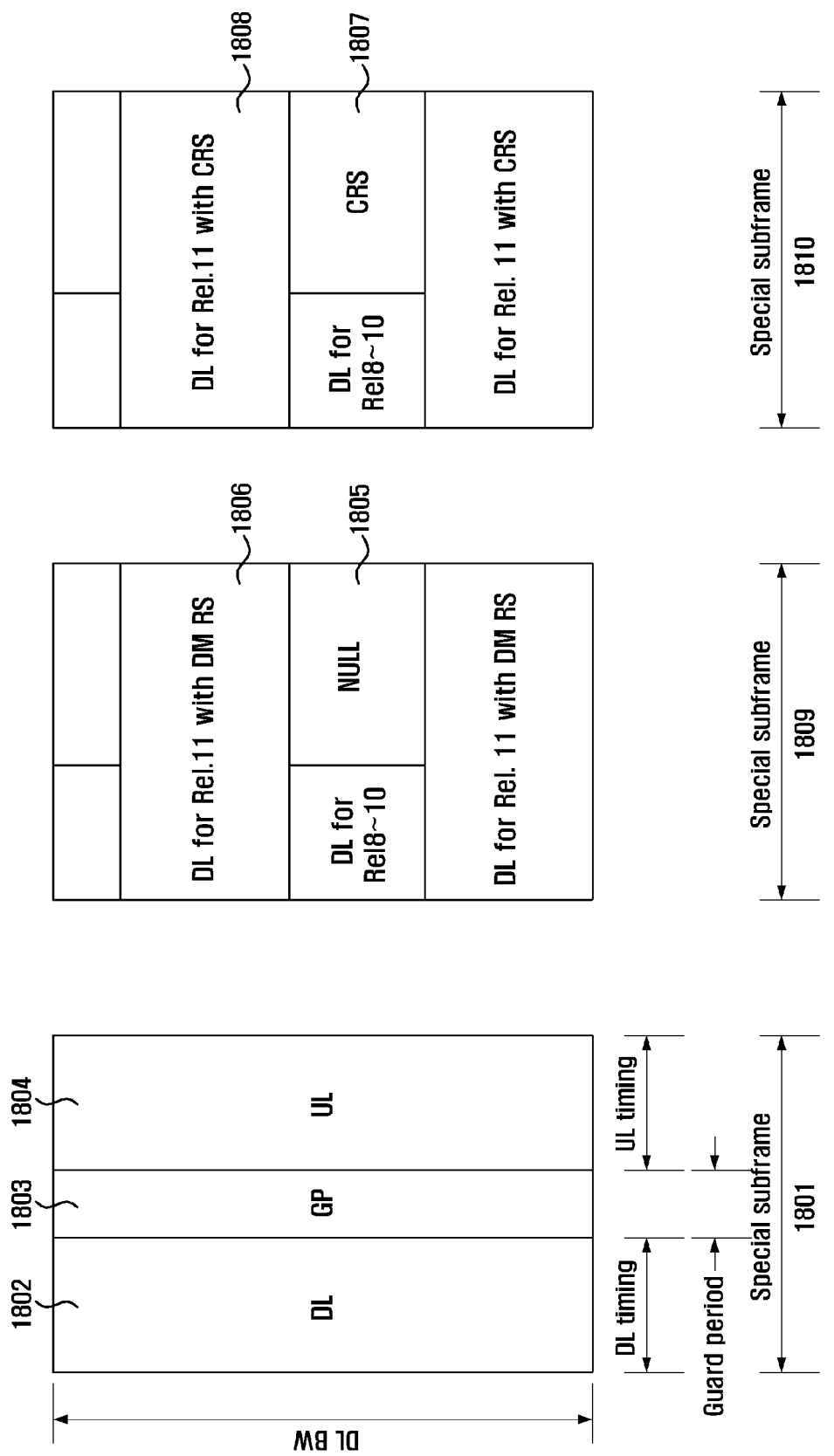
FIG. 18 is a diagram illustrating a principle of resource management for data transmission according to an embodiment of the present invention.

FIG. 18 is a diagram illustrating a principle of resource management for data transmission according to an embodiment of the present invention. The special subframe 1801 is split into a downlink part 1802, a guard period 1803, and/or an uplink part 1804. The subframe 1809 and/or subframe 1810 have a structure configured when the special subframe 1801 is used as the FlexSF. For example, if the FlexSF is activated in units of half radio frames in TDD configuration 1, the subframe of index 6 is configured as the FlexSF. In the subframe 1809 and/or subframe 1810, the enhanced UE and/or eNB supporting FlexSF uses the whole time duration of the corresponding subframe as the downlink time duration. The region 1805 is a guard period and uplink part for the legacy UE not supporting the FlexSF. That is, if the FlexSF is enabled, no uplink scheduling information is transmitted for the subframe 1809 used as the FlexSF such that the region 1805 remains as a blank region. The region 1806 is the region scheduled by the eNB for the enhanced UE supporting the FlexSF. In the case where no reference signal is transmitted in the region 1805, the region 1806 is the resource for the eNB to transmit data using a UE-specific reference signal. In the case where the reference signal is transmitted by the UE as a part of the region 1807, the region 1808 is the resource for the eNB to transmit data to the UE by occupying the whole time duration of the subframe 1810 in the same manner as the conventional normal downlink transmission. Also, in the case in which the conventional normal downlink transmission scheme is applied at the region 1808, the eNB transmits a common reference signal and a UE-specific reference signal to the enhanced UE simultaneously.

Figure 19:
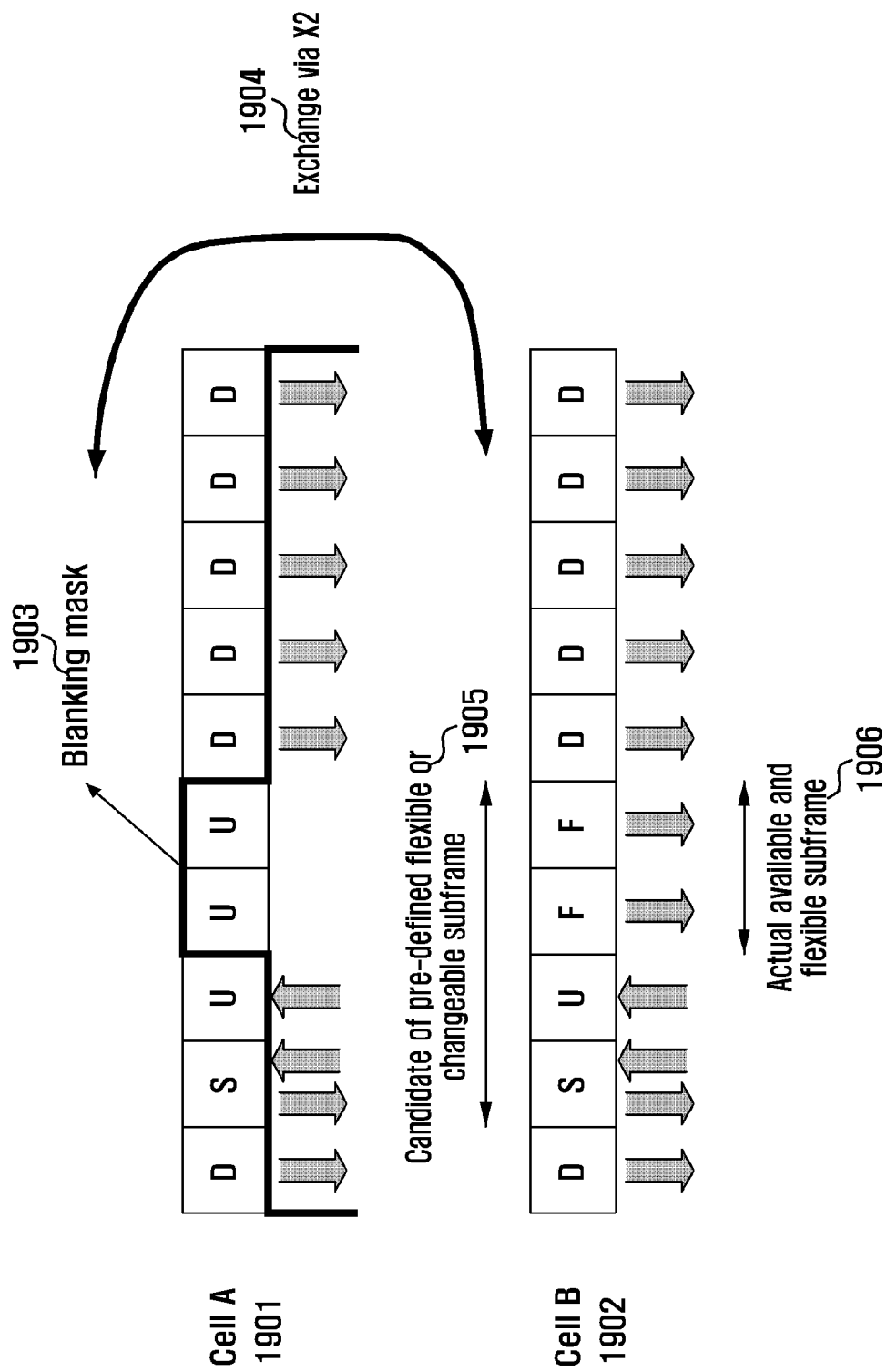
FIG. 19 is a diagram illustrating a principle of interference control in the system according to an embodiment of the present invention.

FIG. 19 is a diagram illustrating a principle of interference control in the system according to an embodiment of the present invention. The eNB supporting the FlexSF flexibly uses the uplink subframe for uplink transmission. At this time, the uplink transmission of the neighbor eNB adjacent to the eNB using the FlexSF can be interfered with by the downlink signal in the time duration of the FlexSF of the eNB using the FlexSF. In order to avoid the interference caused by use of the FlexSF among the eNBs, the eNB (or cell) 1901 and the neighbor eNB 1902 exchange the first type signal through an X2 link (or message) 1904. The first type signal includes blanking mask signal indicating the uplink and/or downlink subframe at which transmission is suspended. For example, in the case in which the blanking mask signal carries the information indicating the downlink subframe at which the eNB skips transmission, the blanking mask signal indicates the downlink subframe at which the downlink data scheduling and/or uplink data scheduling information is not transmitted. The eNB 1901 controls such that no downlink data is scheduled at the subframe indicated by the blanking mask signal or no uplink acknowledgement channel transmission and/or uplink scheduling information is transmitted at the subframe. The blanking mask signal carrying the information on the uplink subframe in which transmission is skipped is used for the same purpose as the blanking mask signal carrying the information on the downlink subframe in which transmission is skipped.

That is, in the case in which the blanking mask signal carries the information on the uplink subframe at which the eNB 1901 skips transmission, the blanking mask signal indicates the uplink subframe carrying no data and/or control information addressed to the UE served by the eNB 1901 or no uplink data and/or control signal scheduled for the UE. If the first type signal is received, the neighbor eNB 1902 uses the resource 1906 corresponding to the uplink (or downlink) subframe at which the eNB 1901 skips transmission according to the first type signal among the available resources (i.e. candidate subframes) 1905 as the FlexSF. Accordingly, the eNB 1902 uses the FlexSF without interference from the eNB 1901.

Figure 20:
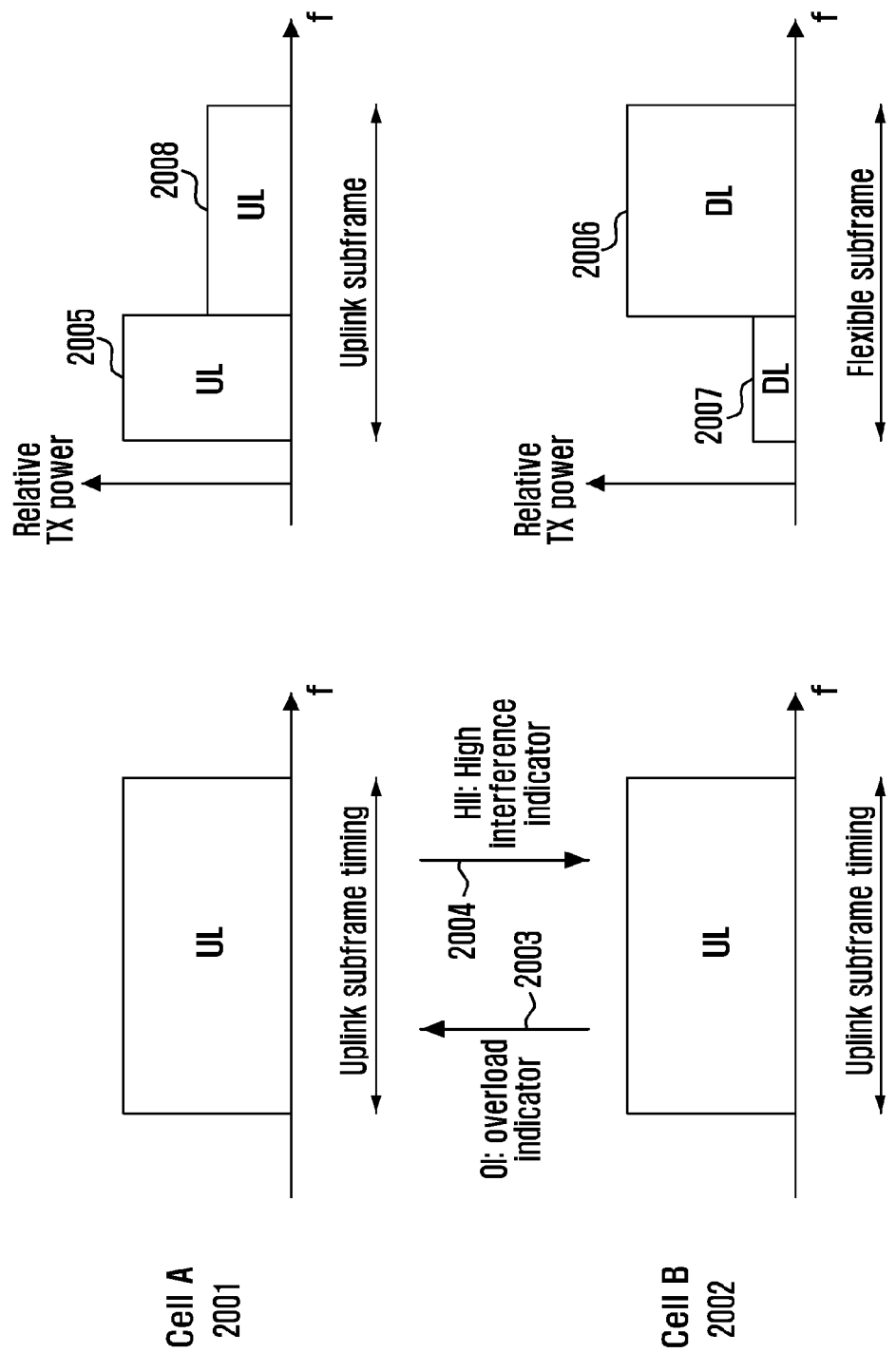
FIG. 20 is a diagram illustrating a principle of interference control in the system according to another embodiment of the present invention.

FIG. 20 is a diagram illustrating a principle of interference control in the system according to another embodiment of the present invention. In the case of an LTE system, the interference caused by use of the FlexSF can be mitigated by using an overload indicator (hereinafter, referred to as a second type signal) 2003 and an interference indicator (hereinafter, referred to as a third type signal) 2004. The second type signal 2004 can be the signal indicating the frequency band experiencing interference in the corresponding cell (or eNB) or the frequency band highly interfered with, and the third type signal 2004 can be the signal indicating the frequency band causes interference in the corresponding cell or the frequency band highly interfering with the neighbor cell. In the case in which the cell A 2001 transmits the third type signal 2004 to the neighbor cell B 2002 or the cell B 2002 transmits the second type signal 2003 to the cell A 2001, each cell checks the frequency band causing high interference with the neighbor cell at the uplink time duration (used as the FlexSF) or the frequency band highly interfered with from the neighbor eNB. The cell 202 using the FlexSF schedules the downlink data on the frequency band 2008 influenced by relatively low interference first as compared to the frequency band 2005 influenced by relatively high interference based on the second type signal 2003 and/or the third type signal 2004. For example, the cell 2002 schedules the UE having high data transmission power on the frequency band 2006 having relatively low interference and the UE having low data transmission power on the frequency band 2007 having high interference.

Figure 21:
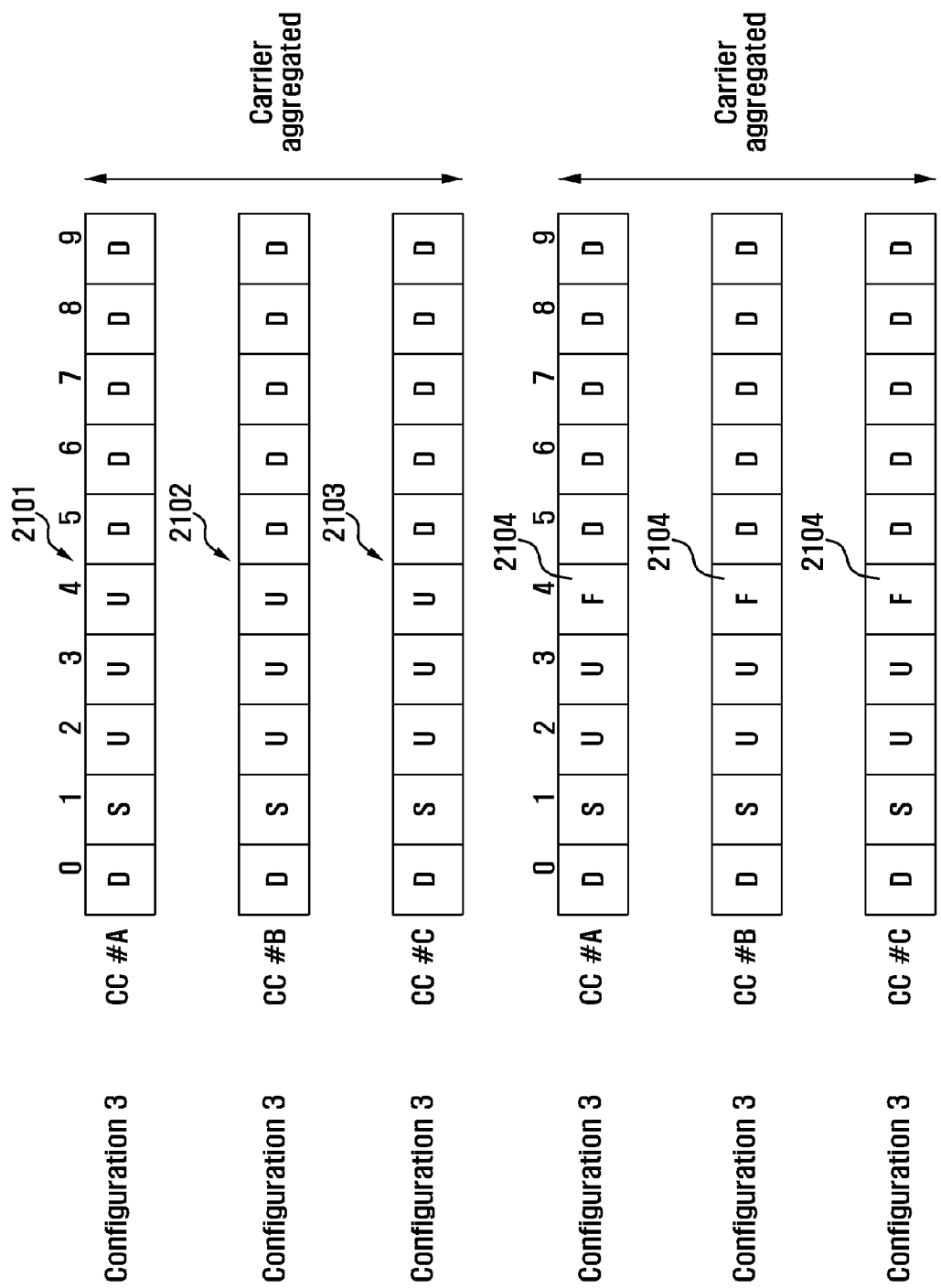
FIG. 21 is a diagram illustrating a principle of using FlexSF in the system supporting carrier aggregation according to an embodiment of the present invention.

FIG. 21 is a diagram illustrating a principle of using the FlexSF in the system supporting carrier aggregation according to an embodiment of the present invention. In case of using the FlexSF in the system operating in multicarrier mode, the positions of the FlexSF (i.e. the subframe index/indices) are identical among each other in the frames on the multiple carriers. For example, in case that the frame 2101 of the component carrier (CC) #A, the frame 2102 of the CC #B, and the frame 2103 of the CC #C are aggregated, the FlexSF 2104 is configured at the same position in the respective frames. By configuring the subframes at the same position of the multiple carriers as the FlexSFs, it is possible to perform cross scheduling among the component carriers.

A description will now be made of the method for supporting TDD of the eNB and/or the UE according to an embodiment of the present invention with reference to FIGS. 22 to 33.

The eNB receives uplink data transmitted by the UE at the $n^{th}$ subframe of the first frame. The eNB transmits downlink data through the second transceiver at the $n^{th}$ subframe of the second frame following the first frame.

The UE transmits uplink data to the eNB at the $n^{th}$ subframe of the first frame. The UE receives the downlink data transmitted by the eNB at the $n^{th}$ subframe of the second frame following the first frame.

Here, n is an integer, and the $n^{th}$ subframe is the time duration used as one of uplink time duration and downlink time duration, selectively (i.e. candidate subframe). The $n^{th}$ subframe of the first frame is the uplink time duration while the $n^{th}$ subframe of the second frame is a flexible subframe representing the time duration configured as the downlink time duration among the time durations that are configured selectively (i.e. candidate subframe).

Figure 22:
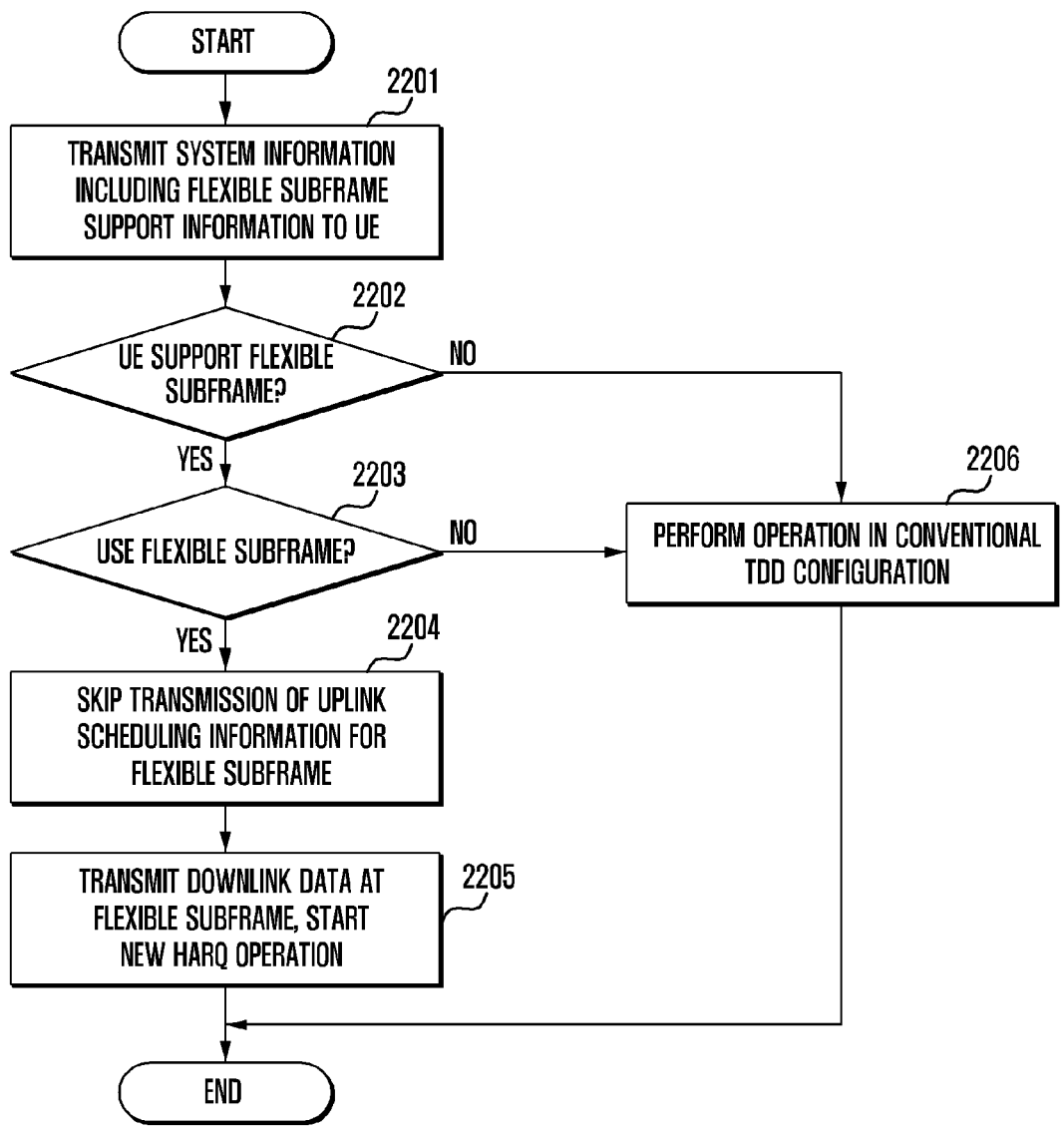
FIG. 22 is a flowchart illustrating an eNB procedure in a method for supporting flexible TDD according to an embodiment of the present invention.

FIG. 22 is a flowchart illustrating an eNB procedure in the method for supporting flexible TDD according to an embodiment of the present invention.

The eNB transmits to the UE the system information including the information on the candidate subframes that are configured as the FlexSF or the information indicating FlexSF configuration availability in step 2201.

The eNB determines whether the UE to be scheduled supports FlexSF in step 2202. If the UE does not support the FlexSF, the eNB transmit/receives the data channel (PUSCH or PDCCH) and/or the control channel (PDCCH or PHICH) in the conventional TDD configuration in step 2206.

In the case in which the subframe in which the eNB performs scheduling is used as the FlexSF, the eNB skips transmission of uplink scheduling information at the subframe configured as the FlexSF among the candidate subframes indicated by the system information in step 2204.

The eNB transmits downlink data to the UE in the FlexSF in step 2205. At step 2205, the eNB and/or UE initiates a new HARQ operation according to the use of the FlexSF. For example, the eNB and/or UE can perform HARQ operations described with reference to FIGS. 10 to 17 and Tables 5 to 22.

Figure 23:
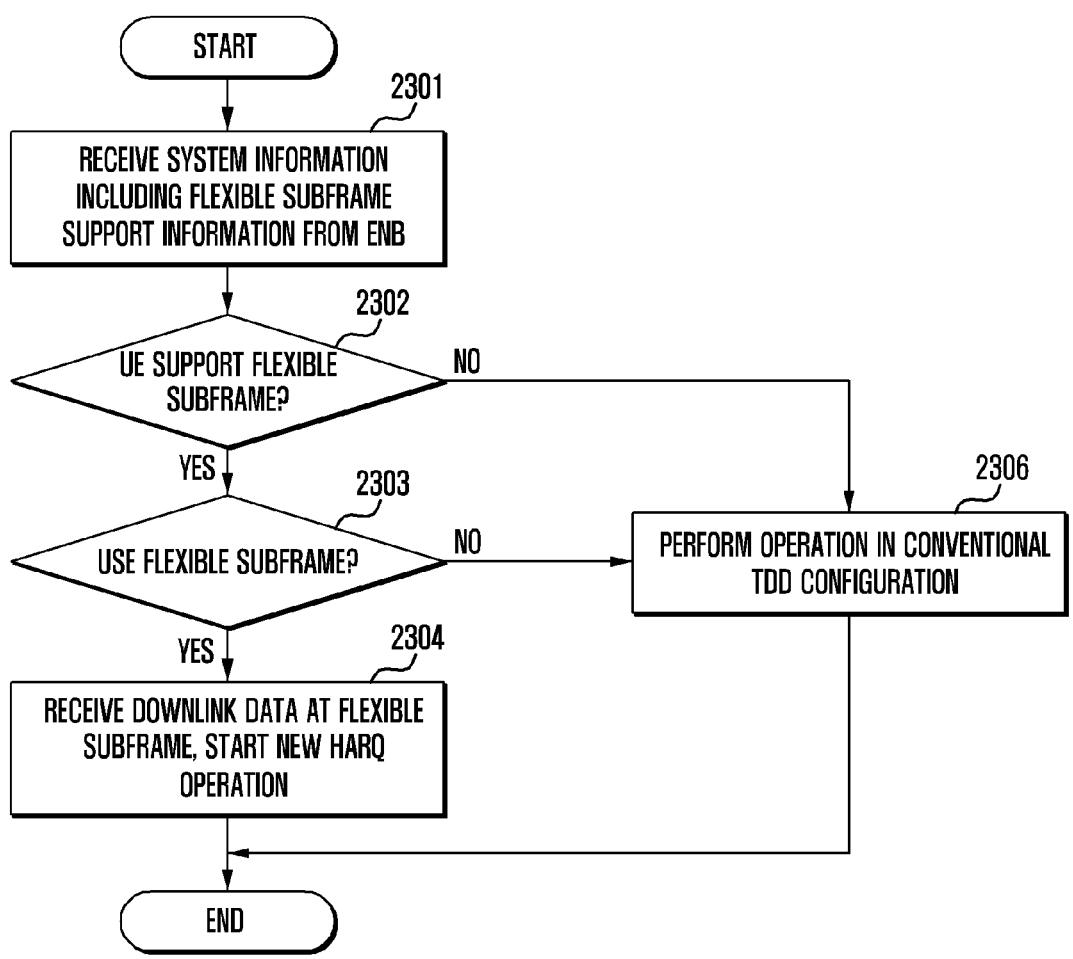
FIG. 23 is a flowchart illustrating a UE procedure in a method for supporting flexible TDD according to an embodiment of the present invention.

FIG. 23 is a flowchart illustrating a UE procedure in the method for supporting flexible TDD according to an embodiment of the present invention.

The UE receives the system information including the information on the candidate subframes that can be configured as the FlexSF or the information indicating FlexSF configuration availability from the eNB in step 2301.

The UE then determines whether it supports the FlexSF in step 2302.

If it does not support the FlexSF, the UE performs an operation of transmitting/receiving a data channel and/or control channel in the conventional TDD configuration in step 2306. In the case of not supporting the FlexSF, the UE cannot perceive the information on the candidate subframe or use of the FlexSF and thus step 2302 can be omitted.

If it supports FlexSF, the UE determines whether any FlexSF is configured in step 2303, depending on whether the uplink scheduling information for a candidate subframe has been received. If the uplink scheduling information has been received, the UE performs the operation of step 2306.

If the uplink scheduling information has not been received, the UE regards the corresponding candidate subframe as the FlexSF in step 2304. If there is any downlink data scheduled for the UE at step 2304, the UE receives the downlink data at the FlexSF and starts a new HARQ operation according to the use of the FlexSF.

Figure 24:
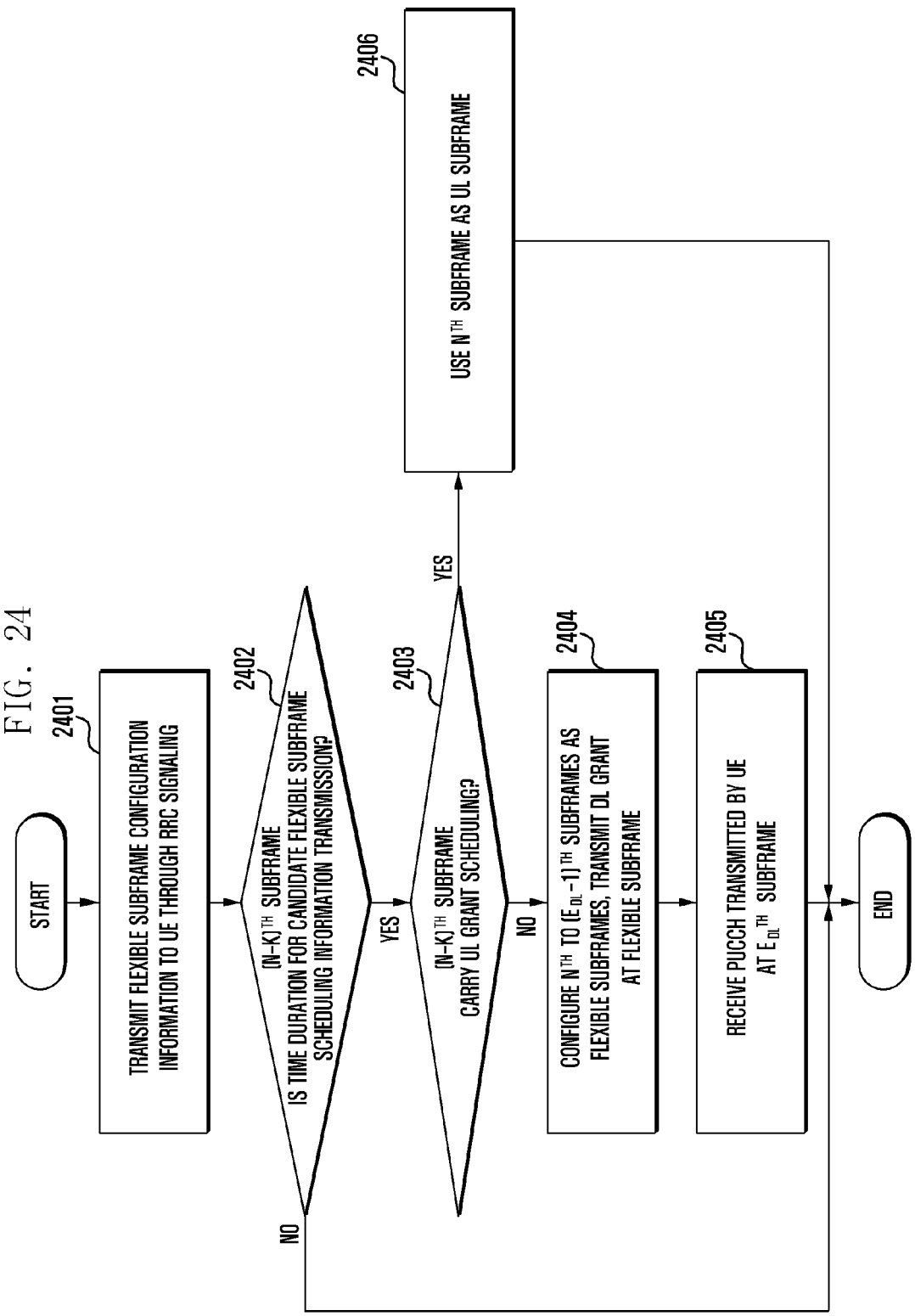
FIG. 24 is a flowchart illustrating an eNB procedure for processing flexible subframes in a method for supporting flexible TDD according to an embodiment of the present invention.

FIG. 24 is a flowchart illustrating an eNB procedure for processing the flexible subframes in the method for supporting flexible TDD according to an embodiment of the present invention.

The eNB transmits the information on the candidate subframes or the configuration information of the FlexSF through RRC signaling in step 2401.

The eNB determines whether the $(n-k)^{th}$ subframe is the time duration carrying the scheduling information for the $n^{th}$ candidate subframe in step 2402. If the $n^{th}$ candidate subframe cannot be configured as the FlexSF or if the $(n-k)^{th}$ subframe is not the subframe carrying the scheduling information for the $n^{th}$ candidate subframe, the eNB uses the $n^{th}$ subframe as the uplink subframe or ends the operation for supporting FlexSF.

If the $n^{th}$ subframe can be configured as the FlexSF, the eNB determines whether to transmit uplink scheduling information at the $(n+k)^{th}$ subframe depending on whether to configure the $n^{th}$ candidate subframe as the FlexSF in step 2403. If it is determined to transmit uplink scheduling information (i.e. if $n^{th}$ subframe is not configured as FlexSF), the eNB uses the $n^{th}$ subframe as the uplink subframe in step 2406.

If it is determined that the $(n-k)^{th}$ subframe is not used for transmitting the uplink scheduling information for the $n^{th}$ subframe, the eNB configures the $n^{th}$ to $(E_{DL}-1)^{th}$ subframes as FlexSFs in step 2404. Here, $E_{DL}$ denotes the index of the earliest downlink subframe appearing since the $n^{th}$ subframe. For example, if at least one FlexSF is configured in the frame 603 of FIG. 6, n is the index of the earliest subframe 610 among consecutive FlexSFs 610 and 611 in the time domain. Also, $E_{DL}$ can be the subframe index of 5 in the frame 603.

The eNB receives the PUSCH transmitted from the UE at the $E_{UL}^{th}$ subframe as the earliest uplink subframe appearing after n+4 subframes or a predetermined time (the $n^{th}$ subframe or consecutive FlexSFs including the $n^{th}$ subframe) in step 2405.

Figure 25:
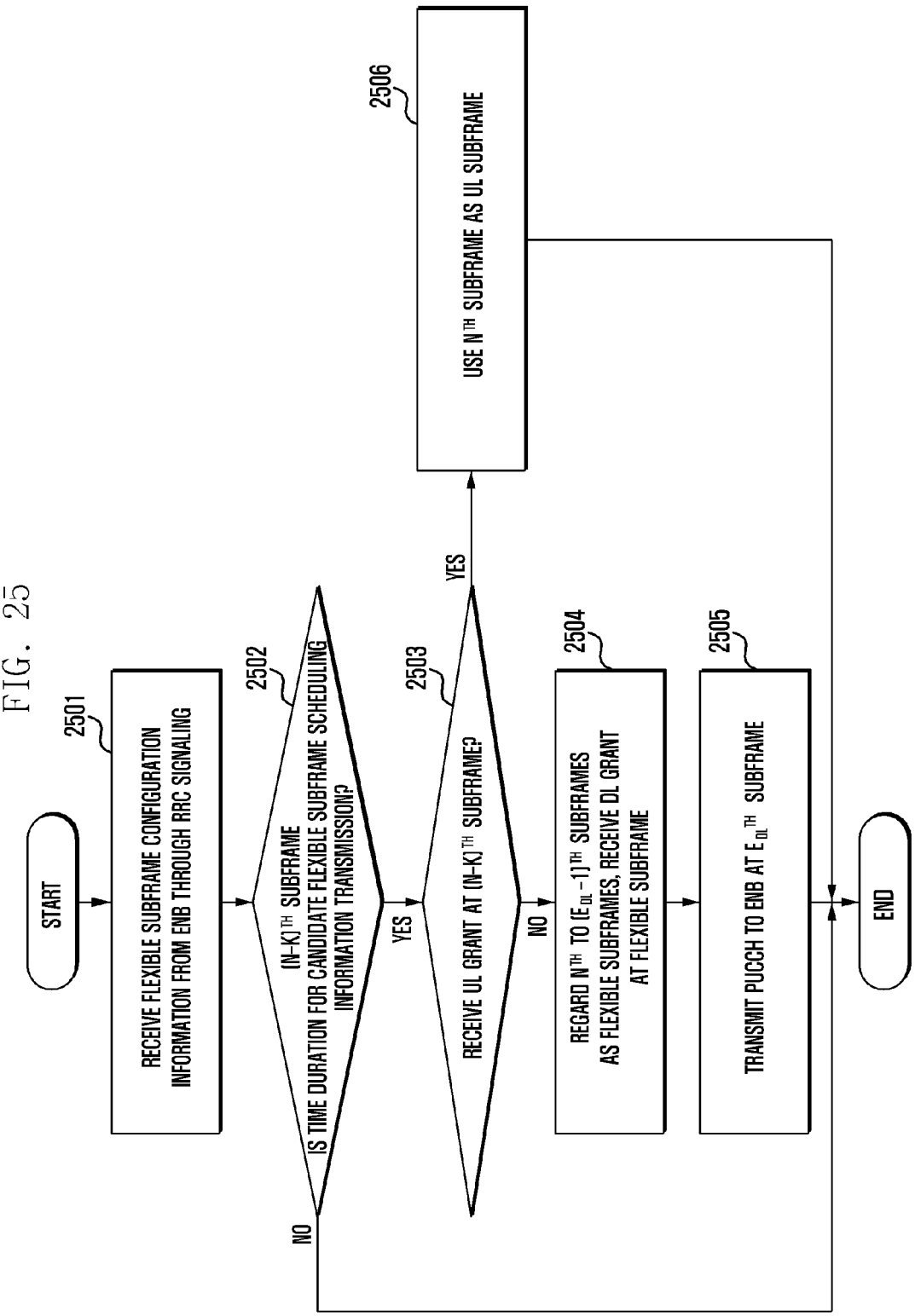
FIG. 25 is a flowchart illustrating a UE procedure for processing flexible subframes in a method for supporting flexible TDD according to an embodiment of the present invention.

FIG. 25 is a flowchart illustrating a UE procedure for processing the flexible subframe in the method for supporting flexible TDD according to an embodiment of the present invention.

The UE receives the information on the candidate subframes or the configuration information of the FlexSF through RRC signaling in step 2501.

The UE determines whether the $(n-k)^{th}$ subframe is the time duration carrying the scheduling information for the $n^{th}$ candidate subframe in step 2502. If the $(n-k)^{th}$ subframe is not the time duration carrying the scheduling information for the $n^{th}$ candidate subframe, the UE ends the operation for supporting the FlexSF.

Otherwise, if the $(n-k)^{th}$ subframe is the time duration carrying the scheduling information for the $n^{th}$ candidate subframe, the UE determines whether the uplink scheduling information (UL grant) is received at the $(n-k)^{th}$ subframe in step 2503. If the uplink scheduling information is received at the $(n-k)^{th}$ subframe, the UE regards the $n^{th}$ subframe as the uplink time duration in step 2506.

If the uplink scheduling information is not received at the $(n-k)^{th}$ subframe, the UE regards the $n^{th}$ to $(E_{DL}-1)^{th}$ subframes as FlexSFs in step 2504. Here, $E_{DL}$ denotes the index of the earliest downlink subframe appearing since the $n^{th}$ subframe. The UE also can receive the downlink scheduling information or downlink data transmitted at the FlexSFs.

The UE transmits the PUCCH including the HARQ acknowledgement corresponding to the downlink data at the $E_{UL}^{th}$ subframe as the earliest subframe appearing since the $n^{th}$ subframe or the consecutive FlexSFs including the $n^{th}$ subframe in step 2505.

Figure 26:
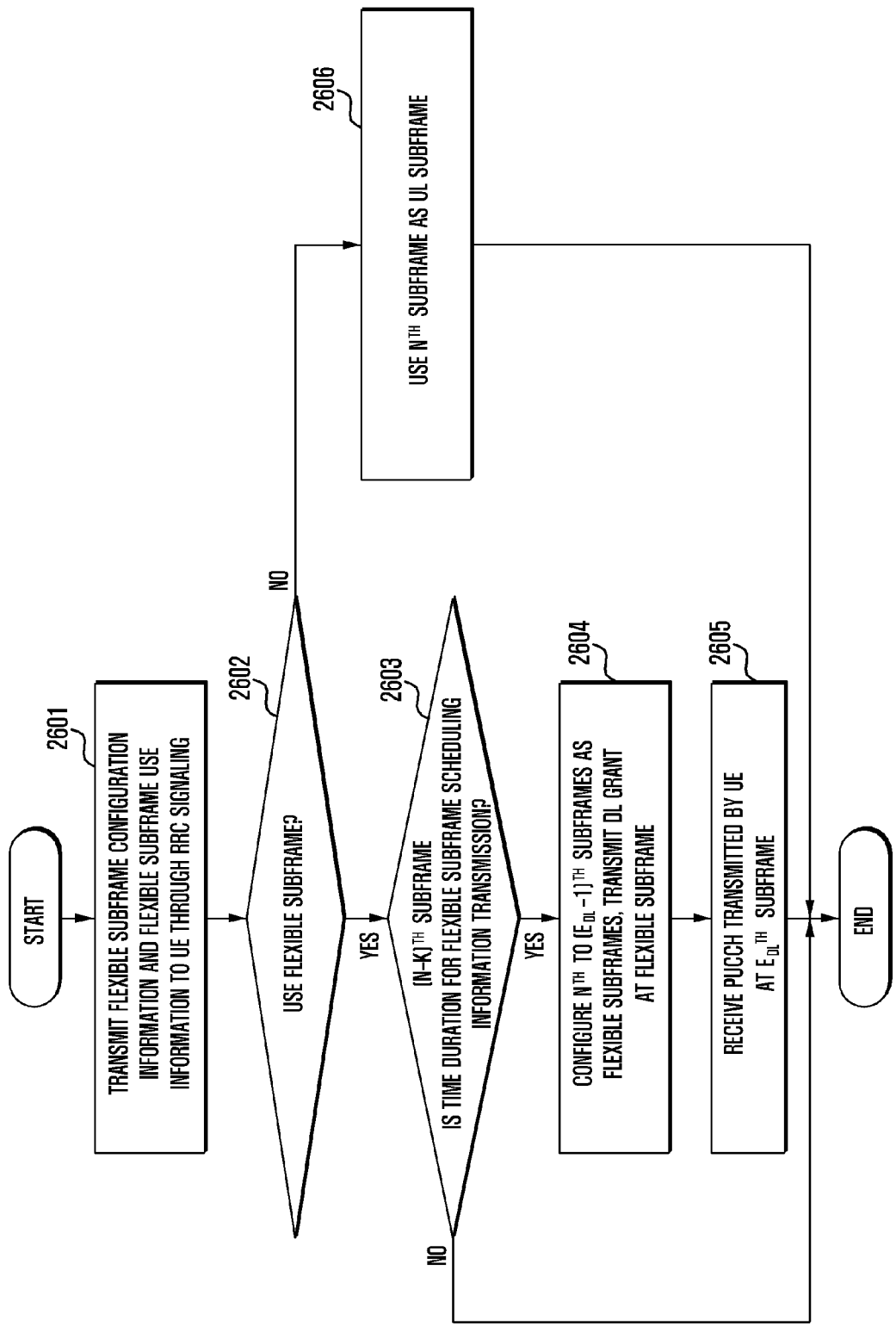
FIG. 26 is a flowchart illustrating an eNB procedure for processing flexible subframes in a method for supporting flexible TDD according to another embodiment of the present invention.

FIG. 26 is a flowchart illustrating an eNB procedure for processing the flexible subframe in the method for supporting flexible TDD according to another embodiment of the present invention.

The eNB transmits to the UE the FlexSF configuration information (or candidate subframe information) and the FlexSF utilization information in step 2601. The FlexSF configuration information (or candidate subframe information) can be transmitted to the UE only when change takes place in the configuration. Here, the eNB transmits the FlexSF configuration information to the UE directly such that the eNB and/or the UE checks whether the FlexSF is enabled regardless of the receipt of the uplink scheduling information at step 2403 of FIG. 24 or step 2503 of FIG. 25.

The eNB determines whether to use the FlexSF according to the determination result at step 2601 and/or the RRC signaling in step 2602, and the procedure goes to step 2603 or 2606 according to the determination result. If it is determined not to enable the FlexSF, the eNB uses the $n^{th}$ subframe as the uplink subframe at step 2606.

If it is determined to enable FlexSF, the eNB determines whether the $(n-k)^{th}$ subframe is supposed to carry the scheduling information for the $n^{th}$ subframe to be used as the FlexSF or the scheduling information of the FlexSF in step 2603. If the eNB cannot use the $n^{th}$ subframe as the FlexSF or if the $(n-k)^{th}$ subframe is not supposed to carry the scheduling information for the $n^{th}$ subframe as the FlexSF, the eNB ends the operation for supporting FlexSF.

If the $(n-k)^{th}$ subframe is supposed to carry the scheduling information for the $n^{th}$ subframe as the FlexSF, the eNB skips the transmission of uplink scheduling for the $n^{th}$ subframe of the FlexSF in step 2604. Since the operations at steps 2604 and 2605 are identical with steps 2404 and 2405 of FIG. 24, detailed descriptions thereon are omitted herein.

Figure 27:
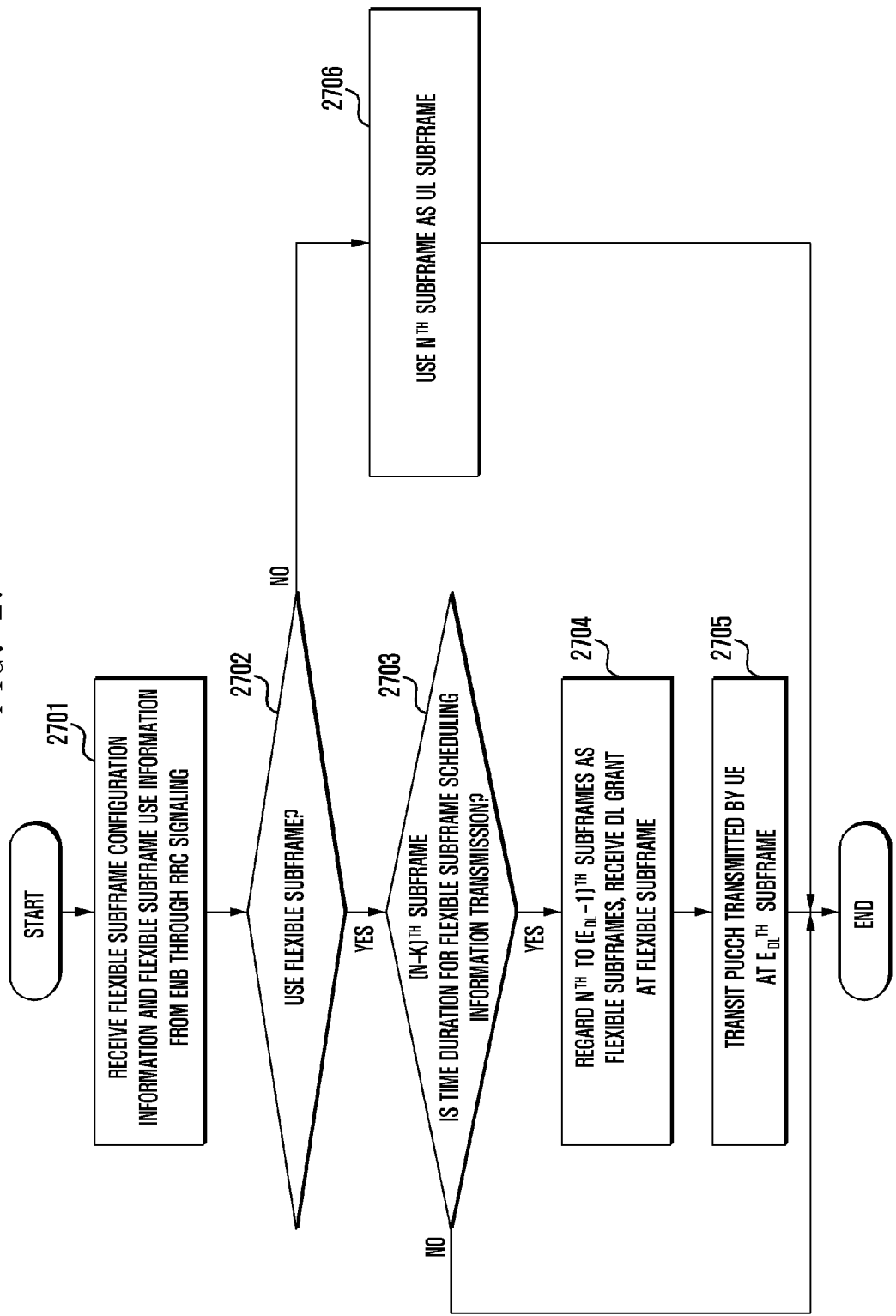
FIG. 27 is a flowchart illustrating a UE procedure for processing flexible subframes in a method for supporting flexible TDD according to another embodiment of the present invention.

FIG. 27 is a flowchart illustrating a UE procedure for processing the flexible subframe in the method for supporting flexible TDD according to another embodiment of the present invention.

The UE receives the FlexSF configuration information (or candidate subframe information) and the FlexSF utilization information from the eNB in step 2701.

The UE determines whether the FlexSF is enabled based on the RRC signaling in step 2702. If the FlexSF is disabled the UE regards or uses the $n^{th}$ subframe as the uplink subframe in step 2706.

If the FlexSF is enabled, the UE determines whether the $(n-k)^{th}$ subframe carries the uplink scheduling information for the $n^{th}$ subframe to be used as the FlexSF or the uplink scheduling information for the FlexSF in step 2703. If the $(n-k)^{th}$ subframe carries no uplink scheduling information for the $n^{th}$ subframe as the FlexSF, the UE ends the operation for supporting the FlexSF.

If the $(n-k)^{th}$ subframe carries the uplink scheduling information for the $n^{th}$ subframe as the FlexSF, the procedure goes to step 2704. The UE checks whether to skip transmission of the uplink scheduling information for the $n^{th}$ subframe as the FlexSF for the $(n-k)^{th}$ subframe based on the FlexSF configuration information. Since the operations at steps 2704 and 2705 of FIG. 27 are identical with those at step 2504 and 2505 of FIG. 25, detailed descriptions thereon are omitted herein.

Figure 28:
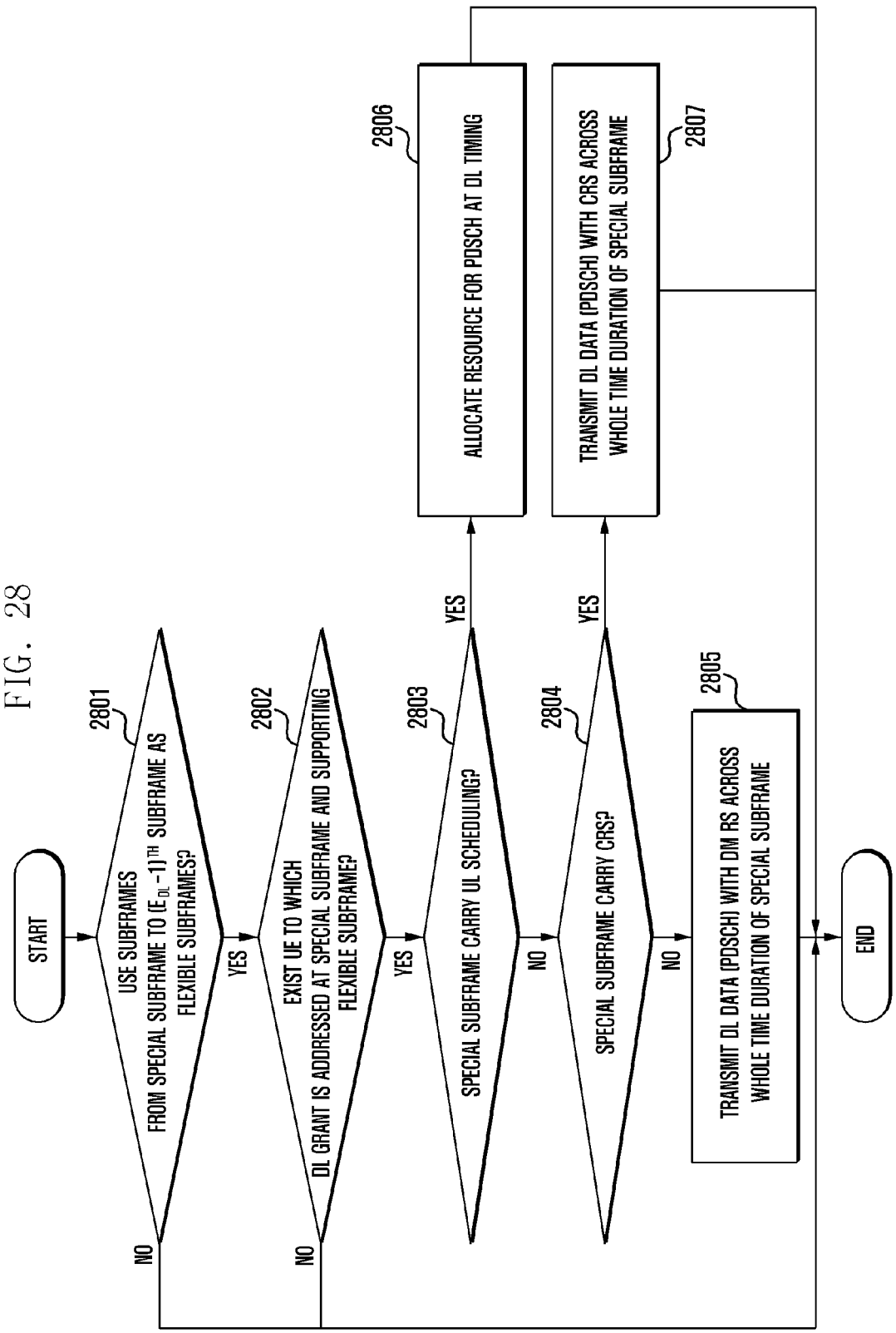
FIG. 28 is a flowchart illustrating an eNB procedure for supporting flexible TDD according to another embodiment of the present invention.

FIG. 28 is a flowchart illustrating an eNB procedure for supporting flexible TDD according to another embodiment of the present invention. FIG. 28 shows the eNB procedure for supporting flexible TDD in which a special subframe is used as the FlexSF as shown in frame 1702 of FIG. 17.

The eNB determines whether the consecutive subframes from a special subframe to $(E_{SDL}-1)^{th}$ subframe can be used as FlexSFs IN step 2801. Here, $E_{SDL}$ denotes the index of the earliest downlink subframe appearing since the special subframe. If the corresponding subframes cannot be used as FlexSFs at step 2801, the eNB ends the operation for supporting FlexSFs including the special subframe.

If the corresponding subframes including the special subframe can be used as the FlexSF, the eNB determines whether there is a UE to which the uplink scheduling information (DL grant) or downlink data is addressed in the special subframe that can be used as the FlexSF and which supports the FlexSF in step 2802. If there is no UE to which the downlink scheduling information (or downlink data) is addressed and which supports the FlexSF, the eNB ends the operation for supporting FlexSFs including the special subframe.

If there is a UE fulfilling the conditions at step 2802, the eNB determines whether to perform uplink scheduling at the special subframe in step 2803. For example, if the enhanced UE supporting the FlexSF and a legacy UE not supporting the FlexSF coexist, the eNBs determine whether it is necessary to perform uplink scheduling for the legacy UE. In the case in which the enhanced and legacy UEs coexist, the resource management is performed as described with reference to FIG. 18.

If it is determined to perform uplink scheduling for a specific UE (e.g. enhanced UE) at the uplink part of the special subframe at step 2803, the eNB determines whether to transmit a Common Reference Signal (CRS), among the reference signals, to the corresponding UE(s) at the special subframe in step 2804. If it is determined not to perform uplink scheduling in step 2803, resources for downlink date (PDSCH) are allocated in step 2806. In step 2804, if it is determined to transmit CRS at the special subframe, the eNB transmits the CRS and downlink data (e.g. PDSCH) using the whole time duration of the special subframe in step 2807.

If it is determined not to transmit the CRS at the special subframe in step 2804, the eNB transmits a Demodulation Reference Signal (DM RS), among the reference signals, and downlink data (e.g. PDSCH) using the whole time duration of the special subframe in step 2805.

Figure 29:
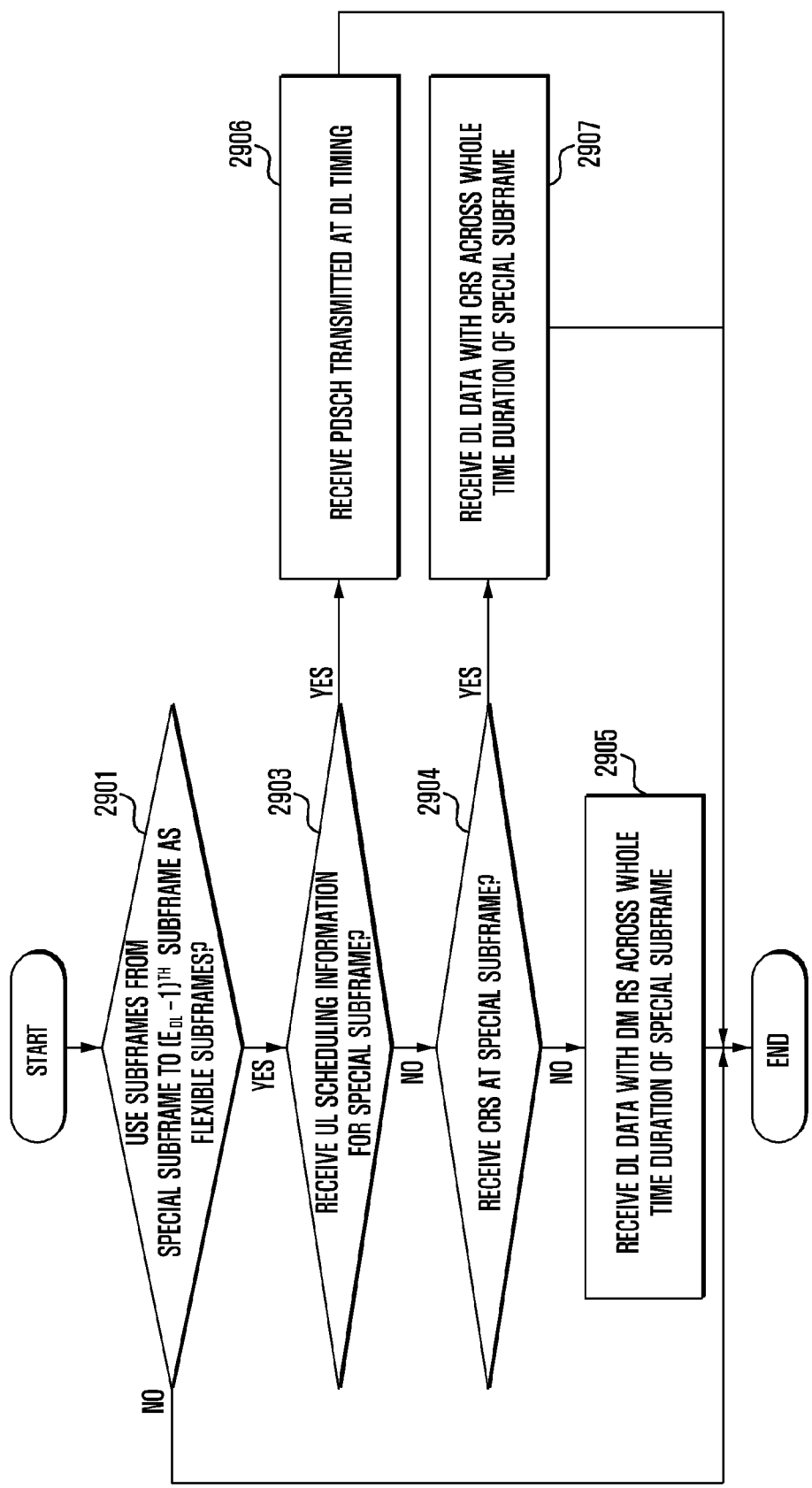
FIG. 29 is a flowchart illustrating a UE procedure for supporting flexible TDD according to another embodiment of the present invention.

FIG. 29 is a flowchart illustrating a UE procedure for supporting flexible TDD according to another embodiment of the present invention.

The UE determines whether consecutive subframes from a special subframe to $(E_{SDL}-1)^{th}$ subframe are configured as FlexSFs, based on the predetermined TDD configuration information (or FlexSF configuration information), system information, and/or RRC signaling in step 2901. Here, $E_{SDL}$ denotes the index of the earliest downlink subframe appearing since the special subframe.

If the corresponding subframes are configured as FlexSFs, the UE (e.g. a legacy eNB) determines whether the uplink scheduling information for the special subframe has been received in step 2903. For example, the eNB can transmit the FlexSF configuration information to the UE through the system information or RRC signaling in the embodiments of FIGS. 22 to 25, and the UE determines whether the FlexSF for the candidate subframe is enabled depending on whether the uplink scheduling information for the candidate subframe is transmitted/received. Also, it is possible to know that the UE operates in the FlexSF mode through RRC signaling as shown in the embodiments of FIGS. 26 and 27. If it is determined that the uplink scheduling information for the special subframe has been received at step 2903, the UE receives PDSCH transmitted by the eNB at the downlink timing in step 2906.

If it is determined that no uplink scheduling information for the special subframe has been received, the UE determines whether a CRS has been transmitted by the eNB at the special subframe in step 2904. If it is determined that CRS has been transmitted, the UE receives the downlink data transmitted along with the CRS in the whole time duration of the special subframe in step 2907.

If it is determined in step 2404 that no CRS has been received, the UE receives the downlink data transmitted by the eNB along with a DM RS in the whole time duration of the special subframe in step 2905.

A description will now be made of the method for controlling interference using the blanking mask signal described in the embodiment of FIG. 19, with reference to FIGS. 30 and 31.

Figure 30:
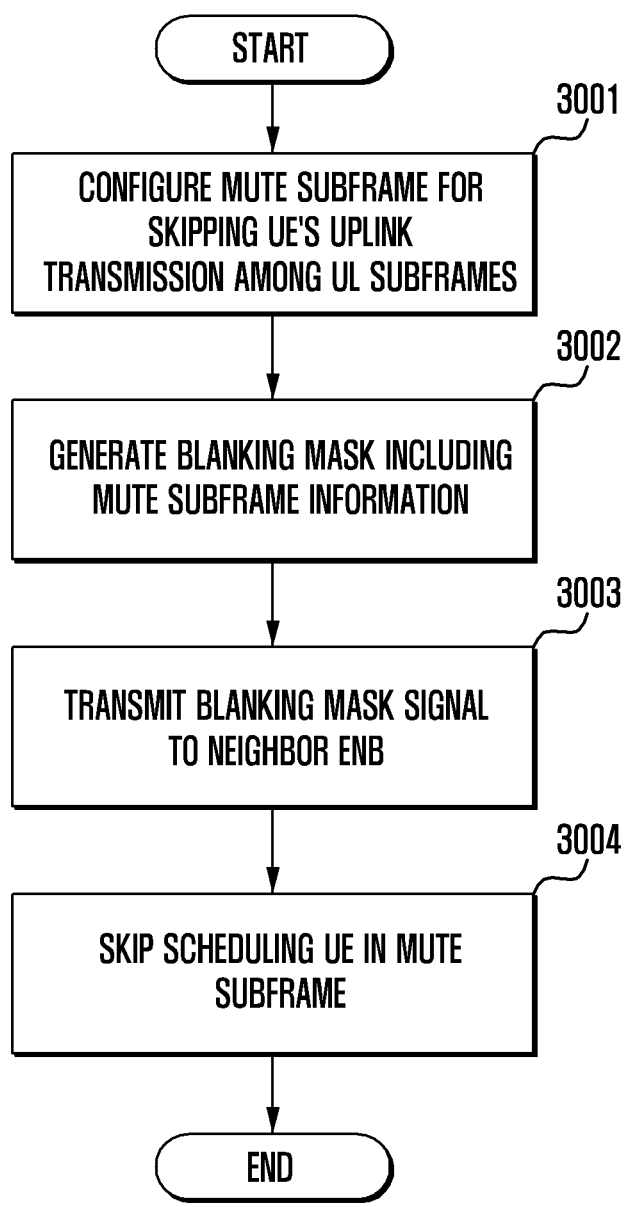
FIG. 30 is a flowchart illustrating an interference control method of the eNB according to an embodiment of the present invention.

FIG. 30 is a flowchart illustrating an interference control method of the eNB according to an embodiment of the present invention.

The eNB configures a mute uplink subframe for skipping uplink transmission of the UE among the uplink subframes in step 3001.

The eNB generates a blanking mask signal including the information on the mute uplink subframe (or the subframe carrying no transmission) in step 3002. The blanking mask signal includes the information on the mute uplink subframe and/or downlink subframe.

The eNB transmits the blanking mask signal to neighbor eNBs in step 3003.

The eNB skips scheduling in the subframe indicated as the mute subframe by the blanking mask signal in step 3004.

Figure 31:
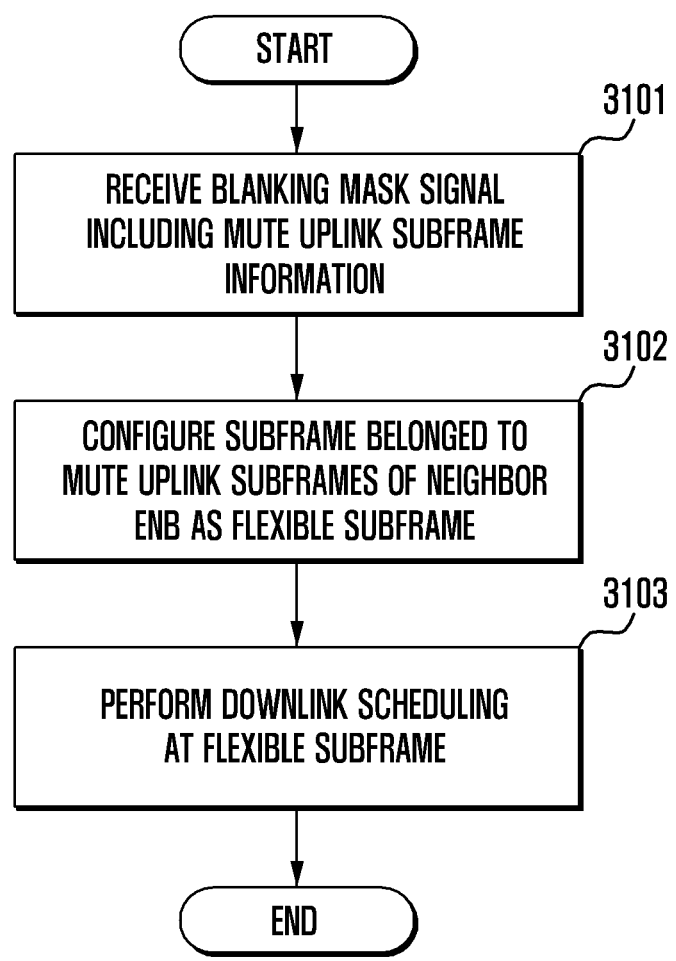
FIG. 31 is a flowchart illustrating an interference control method of the eNB according to another embodiment of the present invention.

FIG. 31 is a flowchart illustrating an interference control method of the eNB according to another embodiment of the present invention.

The eNB receives the blanking mask signal including the information on the mute uplink (or downlink) subframe to recommend skipping transmission from a neighbor eNB in step 3101.

Next, the eNB configures at least one subframe, among the mute uplink (or downlink) subframes recommended by the neighbor eNB, as the FlexSF based on the received blanking mask signal in step 3102.

Finally, the eNB schedules the UE in the FlexSF in step 3103.

A description will now be made of the method for controlling interference using the overload indicator and interference indicator described in the embodiment of FIG. 20, with reference to FIGS. 32 and 33.

Figure 32:
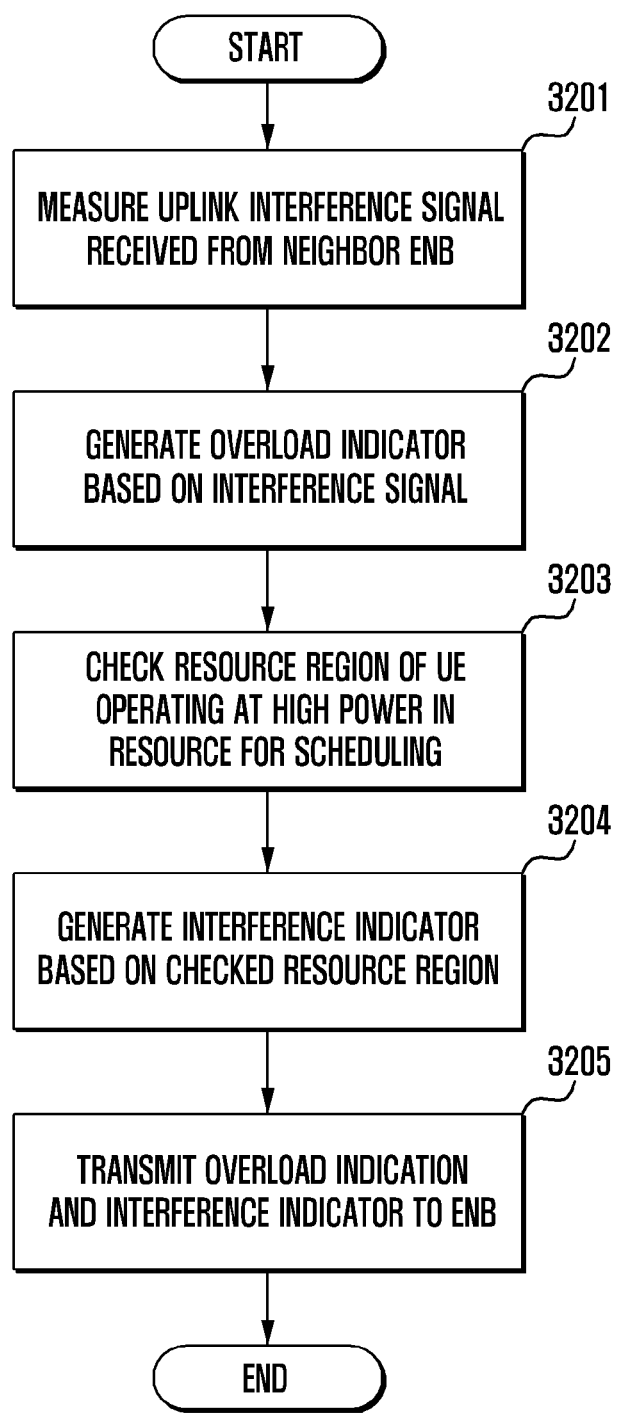
FIG. 32 is a flowchart illustrating an interference control method of the eNB according to a further embodiment of the present invention.

FIG. 32 is a flowchart illustrating an interference control method of the eNB according to another embodiment of the present invention.

The eNB measures uplink interference signal received from the neighbor eNB in step 3201.

Next, the eNB generates an overload indicator based on the measured interference signal in step 3202.

Next, the eNB checks the resource region allocated to the UE operating at high transmit power in the resource for scheduling in step 3203. The eNB then generates the interference indicator based on the checked resource region in step 3204.

Finally, the eNB transmits the overload indicator and interference indicator to the neighbor eNB in step 3205.

Figure 33:
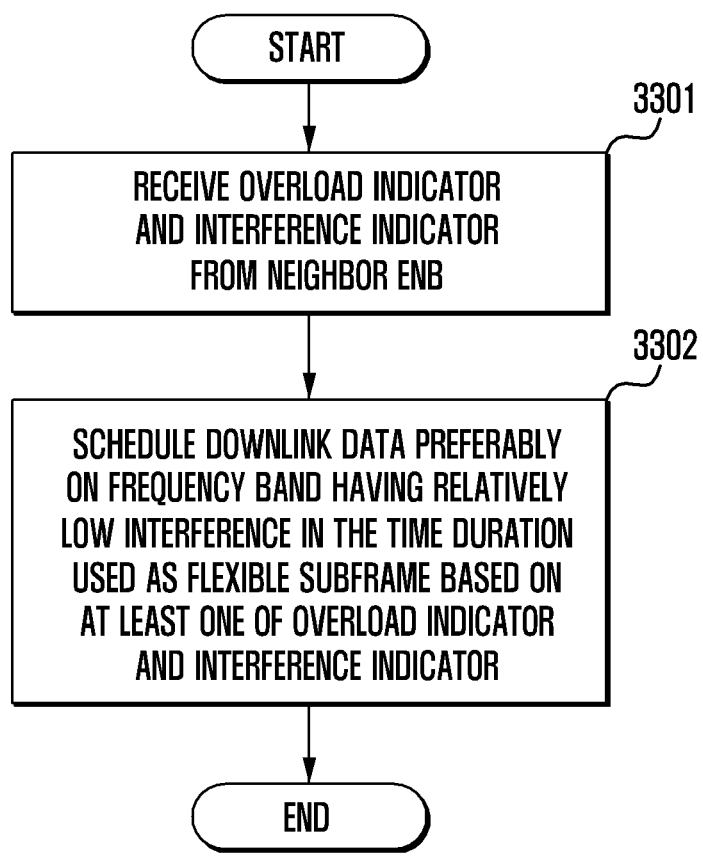
FIG. 33 is a flowchart illustrating an interference control method of the eNB according to another embodiment of the present invention.

FIG. 33 is a flowchart illustrating an interference control method of the eNB according to another embodiment of the present invention.

The eNB receives the overload indicator and interference indicator from the neighbor eNB through an X2 interface in step 3301.

Next, the eNB schedules downlink data on the frequency band experiencing relatively low interference in the time duration used as the FlexSF based on at least one of the received overload indicator and interference indicator in step 3302.

The methods according to the above-described embodiments can be implemented in the form of program command executable by various computer means and stored in computer-readable storage media. The computer readable storage media can store the program commands, data files, and data structures in individual or combined form. The program commands recorded in the storage medium can be designed and implemented for the present invention or used by those skilled in the computer software field.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A communication method by a base station supporting time division duplex (TDD), the method comprising:
    transmitting, to a terminal, information indicating at least one subframe in a radio frame using radio resource control (RRC) signaling, wherein the indicated at least one subframe is configured for the terminal to monitor downlink control channel;
    transmitting, to the terminal, first downlink control information in a first downlink control channel of a first subframe which is identified based on the information, wherein the first subframe corresponds to one among the at least one subframe; and
    transmitting, to the terminal, downlink data in a downlink data channel of a second subframe and second downlink control information in a second downlink control channel of the second subframe, wherein the second subframe is identified as a downlink subframe based on the downlink control channel transmitted in the first subframe.

2. The communication method of claim 1, further comprising:
    transmitting, to the terminal, TDD uplink-downlink configuration information for the terminal; and
    transmitting, to the terminal, downlink data on a predefined subframe if the predefined subframe is indicated as the downlink subframe based on downlink control information, and if the predefined subframe is indicated as a special subframe based on the TDD uplink-downlink configuration information.

3. The communication method of claim 1, further comprising:
    receiving, from the terminal, feedback information for the downlink data on a third subframe identified based on the RRC signaling.

4. The communication method of claim 1, further comprising:
    transmitting, to a neighbor base station, overload interference information for at least one subframe indicated as the downlink subframe based on the second downlink control information.

5. The communication method of claim 1, further comprising:
    receiving overload interference information from a neighbor base station,
    wherein the second downlink control information further includes scheduling information on downlink data determined, by the base station, based on the overload interference information.

6. A communication method by a terminal supporting time division duplex (TDD), the method comprising:
    receiving, from a base station, information indicating at least one subframe in a radio frame in a radio resource control (RRC) signaling, wherein the indicated at least one subframe is configured for monitoring downlink control channel;
    receiving, from the base station, first downlink control information in a first downlink control channel of a first subframe which is identified based on the information, wherein the first subframe corresponds to one among the at least one subframe; and
    receiving, from the base station, downlink data in a downlink data channel of a second subframe and second downlink control information in a second downlink control channel of the second subframe, wherein the second subframe is identified as a downlink based on the downlink control channel received in the first subframe.

7. The communication method of claim 6, further comprising:
    receiving, from the base station, TDD uplink-downlink configuration information for the terminal; and
    receiving, from the base station, downlink data on a predefined subframe if the predefined subframe is indicated as the downlink subframe based on the downlink control information, and if the predefined subframe is indicated as a special subframe based on the TDD uplink-downlink configuration information.

8. The communication method of claim 6, further comprising:
    transmitting, to the base station, feedback information for the downlink data on a third subframe identified based on the RRC signaling.

9. The communication method of claim 6, wherein the second downlink control information further includes scheduling information on downlink data determined by the base station based on overload interference information received from a neighbor base station.

10. A communication apparatus of a base station supporting Time Division Duplex (TDD), the apparatus comprising:
    a transceiver configured to transmit and receive signals; and
    a controller coupled with the transceiver and configured to:
        transmit, to a terminal, information indicating at least one subframe in a radio frame in a radio resource control (RRC) signaling, wherein the indicated at least one subframe is configured for monitoring downlink control channel;
        transmit, to the terminal, first downlink control information in a first downlink control channel of a first subframe which is identified based on the information, wherein the first subframe corresponds to one among the at least one subframe;
        transmit, to the terminal, downlink data in a downlink data channel of a second subframe and second downlink control information in a second downlink control channel of the second subframe, wherein the second subframe is identified as a downlink subframe based on the downlink control information transmitted on the first subframe.

11. The communication apparatus of claim 10, wherein the controller is further configured to:
    transmit, to the terminal, TDD uplink-downlink configuration information for the terminal, and
    transmit, to the terminal, downlink data on a predefined subframe if the predefined subframe is indicated as the downlink subframe based on the downlink control information, and if the predefined subframe is indicated as a special subframe based on the TDD uplink-downlink configuration information.

12. The communication apparatus of claim 10, wherein the controller is further configured to receive, from the terminal, a HARQ acknowledgement for the downlink data based on the RRC signaling.

13. The communication apparatus of claim 10, wherein the controller is further configured to transmit, to a neighbor base station, overload interference information for at least one subframe indicated as the downlink subframe based on the second downlink control information.

14. The communication apparatus of claim 10, wherein the controller is further configured to receive overload interference information from a neighbor base station, and
wherein the second downlink control information further includes scheduling information on downlink data determined, by the base station, based on the overload interference information.

15. A communication apparatus of a terminal supporting time division duplex (TDD), the apparatus comprising:
a transceiver configured to transmit and receive signals; and
a controller coupled with the transceiver and configured to:
receive, from a base station, information indicating at least one subframe in a radio frame for monitoring downlink control channel;
receive, from the base station, first downlink control information in a first downlink control channel of a first subframe which is identified based on the information, wherein the first subframe corresponds to one among the at least one subframe; and
receive, from the base station, downlink data in a downlink data channel of a second subframe and second downlink control information in a second downlink control channel of the second subframe, wherein the second subframe is identified as a downlink subframe based on the downlink control channel received on the first subframe.

16. The communication apparatus of claim 15, wherein the controller is further configured to:
receiver, from the base station, TDD uplink-downlink configuration information for the terminal; and
receiver, from the base station, downlink data on a predefined subframe if the predefined subframe is indicated as the downlink subframe based on the downlink control information, and if the predefined subframe is indicated as a special subframe based on the TDD uplink-downlink configuration information.

17. The communication apparatus of claim 15, wherein the controller is further configured to transmit, to the base station, feedback information for the downlink on a third subframe identified data based on the RRC signaling.

18. The communication apparatus of claim 15, wherein the second downlink control information further includes scheduling information on downlink data determined, by the base station, based on overload interference information received from a neighbor base station.

* * * * *